(12) United States Patent
Gulati et al.

(10) Patent No.: US 12,314,989 B2
(45) Date of Patent: May 27, 2025

(54) SYSTEMS AND METHODS FOR DETERMINING A PRE-REQUEST TRANSPORTATION MATCH BETWEEN TRANSPORTATION REQUESTOR DEVICES AND TRANSPORTATION PROVIDER DEVICES

(71) Applicant: Lyft, Inc., San Francisco, CA (US)

(72) Inventors: Mayank Gulati, San Francisco, CA (US); Harrison Chen-Hau Chu, San Francisco, CA (US); Philip Gerstoft, San Francisco, CA (US); Eli Spencer Goldstein, San Francisco, CA (US); Charles Parker Spielman, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 888 days.

(21) Appl. No.: 16/721,424

(22) Filed: Dec. 19, 2019

(65) Prior Publication Data
US 2021/0192583 A1 Jun. 24, 2021

(51) Int. Cl.
G06Q 30/0283 (2023.01)
G01C 21/34 (2006.01)
G06Q 10/02 (2012.01)
G06Q 10/047 (2023.01)
G06Q 50/40 (2024.01)

(52) U.S. Cl.
CPC ..... *G06Q 30/0284* (2013.01); *G01C 21/3438* (2013.01); *G01C 21/3453* (2013.01); *G06Q 10/02* (2013.01); *G06Q 10/047* (2013.01); *G06Q 50/40* (2024.01)

(58) Field of Classification Search
CPC .................................................. G06Q 50/30
See application file for complete search history.

(56) References Cited

U.S. PATENT DOCUMENTS 9,269,103 B1 * 2/2016 Kumar ............. H04W 4/80
10,248,913 B1 * 4/2019 Gururajan ........... G06Q 10/02
(Continued)

FOREIGN PATENT DOCUMENTS

EP 3293684 A1 * 3/2018 ............ G01C 21/00

OTHER PUBLICATIONS

"Simulate v."; Accessed Jul. 25, 2023, definition used dated from 1947—; Oxford English Dictionary; pp. 1-4; https://www.oed.com/dictionary/simulate_v?tab=meaning_and_use#22546178 (Year: 2023).*

*Primary Examiner* — Emmett K. Walsh
*Assistant Examiner* — Michael C Moroney
(74) *Attorney, Agent, or Firm* — Greenberg Traurig, LLP

(57) ABSTRACT

The disclosed computer-implemented method may match transportation requestor devices to transportation provider devices pre-request by using the same matching process employed by a matching engine that is capable of predicting transportation swaps and walks. Multiple matches may be showcased on user devices, and offline transportation providers may see an exact match to a requestor, with an ability to go online and accept the pre-request match. Additional techniques disclosed include the curation and presentation of offers using constraint space partitioning and adjustment of price and/or the presentation of offers based on real-time information to improve the efficiency and/or utilization of transportation provider resources.

20 Claims, 54 Drawing Sheets

(56) References Cited

U.S. PATENT DOCUMENTS

| | | | |
|---|---|---|---|
| 10,282,681 B2* | 5/2019 | Wang | G06Q 10/0639 |
| 10,467,579 B1* | 11/2019 | Reiss | G06Q 10/0833 |
| 11,308,536 B1* | 4/2022 | Adler | G06Q 10/083 |
| 2011/0153629 A1* | 6/2011 | Lehmann | G06Q 10/06 707/E17.014 |
| 2011/0246246 A1* | 10/2011 | Johnson | G06Q 10/0631 705/5 |
| 2014/0289074 A1* | 9/2014 | White | G06Q 30/0629 705/26.41 |
| 2015/0161564 A1* | 6/2015 | Sweeney | G06Q 50/30 705/338 |
| 2015/0262430 A1* | 9/2015 | Farrelly | G06Q 10/02 705/13 |
| 2017/0148229 A1* | 5/2017 | Marco | G07B 15/02 |
| 2017/0169535 A1* | 6/2017 | Tolkin | G01C 21/3438 |
| 2017/0359718 A1* | 12/2017 | Denny | H04L 9/0861 |
| 2018/0174265 A1* | 6/2018 | Liu | G06Q 30/0639 |
| 2018/0224866 A1* | 8/2018 | Alonso-Mora | G05D 1/0291 |
| 2018/0308038 A1* | 10/2018 | Zhou | G06Q 10/063114 |
| 2019/0057326 A1* | 2/2019 | Li | G06Q 30/0206 |
| 2020/0081933 A1* | 3/2020 | Jiang | H04L 67/60 |
| 2020/0267497 A1* | 8/2020 | Warr | H04W 4/029 |
| 2020/0327516 A1* | 10/2020 | Bai | G01C 21/3438 |
| 2020/0410455 A1* | 12/2020 | Aviñó | H04N 7/15 |
| 2021/0027212 A1* | 1/2021 | Gupta | G06Q 10/02 |
| 2021/0097559 A1* | 4/2021 | Albada | G06Q 50/40 |
| 2021/0231446 A1* | 7/2021 | Pan | G01C 21/3438 |
| 2021/0341299 A1* | 11/2021 | Weng | G06F 17/18 |
| 2023/0120345 A1 | 4/2023 | Demiralp | |

* cited by examiner

SYSTEMS AND METHODS FOR DETERMINING A PRE-REQUEST TRANSPORTATION MATCH BETWEEN TRANSPORTATION REQUESTOR DEVICES AND TRANSPORTATION PROVIDER DEVICES

BACKGROUND

A dynamic transportation matching system may match transportation requestors with transportation providers, enabling transportation requestors to conveniently reach their destinations. It may be advantageous to transportation requestors to be provided with some information about available transportation before requesting the transportation (e.g., the characteristics of transportation that would likely be provided to a transportation requestor). Additionally, it may be advantageous for the dynamic transportation matching system to be able to anticipate which transportation providers would best match to potential transportation requestors before a request is actually made. A dynamic transportation matching system may use heuristics to predict what transportation options are available to a potential transportation requestor; however, these heuristics may yield inaccurate results. Accordingly, the systems and methods described herein are directed to efficiently producing accurate pre-request transportation matching results.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
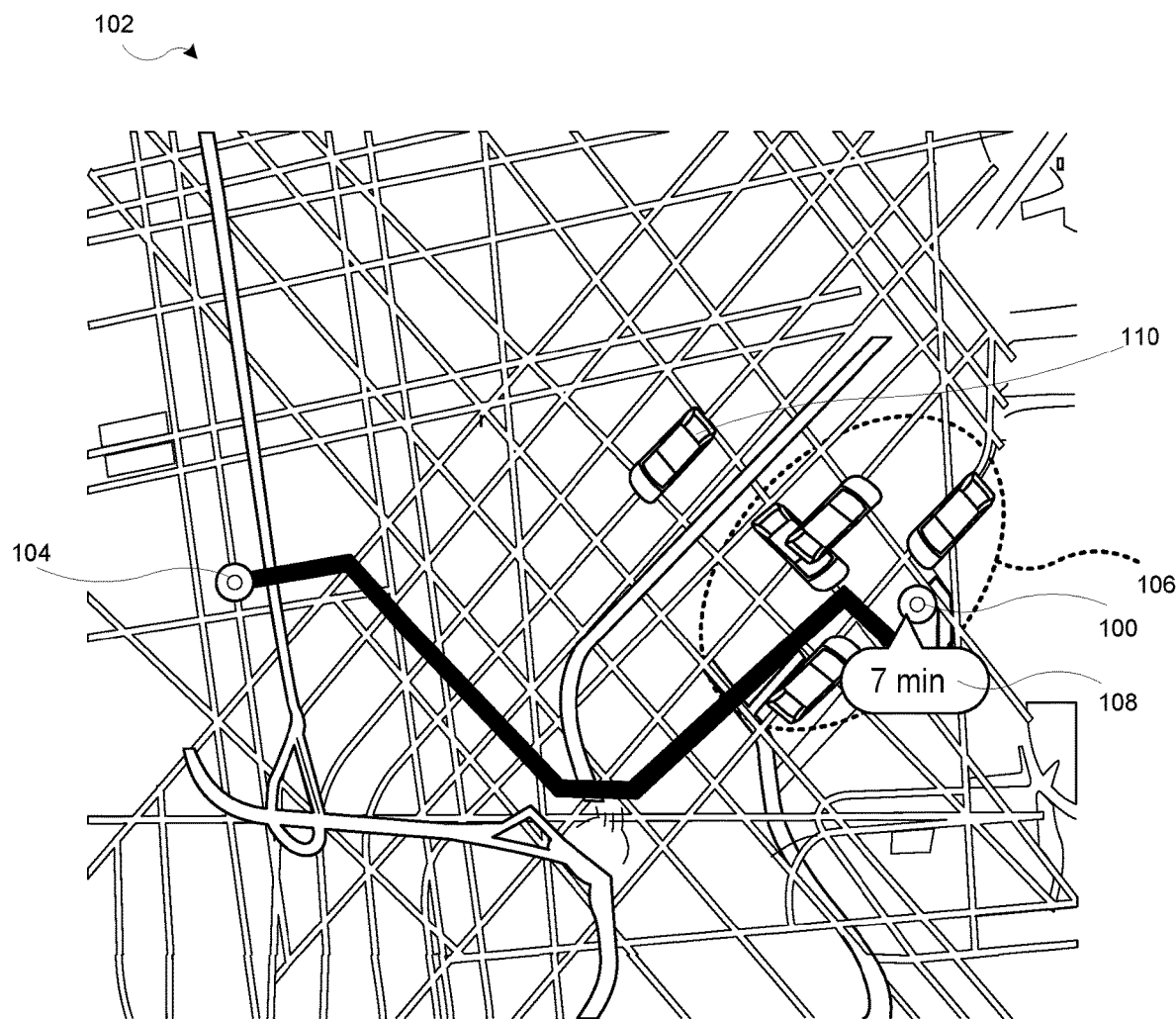
FIG. 1 is a diagrammatic view of a map illustrating a problem arising from estimating offer parameters (e.g., ETA, ETD, price) based on historical data, regardless of transportation network conditions and personal preferences.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

A dynamic transportation network may provide on-demand transportation to transportation requestors by matching transportation requestor devices to transportation provider devices in order to fulfill transportation requests. The present disclosure is generally directed to a pre-request matching system and method, uses of the pre-request matches, and techniques for formulating and/or presenting offers based on real-time information about transportation provider resource availability. Conventional dynamic transportation matching systems may have a matching compute engine that matches transportation requestors to transportation providers when a requestor makes a request that specifies a transportation mode and a defined set of constraints.

These systems may process requests periodically according to a matching cycle (e.g., approximately every 500 milliseconds). However, before making the request, a requestor typically views offers for products that may not be based on reliable information about actual matches the requestor is likely to receive once a request is made. In contrast, the pre-request matching system disclosed herein (which may work as part of and/or in tandem with a dynamic transportation matching system) may determine, before a request is made, a variety of potential matches for the requestor based on various constraints and/or user preferences in a manner that enables the pre-request matching system to provide more reliable, accurate pre-request match information (before, e.g., the dynamic transportation matching system makes a match in response to an actual request).

Providing accurate information in pre-request sessions based on potential requests is difficult for a variety of reasons, including due to the computational complexity required to handle the pre-request analysis of potential matches. For example, running an entire match cycle (e.g., performing all of the computations involved in determining matches within the dynamic transportation network for a given time window) for each potential request of a pre-request session may be prohibitively computationally expensive. Specifically, it may be difficult and/or impractical to solve a global matching problem for every open requestor session on potentially thousands of requestor devices every few seconds.

Additional issues may arise depending on the particular approach used to determine matches for a pre-request session. In one approach, sessions (e.g., user sessions to view transportation offers and request matches on a user device) can be introduced into a matching compute engine, but this approach can be problematic. For example, the matching compute engine could be asked to serve all sessions, even low-intent sessions (e.g., sessions of users who do not intend to make a request at the time), and thus may be required to handle extreme service spikes that could result in distributed denial of service (DDOS) scenarios and/or inefficient allocation of computing resources. Also, if all sessions are included in solutions produced by the matching compute engine, session-predicted ETAs for high-intent sessions may be degraded by low-intent sessions (e.g., low-intent sessions may reserve transportation providers that could be matched to high-intent sessions). Furthermore, solutions in this scenario could contain swap cycles (e.g., a series of re-matchings of previously matched requestors to different providers) that include both real requestors and pre-request sessions, which may cause these solutions to fail to achieve an optimal or near-optimal set of real-world matchings.

The disclosed pre-request matching techniques, however, may address one or more of the issues associated with previous systems. For example, the disclosed systems may efficiently reuse information from a previous matching cycle to avoid repeating expensive computational analysis. As a result of the pre-request match determination, offers presented to potential requestors can more accurately estimate pickup time, times to destination, and price, which may improve user experience, reduce post-request cancelations (thereby, e.g., avoiding wasted use of transportation resources to arrange for picking up a transportation requestor, reducing transportation network volatility, and improving transportation provider experience), and avoid consuming processing resources required to process follow-up requests by requestors who cancel. Accordingly, the following will provide detailed descriptions of a pre-request matching system and method, uses of pre-request matches generated by such a system, and techniques for formulating and/or presenting offers based on real-time information about transportation provider resource availability.

The following will provide, with reference to FIGS. 1-6, detailed descriptions of the use of heuristics to estimate matching results during pre-request sessions and the use of a pre-request matching system to more accurately determine anticipated matching results for pre-request sessions. In addition, detailed descriptions of a pre-request matching system are provided with reference to FIGS. 7-11. Furthermore, detailed descriptions of potential discrepancies that may be introduced with ETA determinations are provided with reference to FIGS. 12-13 and 24. Detailed descriptions of a presentation system (e.g., operating on a requestor device) interacting with a pre-request matching system are provided with reference to FIGS. 14-15. Detailed descriptions of the relationship between the system cost of transportation matches and constraints to those matches are provided with reference to FIGS. 16, 17, and 19, while detailed descriptions of approaches to reducing redundant computation to account for different sets of constraints are provided with reference to FIG. 18. Detailed descriptions of approaches to identifying relevant potential matches within a constraint space are provided with reference to FIGS. 20-23. Detailed descriptions of provider-specific requests are provided with reference to FIGS. 25-31. Detailed descriptions of approaches to presenting transportation options in light of pre-request matching data are provided with reference to FIGS. 32-36. Detailed descriptions of offline driver matches are provided with reference to FIGS. 37-40. Detailed descriptions of approaches to handling transportation requestor expectations are provided with reference to FIGS. 41-44. Detailed descriptions of a pre-request matching service platform are provided with reference to FIG. 45. Detailed descriptions of methods for providing and making use of pre-request matching information are provided with reference to FIGS. 46-50. Finally, FIGS. 51-53 detail a dynamic transportation management system that can host and/or implement all or part of the functionality, features, systems, and methods disclosed herein.

FIG. 1 is a diagrammatic view of a map 102 illustrating a potential problem arising from estimating offer parameters (e.g., ETA, ETD, price, etc.) based on historical data, regardless of transportation network conditions and personal preferences. In the example shown in FIG. 1, a transportation requestor device location 100 and destination 104 may be used to determine the most direct route by solving a provider-availability problem. However, before receiving a request that specifies a mode of transportation and constraints, the matching compute engine of a conventional dynamic transportation matching system may not attempt to determine a match to a transportation provider 110. Instead, the matching compute engine may, for example, perform an analysis based on the five providers 106 closest to the transportation requestor device location 100, determine the four shortest routes available, determine an estimated time to arrival (ETA) 108 or pickup time, and estimate a price of serving this ride. This method of generating ETA and ETD may be imprecise for various reasons.

Although imprecise, heuristic approaches to solve the provider-availability problem pre-request may have certain benefits over trying to use a matching engine to identify potential matches pre-request. As noted above, solving a provider-availability problem may involve performing ETA predictions and other pre-matching operations (e.g., filtering providers based on constraints, scoring the utility of a match, etc.) for only the providers nearest to the requestor (e.g., the nearest n providers). Therefore, solving the provider-availability problem may result in lower latencies than those experienced by the matching cycle of the matching compute engine for various reasons. For example, the provider-availability problem may be bounded or limited to the nearest n providers, such that the computational cost may not increase with increased density of the providers located near a requestor's location. Additionally, unlike the matching performed by the matching compute engine, solutions to the provider-availability problem may need not to be instant, so it may not be necessary to have the capability to perform as many operations in a cycle.

Unfortunately, solutions to the provider-availability problem may be imprecise since information about the nearest drivers may not be up-to-date. Instead, the information provided may include the most recently known locations, and this information may not be updated as of the most-recent dynamic matching cycle. Accordingly, the nearest providers 106 may have moved, may have changed direction, and/or may have already been matched to another requestor. Accordingly, the use of historical data, rather than real-time data, may lead to an inaccurate determination of the predicted ETA 108.

Solutions to the provider-availability problem may also be imprecise since they may not take into account complications such as (1) the results of swapping requestors from one provider to another, (2) resolving contention when multiple, simultaneous requests could be matched to the same provider, and/or (3) routes that involve a short walk to a waypoint of an existing route. Failure to take these considerations into account may result in inaccuracies in pre-request offer parameters (whereas the dynamic transportation matching system may process requests in view of these considerations, creating a disparity between pre-request estimates and actual matching results from requests). Swaps, contention resolution, and walks are described in greater detail below with reference to FIGS. 12, 13, and 24. Briefly, a matching compute engine may respond to a request by swapping a match of a transportation requestor from one provider to another provider if doing so would improve the transportation network (e.g., by lowering overall ETA and/or average cost within the transportation network). Such a swap may result in a chain of additional swaps in the same matching cycle and thus rapidly change existing matches. Also, when multiple requests are processed in a dynamic matching cycle, the system may create matches that match a provider to more than one requestor, and the system may resolve this contention for providers by picking a winner based on improved ETA, lower system cost (e.g., in terms of the use of transportation resources within the dynamic transportation network), etc. As a result, a provider who appears to be available may be matched to a different requestor who happens to submit a request during the same cycle. Further, attempting to account for requestor walks may involve searching, within a determined walk radius of the requestor location, for waypoints of routes of existing plans. As a result, the provider may be matched into a shared ride of a provider that would otherwise be unavailable. Mismatches between pre-request heuristics that may be used to provide information (such as ETA for a transportation provider to pick up a transportation requestor) about potential matches for each session may provide an inaccurate representation of the actual results of requests for transportation.

Figure 2:
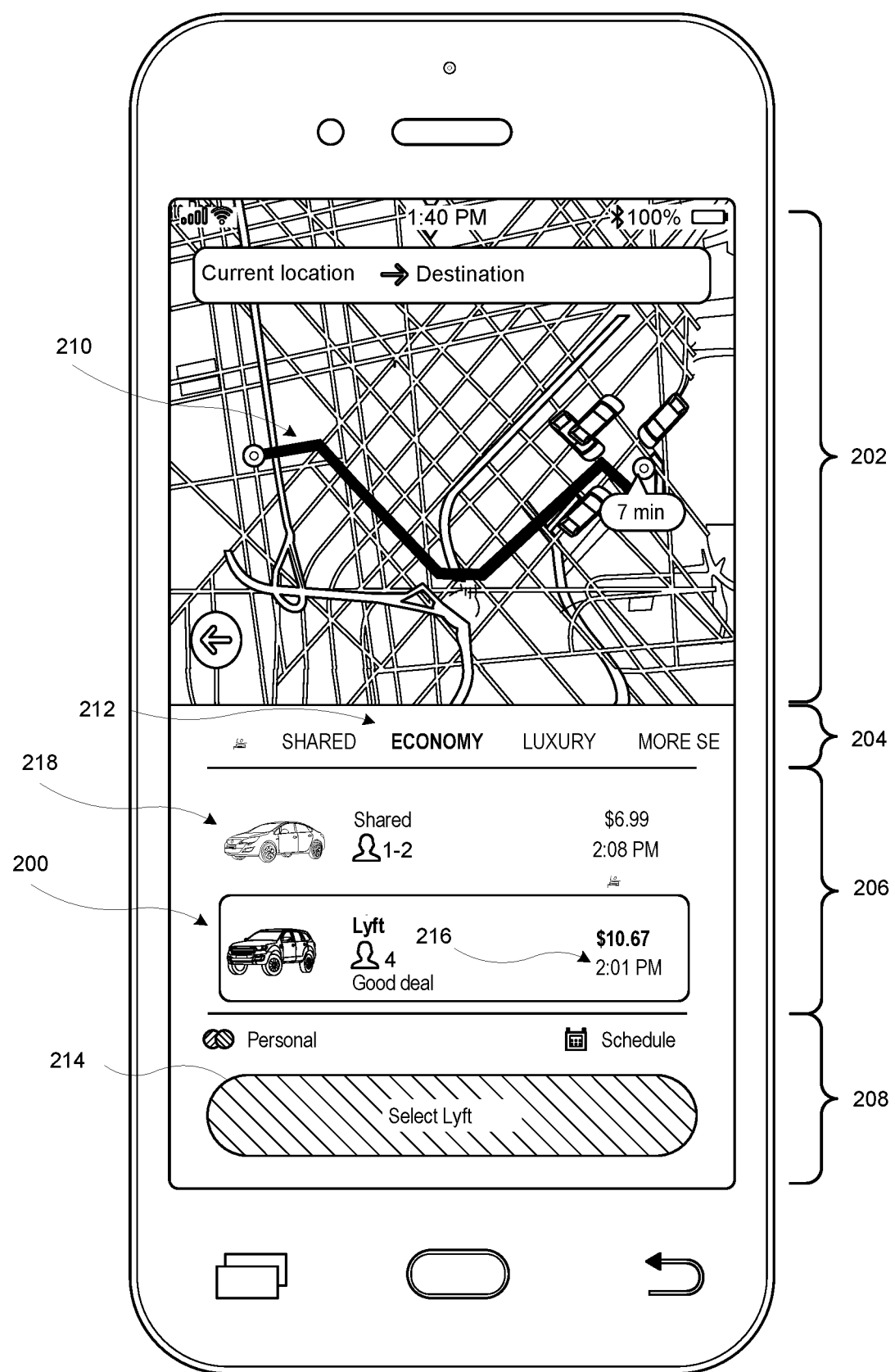
FIG. 2 is a view of a transportation requestor device (pre-request), illustrating a problem arising from estimating offer parameters (e.g., ETA, ETD, price) based on historical data, regardless of transportation network conditions and personal preferences.

FIG. 2 is a view of a transportation requestor device pre-request illustrating a problem arising from estimating offer parameters (e.g., ETA, ETD, price) based on historical data, regardless of transportation network conditions and personal preferences. An example pre-request user interface of a requestor application running on a requestor device may have a map display region 202 displaying a route 210 for a currently selected offer 200 corresponding to a provider located near the requestor. The user interface may also have a mode selector region 204 that enables the requestor to select a queueing transportation mode 212 in which the requestor chooses to wait in a queue for a transportation match to obtain a more favorable transportation match (e.g., lower price, lower ETA, conforms more closely to requestor preferences, etc.) than a transportation match which might be available immediately. In addition, an offer display region 206 may display a ranked list of offers (e.g., offers 200 and 218) corresponding to providers located near the requestor. The user interface may further have an interactive controls region 208 with a control 214 responsive to requestor actuation to make a request based on the currently selected offer 200. An ETD 216 displayed in the offer 200 may be inaccurate as a result of the method of using information about nearby drivers, as described above.

As noted above, problems associated with making offers based on providers located near the requestor, as opposed to pre-request matches, arise in part because transportation network conditions can vary greatly at any given time. Historic data and forecast data may fail to accurately reflect transportation provider resource availability. As a result, offers may be priced and/or presented based on erroneous information that detrimentally incentivizes transportation requestors to utilize transportation provider resources inefficiently. As an example, when the requestor views offer 200, it appears to have a much better ETA and ETD 216 than an offer 218 for a shared ride (i.e., 2:01 pm versus 2:08 pm, or 7 minutes faster), but the use of historical data combined with the possibility of contention due to simultaneous requests may cause the requestor to be matched to another provider who is further away, resulting in a much longer ETA that is not better than an average shared ride ETA.

Figure 3:
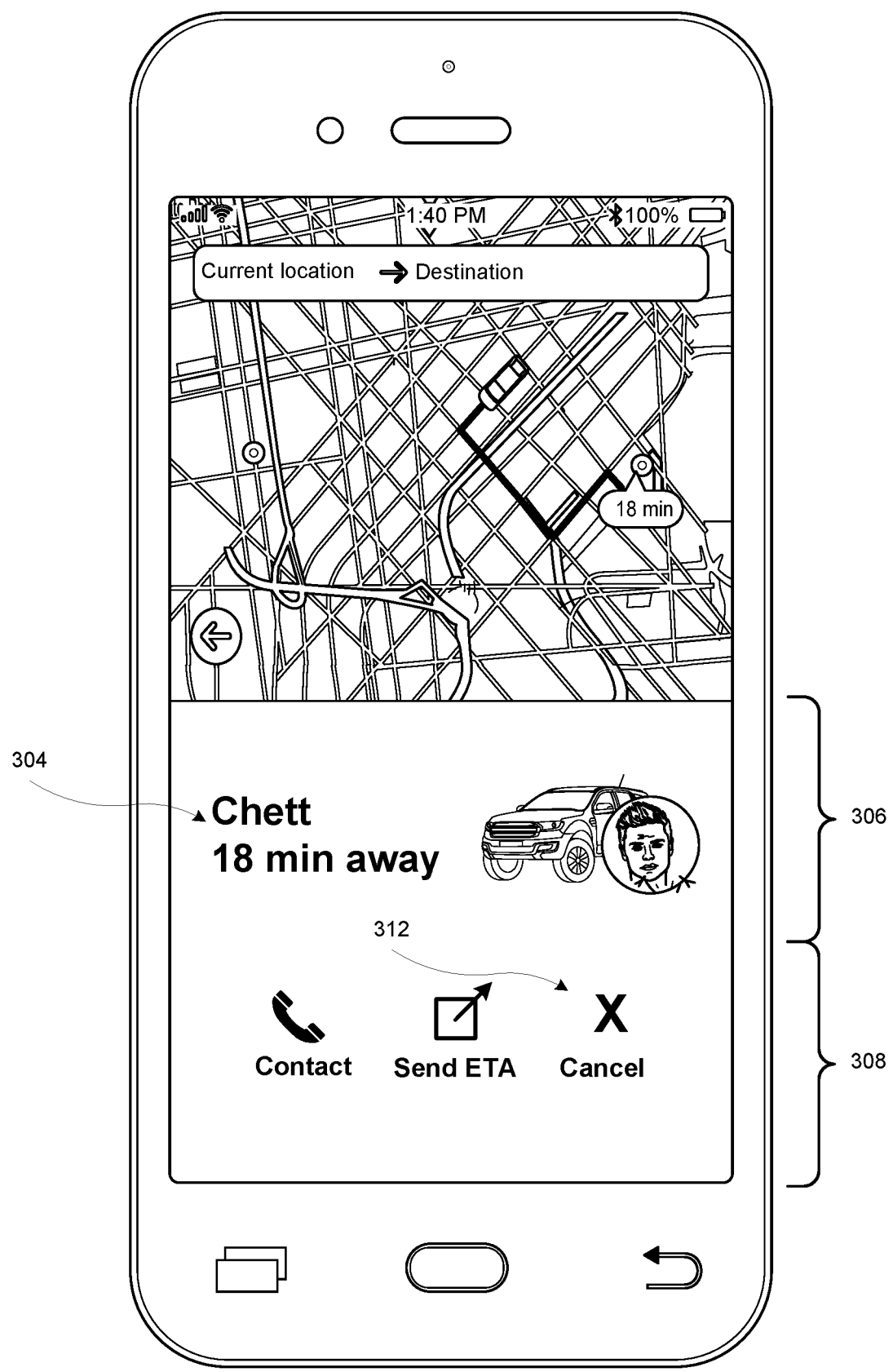
FIG. 3 is a view of a transportation requestor device (post-request), illustrating a problem arising from estimating offer parameters (e.g., ETA, ETD, price) based on historical data, regardless of transportation network conditions and personal preferences.

FIG. 3 is a view of a transportation requestor device post-request illustrating a problem arising from estimating offer parameters (e.g., ETA, ETD, price) based on historical data, regardless of transportation network conditions and personal preferences. An example post-request user interface of a requestor application running on a requestor device may have a match display region 306 for displaying information about the plan generated for the ride, including the provider and a post-match ETA 304 that is significantly worse than the predicted ETA. The user interface may further have an interactive controls region 308 having a control 312 responsive to requestor actuation to cancel the ride. In this situation, because the post-match ETA is significantly worse than the predicted ETA, the requestor is more likely to cancel the ride, leading to even more volatility in the conditions of the transportation network.

Figure 4:
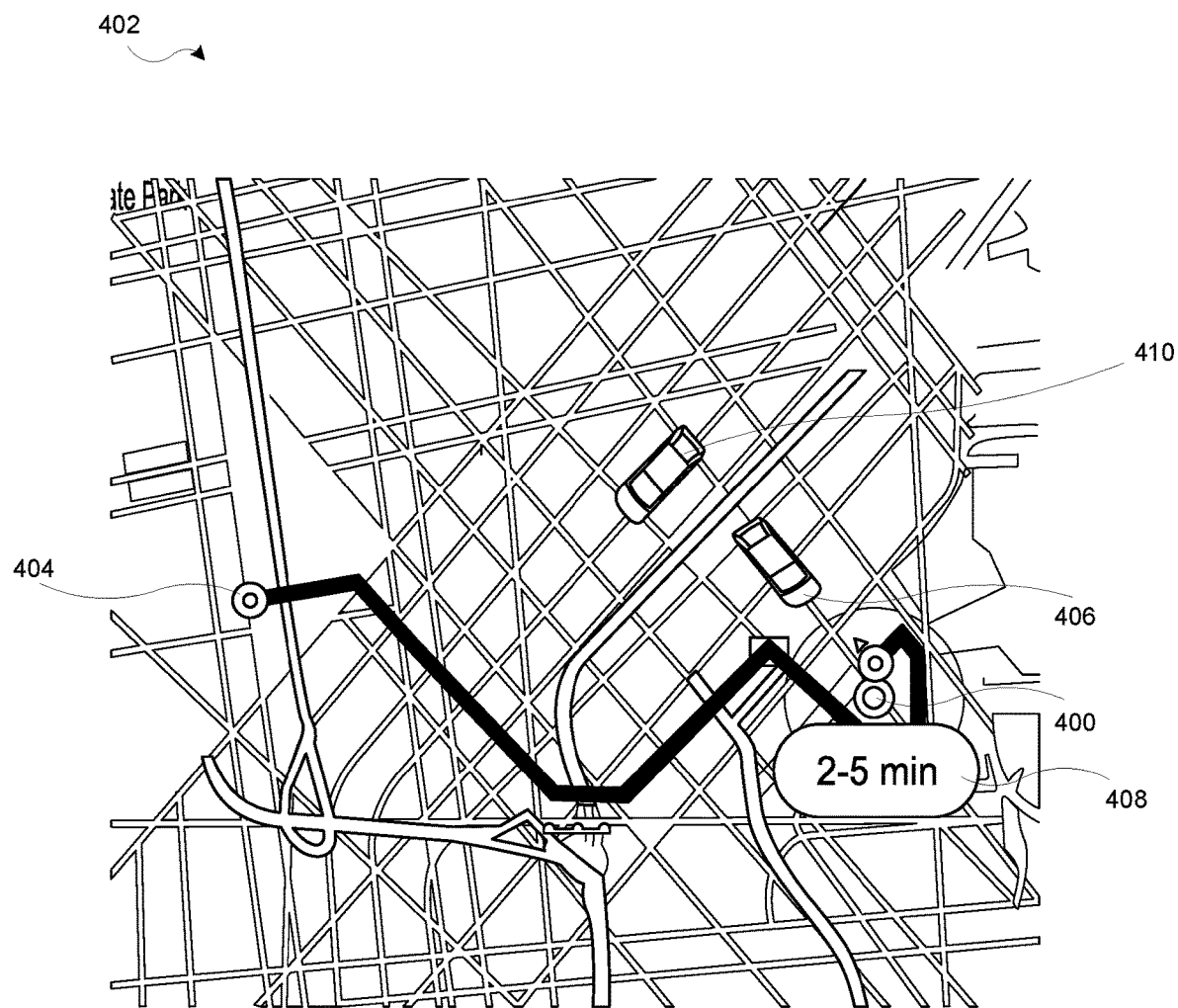
FIG. 4 is a diagrammatic view of a map illustrating an example solution to the problem of FIGS. 1-3 in accordance with the present disclosure.

FIG. 4 is a diagrammatic view of a map 402 illustrating a solution to the problem of FIGS. 1-3 in accordance with the present disclosure. In the example shown in this figure, a transportation requestor device location 400 and destination 404 may be used to determine a route. However, before the requestor actually makes a request that specifies a mode of transportation and constraints, one or more pre-request matches may be determined in the same or a similar way as is performed by the dynamic transportation matching system. Rather than performing an analysis based on a set of providers closest to the transportation requestor device location 400, the pre-request match determination system may determine potential matches for multiple transportation modes. Furthermore, these potential matches may be based on various constraints and/or requestor preferences in a manner that may improve the likelihood that the potential match will be an efficient option for the requestor. For example, one potential match may be with provider 410, which may be a private car having a predicted ETA of eighteen minutes. Other matches, however, may include shared rides, such as provider 406, which has a much better predicted ETA 408 of two to five minutes. By considering these multiple transportation modes, additional options may be considered that may be more efficient for the requestor and for the transportation network.

Generally, the use of real-time information about transportation network conditions may yield several benefits over the use of historical data. The pre-request matching systems disclosed herein may use real-time information about provider availability, location, bearing, and/or speed, updated as of a most recent dynamic matching cycle (e.g., no more than two seconds previous), and these systems may also take into account swapping, contention resolution, and walking with shared rides. Adding the information about real-time transportation network conditions, as is accomplished with pre-request matching, may make it possible to accurately assess system cost in real time and further price and/or present offers in a way that incentivizes transportation requestors to utilize transportation provider resources in an efficient manner.

Figure 5:
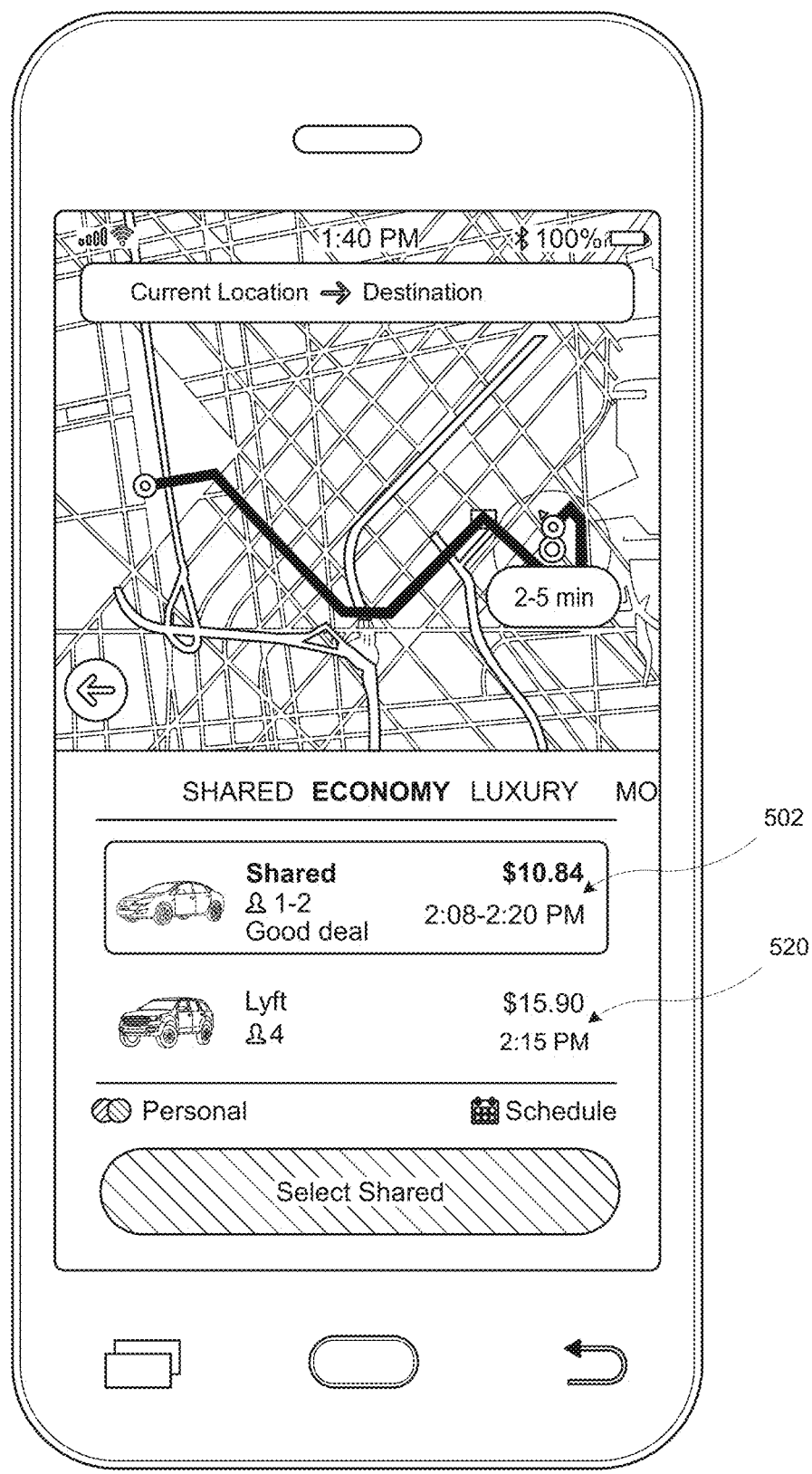
FIG. 5 is a view of a transportation requestor device (pre-request), illustrating an example implementation of the solution of FIG. 4 in accordance with the present disclosure.

FIG. 5 is a view of a transportation requestor device pre-request illustrating an example implementation of the solution of FIG. 4 in accordance with the present disclosure. In this example, the pre-request matching may be used to determine potential shared ride matches by allowing for two or more requestors to be matched to a single provider under certain constraints. Such constraints may result in the identification of a shared ride match that matches two requestor devices to one provider device when such a match obtains a better marginal cost compared to matching the requestor devices to separate provider devices. Marginal cost analysis is detailed with reference to FIGS. 19-23. Additional or alternative constraints may include a first constraint that a later in time requestor must have a pickup location within a threshold radius of a point (e.g., a waypoint) along a portion of a route of a plan for an already matched requestor, and a second constraint that a drop-off location for one of the requestors is within another threshold radius of a portion of a route of a plan for the other one of the requestors. Accordingly, a shared-rides predicted ETA can be based on best available matches instead of or in addition to the closest providers not yet matched. The accuracy and precision benefits can be even more pronounced for displaying pre-request ETD ranges 502. In this example, the requestor device displays information that clearly communicates that an ETD 520 for a private car match is not likely to be better than an ETD in range 502 of a shared ride match. In this circumstance, the requestor is provided with more accurate information (e.g., ETA, ETD, and price) so that a match may be chosen that predictably meets the preferences of the requestor.

Figure 6:
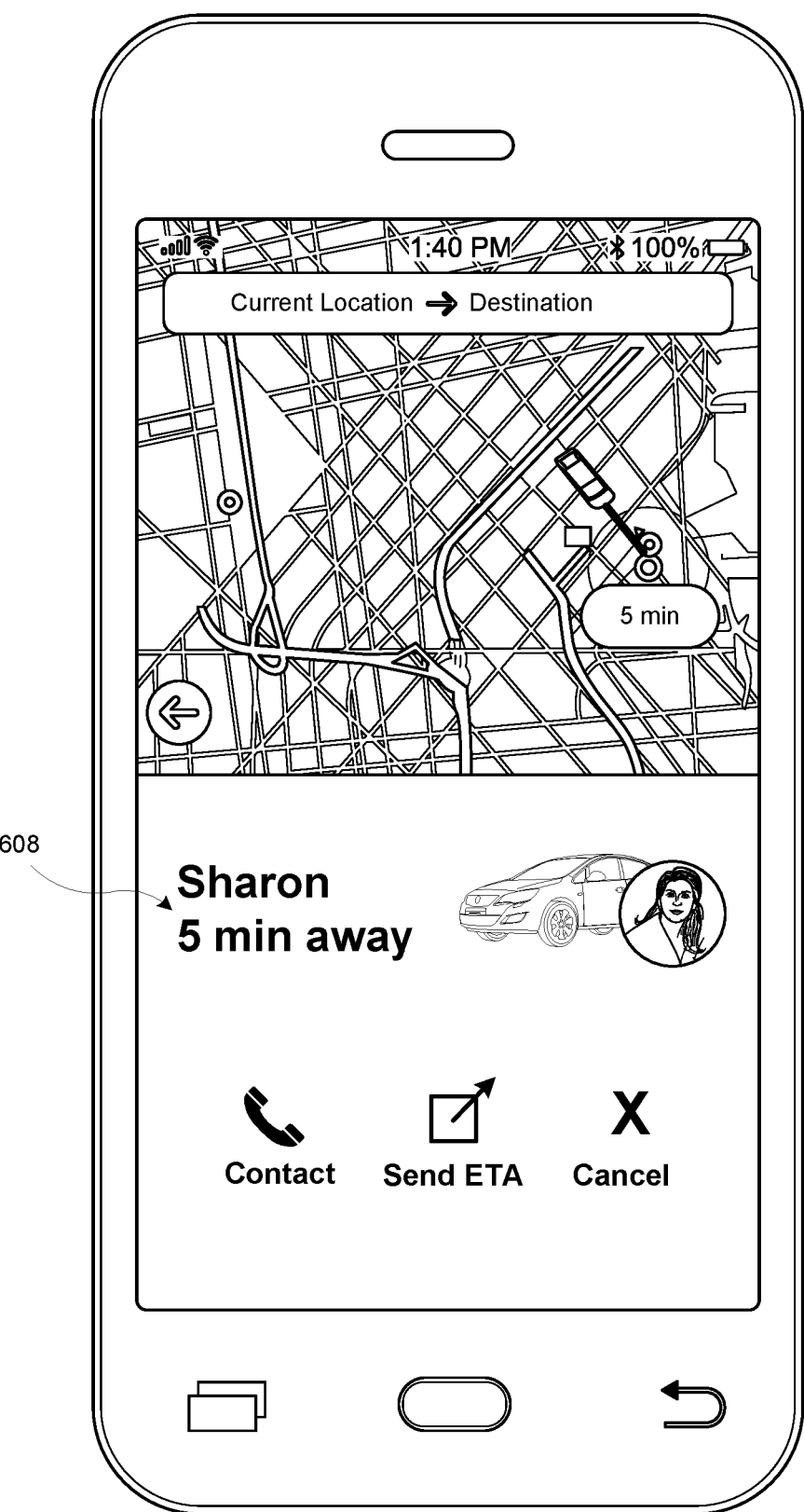
FIG. 6 is a view of a transportation requestor device (post-request), illustrating an example implementation of the solution of FIG. 4 in accordance with the present disclosure.

FIG. 6 is a view of a transportation requestor device post-request illustrating an example implementation of the solution of FIG. 4 in accordance with the present disclosure. In this example, because a post-match ETA 608 is within a predicted ETA range, the requestor may be less likely to cancel the ride. When fewer requestors cancel rides (and, therefore, the probability of conversion of requestor sessions into rides increases), the dynamic transportation matching system may make matches with greater certainty, leading to more efficient use of provider resources, reduction in network volatility, reduction in use of computational resources, and better requestor and provider experiences.

Figure 7:
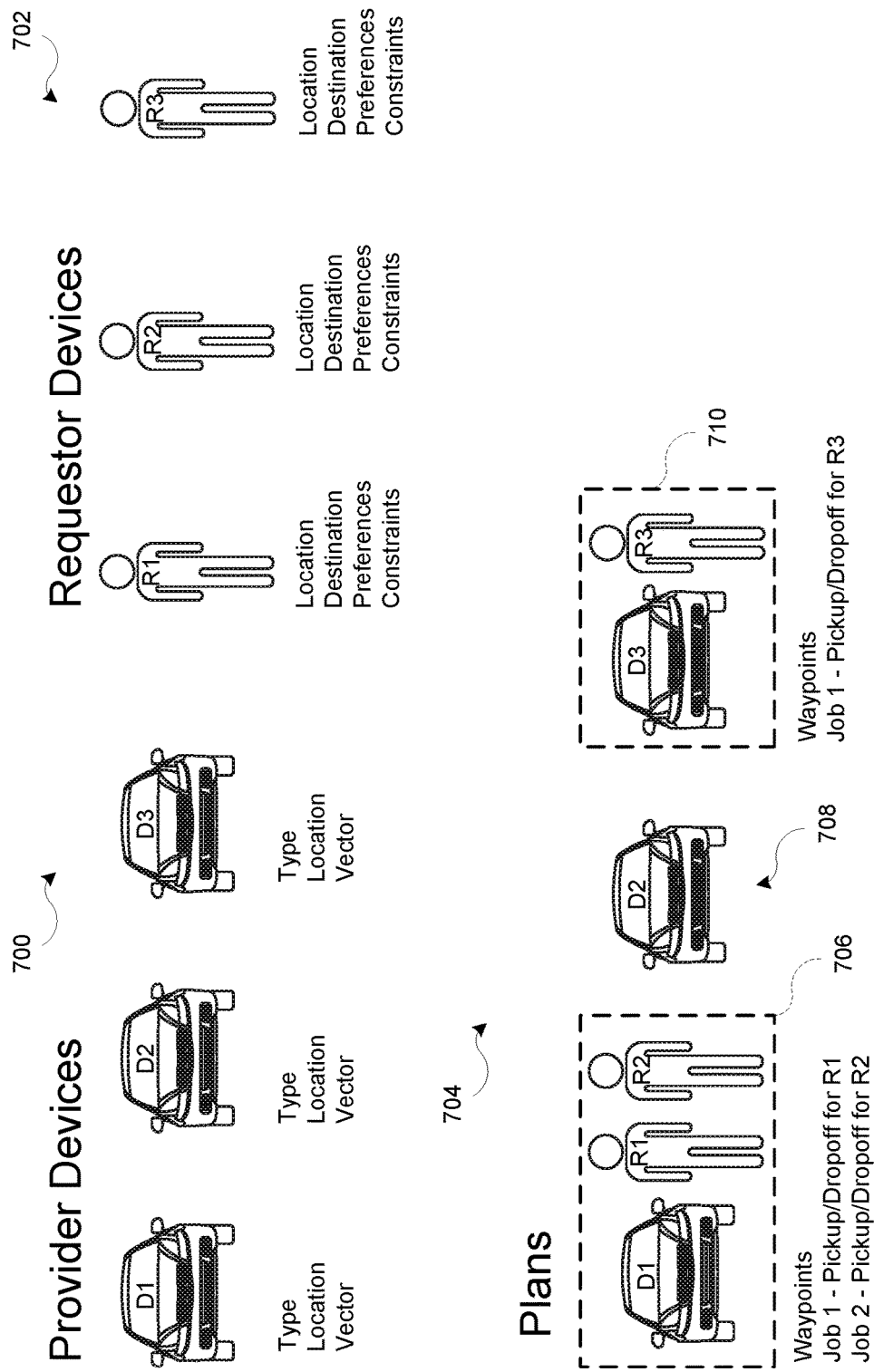
FIG. 7 is a diagram illustrating an example determination of plans by a matching system based on requests in accordance with the present disclosure.

FIG. 7 is a diagram illustrating an example determination of plans by a matching system based on requests in accordance with the present disclosure. Provider devices 700 may include various providers D1-D3, each having a provider type (e.g., luxury car, private car, shared car, micromobility vehicle, public transportation, etc.), provider location, and, where applicable, provider vector (e.g., direction and velocity). Requestor devices 702 may include various requestors R1-R3, each having a location, destination, and preferences. In the event of an actual request from a provider device, a mode of transportation and specific constraints may also be specified.

A dynamic transportation matching system having information about the provider devices 700 and requests from the requestor devices 702 may employ a matching compute engine to perform dynamic matching to generate plans 704. For example, in plan 706, requestor devices R1 and R2 may both be matched to provider device D1 in a shared ride. Additionally, requestor device R3 may be matched to provider device D3 in plan 710, and provider D2 may remain available in plan 708. Each plan having a requestor matched to a provider may have a set of waypoints and one or more jobs specifying pickup and drop-off locations for a requestor. This process may be simulated for pre-request matches in which the requestors may not have a specified mode of transportation or a specific set of constraints. Thus, for a requestor device, the process may be simulated for every transportation mode and set of constraints in view of a pick-up location, drop-off destination, and preferences associated with the requestor device.

A matching problem for a session might be relatively computationally inexpensive to solve (e.g., similar to those of a provider-availability problem) if the matching problem were only to consider available transportation resources and a single unmatched transportation task, or if transportation tasks could not be detached and only one transportation task were added. However, these approaches would not account for swaps that influence the transportation task. Additionally, detaching transportation tasks in the above-described approaches could cause the complexity to be the same as the full extent of the matching cycle of the matching compute engine. Moreover, in addition to complexity, matching groups might be found that are irrelevant to the potential requested transportation task.

Figure 8:
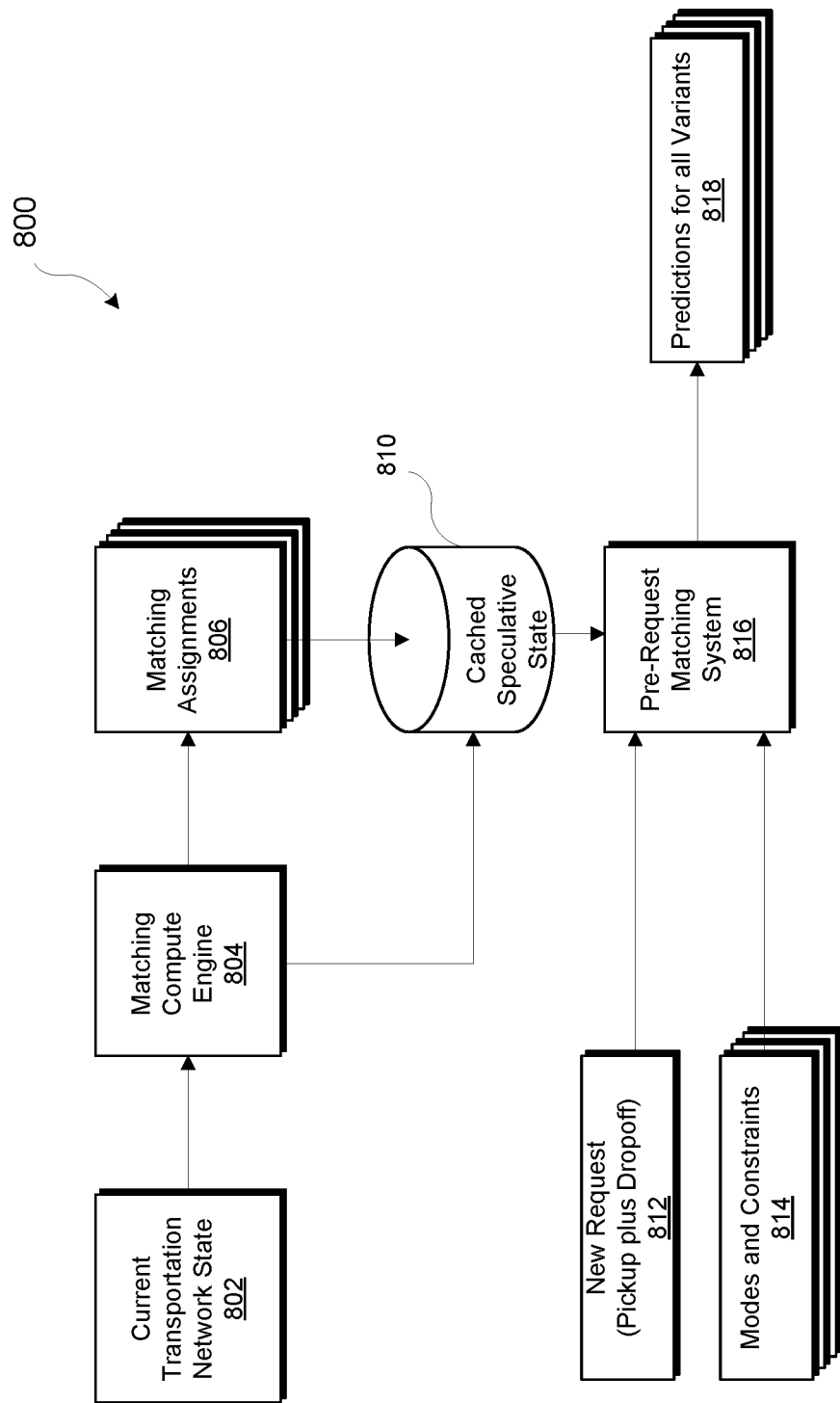
FIG. 8 is a block diagram illustrating an example pre-request matching system accessing a cached speculative state of a dynamic transportation matching system in accordance with the present disclosure.

FIG. 8 is a block diagram illustrating a pre-request matching system 816 accessing a cached speculative state 810 of a dynamic transportation matching system 800 in accordance with the present disclosure. The dynamic transportation matching system 800 may have a stateless matching compute engine 804 that uses a cached speculative state 810 (e.g., a transportation network state resulting from modifying matchings of an old network state under the assumption that new matchings will be accepted by providers) to compute matchings 806 based on a current transportation network state 802 to improve latencies (e.g., by around an order of magnitude). In this example, the pre-request matching system 816 may use the same or similar stateless matching methodology for serving pre-request sessions as the dynamic transportation matching system 800 uses for serving requests. Accordingly, the pre-request matching system 816 may receive a set of variants that includes session information 812, such as pickup and drop-off locations, and may also receive a set of modes and constraints 814, as previously described. Based on this set of variants and cached speculative state 810, the pre-request matching system 816 may generate pre-request match predictions for all variants 818 (e.g., as a ranked list of pre-request match predictions) and may make this set of predictions available to a presentation system as described in greater detail below. Using a speculative state 810 may find globally optimal solutions with only a single-request computation. Speculative state 810 represents the current state of the transportation network with all transportation requestors, transportation providers, currently assigned routes, and assignments in progress. This speculative state 810 is then augmented with the addition of one or more users (e.g., transportation requestor or transportation provider) to compute the change in the newly optimal state given these users in the network. Changes or improvements to the matching compute engine 804 may flow to the pre-request matching system 816, thereby delivering speed and accuracy of pre-request matches for all variants 818.

A previous dynamic transportation matching system may have a matching compute engine that can determine a likelihood of a match, calculate potential shared ride matches for shared rides ETA and ETD, and predict swaps. However, absent pre-request matching capabilities, these functions may all be performed post-request and be based on a selected mode and constraints. As such, pre-request offers of such a system may not benefit from the capabilities of swap prediction, potential shared ride matches determination, and/or match likelihood determination. For example, a home screen for requestors may only show providers that are located closest to the requestor, and any prediction of an ETA may not take into account possible swaps (e.g., a provider being re-matched to a different requestor) as a result of the requestor making a request. With such a system, requestors may experience a different ETA post-request than what was pre-request and displayed pre-request and may accordingly cancel a match resulting from the request.

The pre-request matching system 816 may improve pre-request offers by providing greater accuracy when showing nearby providers, predicted ETAs, estimated times to destinations (ETDs), and prices. A pricing subsystem may also use pre-request matching system 816 to determine the costs of providing transportation during peak times. Because pre-request matching system 816 may return results as if a global match that included the pre-request session in question had been performed, pre-request matching system 816 may account for possibilities such as swaps. Previously, it has not been possible to provide a match to an exact provider device without specifying a transportation mode and set of constraints. By accounting for such possibilities as swaps, ETA may be predicted with increased accuracy, and it may be possible also to determine an exact provider device that will be matched to a requestor device. Accordingly, the pre-request matching system 816 may address these issues. Additionally, the pre-request matching system 816 may account for potential swaps caused by a request in predicted ETA and may calculate potential shared ride matches for shared rides ETA and ETD. This capability may be realized by providing a subsystem that can be called to perform the same operations to predict matches as is used to match providers and requestors.

According to some implementations, the pre-request matching system 816 may exhibit various additional features and functionalities. For example, assuming provider acceptance or automatic acceptance, ninety-nine percent certainty of an optimal match may be obtained with end-to-end latency less than five-hundred milliseconds. Also, a client-side interface (e.g., transportation requestor device) and/or a server-side interface (e.g., presentation system) may call the pre-request matching system 816 with a mode, origin, destination, and other match parameters, and a returned result can be a filtered list of provider devices.

Another potential benefit of the pre-request matching system 816 is that it may provide accurate predicted ETA and report providers located nearest to a requestor for all modes, including shared rides, while providing additional opportunities for new products, features, and services. For example, a determination can be made if matches to private providers are available for a potential request by calling the pre-request matching system 816 with different combinations (e.g., combinatorial sets) of match parameters. In this example, each combination of match parameters that yields a speculative match (e.g., with a sufficiently low system cost to the transportation network as indicated by an objective function that evaluates global matching results) may indicate a potential transportation offering. Additionally, a determination can be made whether to suggest a walk pre-request by combining the pre-request matching system 816 with dynamic walking features. In this example, the results of an objective function that evaluates global matching results (based on any of a number of factors, including, e.g., maximizing the utilization of transportation resources within the dynamic transportation network, minimizing ETAs for requestors to be picked up by providers, minimizing ETDs for requestors to reach their specified destinations, increasing expected conversion rates of potential requestors and/or providers into transportation matches, decreasing detours in shared transportation, etc.) can be compared between the scenarios in which match parameters allow for a requestor to walk to a pick-up location and in which match parameters do not allow for a requestor to walk to a pick-up location. A transportation mode that asks a requestor to walk within a defined radius may match a requestor to a transportation route that has a waypoint within the defined radius. Such a defined radius may be affected by weather (e.g., reduced radius during precipitation), traffic conditions (e.g., blocked thoroughfares due to events or emergencies), and/or requestor preferences (e.g., maximum radius 5 minutes of walking). Also, with more accurate predictions, real-time offers may be provided with more confidence in an accurate pricing result, shared rides may be priced low dynamically when highly efficient (e.g., low ETA, low system cost, and/or high likelihood of matching, etc.) matches are available, and/or control can be affected over real-time availability by pricing private rides higher during periods of high demand. Further, when a user cancels a match, the pre-request matching system 816 can be used to show alternate providers to a requestor. If these alternates meet the preferences of the requestor, then the requestor may then select one of these alternate offers, thus swapping the requestor instead of resulting in a cancelation. Further, pre-request matching results for a session may be cached and used to seed matching post-conversion (e.g., a requestor has accepted an offer and is making a request using request parameters of the offer) to reduce latency of match cycles. Benefits can yet further be obtained for private cars by skipping a matching cycle and matching to a provider directly, especially if it is known that the cached speculative state 810 has not otherwise changed in a way that would impact the matches of requestors to providers (e.g., no nearby cancels, new requests, etc.). Further still, for shared rides, in the event of two matches with similar cost savings and different ETAs, the requestor can be presented with both pre-request matches for selection. In this case, using matching directly allows this endpoint to be used with a set of requests and providers, as opposed to only being able to use it for a single session. Further, pre-request matching can be called for all sessions (and forecasts) to create predicted prices (e.g., for providers, routes, etc.). Price sensitivity may be an attribute of a requestor for transportation services, which may be used as a constraint when performing predictive matching. Similarly, pre-request matching can be called with potential or forecasted providers for price prediction. Further, pre-request matching can be called with a variety of matching parameters for requests to construct different offers to provide to a transportation requestor, and transportation providers may similarly want to predictively match different matching parameters to choose preferences. Finally, forecasts of future potential matchable rides can predict an expected match efficiency of a session.

In some implementations, the pre-request matching system 816 may be viewed as an endpoint that adds any new transportation job to a cached, previously solved matching problem and returns a new solution. A pre-cached map may be updated every time the state of the transportation network changes as a result of a new assignment being made when a new transportation requestor requests or a new transportation provider goes online, and/or when such an assignment is accepted. As noted above, various issues can arise depending on how this endpoint is implemented, such as by introducing sessions into the stateless matching compute engine 804. However, all of the aforementioned concerns may be addressed or avoided by using a previously solved matching problem as a starting point. In this case, a solution may include a union of all unchanged sets of plans, each set being defined by the constraints and time at which they are calculated (e.g., matches that have not changed since a previous cycle of matching code execution) and new plans of zero-accept matchings (e.g., matches that are automatically accepted by providers, such as auto-accept mode providers, shared transportation mode, etc.), excluding matching groups that need acceptance, as they are in pending state. If there are no updates (e.g., cancels, requests, etc.), this union may represent the next matching cycle exactly. Running this state through the stateless matching compute engine 804 may produce exactly zero matching groups (e.g., no changes). In some examples, since ETA volatility can cause instability, the solution may be used with cached ETAs. Moreover, this approach may leverage the existing matching solution, may handle shared ride matches (e.g., by using the same matching processes as the matching compute engine), and may not require a new solver. Thus, adding a single request to the cached solution may be sufficient to accomplish pre-request match generation.

The properties that are needed for generating pre-request matches may include production of, at most, one matching group, which may contain the input job. Additionally, the only new ETAs may be those involving routes for pre-request matches determined for the input job, as all other ETAs may be cached. Further, complexity may scale linearly with each nearby driver and the job considered matchable to input.

Figure 9:
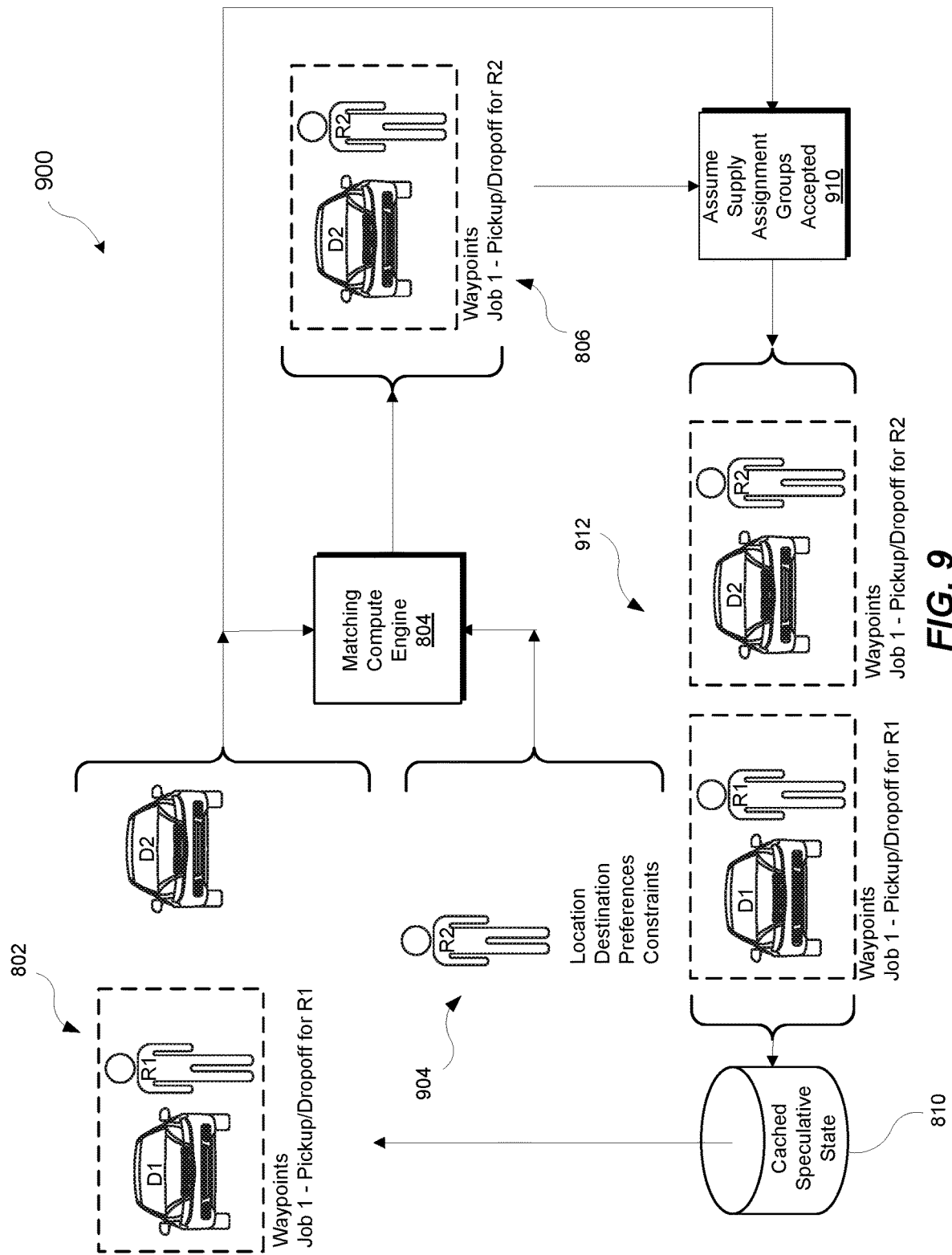
FIG. 9 is a block diagram illustrating an example determination of matches based on requests from transportation requestors in accordance with the present disclosure.

FIG. 9 is a diagram illustrating how matches may be determined by the matching compute engine 804 based on requests 904 from transportation requestors in accordance with the present disclosure. A dynamic transportation matching system 900 may have pre-request matching functionality. For example, dynamic transportation matching system 900 may have a matching compute engine 804 that retrieves a current transportation network state 802 from a cached speculative state 810 and receives requests 904 from transportation requestors. The current transportation network state 802 may include resources that indicate available transportation providers with their locations and vectors (i.e., bearings and velocities). The current transportation network state 802 may also include plans and supported ride types, where the plans include waypoints of planned routes and jobs that specify pickup and drop-off locations for requestors already matched to providers. In some examples, the matching cycle may occur periodically (e.g., every 500 milliseconds, every 2 seconds, etc.).

The requests 904 may represent incoming requests received since a previous matching cycle, and these requests 904 may include information for each requestor, such as pickup and drop-off location, the number of seats requested, the type of vehicle, and specified values or ranges of values for constraints such as detour (e.g., no more than two), wait (e.g., no more than 5 minutes), and walk (e.g., no more than 0.5 kilometers). In some implementations, information about providers (e.g., location, type of transportation mode, available seats, available car seats, etc.) who have come online since a previous matching cycle or who have completed a job may also be received and treated as requests 904.

The matching compute engine 804 may receive the current dispatch state 802 and the requests 904, and then may determine resource matching groups for the requests 904. These resource matching groups may represent the new matching plans that match requestors with providers, with waypoints for the matched routes and jobs that indicate pickup and drop-off locations for the new requestors. During this matching process, the matching compute engine 804 may perform determinations regarding whether requestors will walk to pick-up locations, shared ride matchings, swaps, and contention resolutions (e.g., by preventing requestors from being assigned the same transportation provider), and may do so only for the requestors and existing rides impacted by the matching of the requestors due to swap chains, etc. As such, a globally optimal solution may not need to be computed for the entire network. The resulting new matchings, which are the matching assignments 806 in this example, may include only new plans and changed plans due to swaps, and some of these plans may require acceptance by a provider. At 910, the matching assignments 806 may be combined with the current transportation network state 802 by adding the matching assignments 806 to the state 802, and the resulting new state 912 may be stored in the cache 810 for a next matching cycle.

Figure 10:
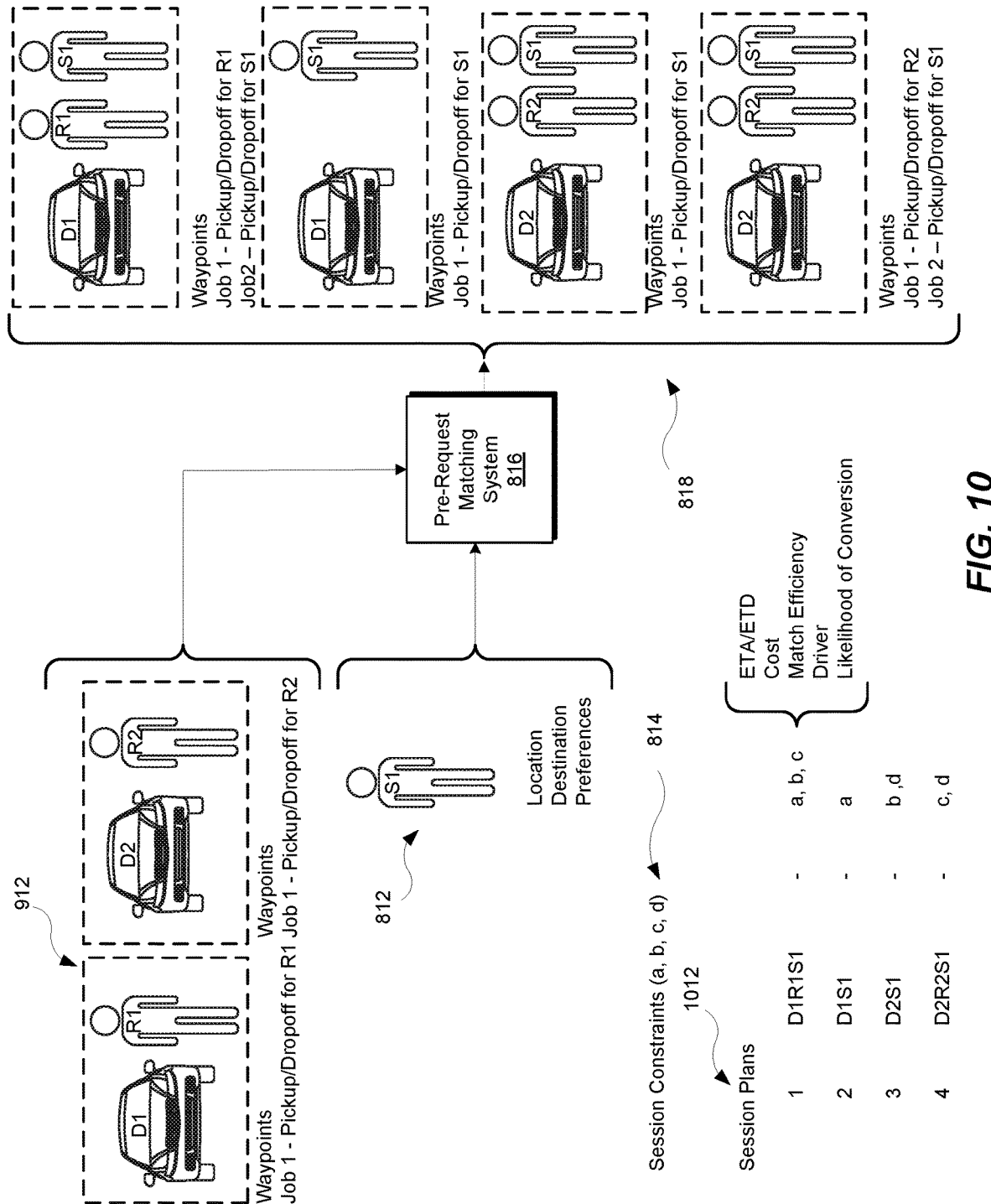
FIG. 10 is a block diagram illustrating an example determination of pre-request matches based on session information in accordance with the present disclosure.

FIG. 10 is a block diagram illustrating determination of pre-request matches based on session information 812 in accordance with the present disclosure. As illustrated in FIG. 8, and with reference generally to FIGS. 8-10, a pre-request matching system 816 may retrieve the new state 912 from the cache 810 employed by the matching compute engine 804 of the dynamic transportation matching system. This new state 912 may have been updated as the most recent matching cycle (e.g., no more than 2 seconds ago) of the dynamic transportation matching system, and thus represents real-time information about the state of the transportation network. This new state 912 of the network may reflect provider availability in the form of plans that indicate resource and matched routes with ETAs. The new state 912 may also reflect requested transportation jobs with job constraints as described herein.

Unlike the matching compute engine 804, the pre-request matching system 816 may not operate on multiple requests or even a single request. Instead, it may process session information 812 for a single session, or for multiple sessions in parallel. Session information 812 may be associated with a transportation requestor device that has a location, a destination, and user preferences, but that has not yet requested transportation by selecting a particular transportation mode and a particular set of constraints. It is also envisioned that session information 812 may include information about a provider device that has a location and provider type, but that has not yet come online (e.g., where a provider has not yet indicated availability to provide transportation). The pre-request matching system 816 may determine a per dynamic mode ranking of options that provides the predictions for all variants 818, and the system 816 may do so by performing a same or similar matching process as is performed by the matching compute engine 804, but with the assumption that only the session having the session information 812 were to request. As the session information 812 is not a request, and thus does not specify a particular transportation mode and set of constraints, the pre-request matching system 816 may not generate a single match for a single mode and set of constraints. Instead, it may generate multiple pre-request matches for a plurality of different modes in combination with various sets of constraints, and these matches may be ranked within each mode, based on constraints, to produce the per dynamic mode ranking of options. Such rankings can be based on constraints 814 such as ETA/ETD, cost, match efficiency, provider, and likelihood of conversion (i.e., likelihood that the requestor or provider of the session will choose to participate in the plan for the ride). In some implementations, and as detailed below with reference to FIGS. 16-23, the ranking can be performed at least in part by optimizing dimensions of a constraint space and combining the optimized dimensions. The per dynamic mode ranking of options may thus constitute a set of session plans 1012, each plan having a set of constraints 814 (e.g., ETA/ETD, cost, match efficiency, provider, and likelihood of conversion). The ranking of the session plans may be based on one or combinations of the set of constraints for the plan (e.g., based on ETA, match efficiency, system cost, likelihood of conversion, etc.).

Figure 11:
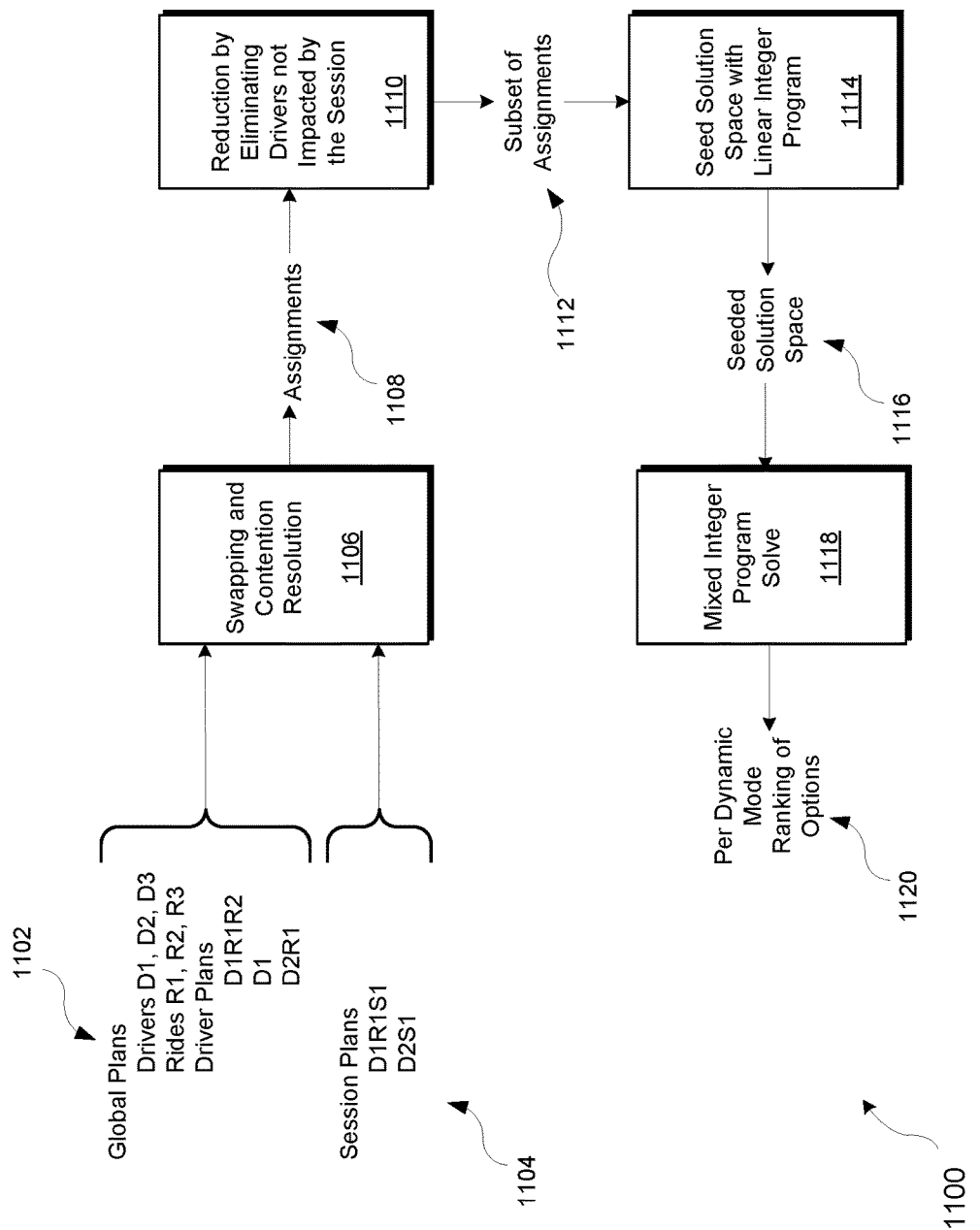
FIG. 11 is a block diagram illustrating additional details of an example determination of pre-request matches in accordance with the present disclosure.

FIG. 11 is a block diagram illustrating additional details of determination of pre-request matches by the pre-request matching system in accordance with the present disclosure. Process 1100 may involve determining matches to shared rides with walks, performing contention resolution (i.e., to ensure that two pre-request sessions are not matched to the same provider device), and employing various techniques (e.g., reduction at 1110, seeding at 1114) to reduce computation time (e.g., to less than 400 milliseconds). In this way, the pre-request determination system can cycle at a rate sufficiently fast (e.g., every 5 seconds) to generate pre-request matches that have accurate ETAs/ETDs and prices based on the real-time information from the cache of the dynamic transportation matching system.

The new state retrieved from the cache of the dynamic transportation matching system may provide a set of global plans 1102 as previously described. The session information can be used to generate a set of session plans 1104 (e.g., plans that only include the session matched to providers). For example, for a requestor device session, ETAs can be determined for potential routes using a greedy algorithm for each provider having sufficient available seats (e.g., each unmatched provider and/or shared ride provider having available seats). Such an approach can potentially limit the analysis to a number (e.g., 50) of nearest providers. For an offline provider device session, potential plans can be generated that involve the provider device and devices of requestors waiting in a queue and that meet a reasonable service threshold. Here, a service may be defined as an ability to complete a transportation request under different constraints and attributes. For example, potential plans can be generated that involve the provider device and devices of requestors waiting in a queue and that have positions that are within a defined vicinity of the provider device.

The queueing transportation mode may allow requests to be pooled, analyzed, and delayed until matched for system optimization and provider utilization. Accordingly, this mode may enable users to wait for a lower price on private cars, which may advantageously build a stock of demand that enables efficient matching of requestors to providers, thus serving more rides. Using inheritance features of object-oriented programming that allow extension of transportation modes in defining new modes by combining attributes of previously defined modes, the queueing transportation mode may be created as a combination of a private car transportation mode with a waiting time limit. This mode may increase the number of requestors who can be served by providers during a peak time (e.g., when private cars are in high demand and under supplied or at risk of under resource). For this queuing transportation mode, a presentation system may curate only matches for private cars that meet the wait time limit and may present a ranked list of these matches. An order of the ranked list may be based on various metrics (e.g., price, ETA, user preferences, likelihood of conversion, etc.) as previously described.

In generating the set of session plans, process 1100 can evaluate potential routes. Potential routes can be evaluated by taking walking distances into consideration as described herein. Briefly, walks may be determined by searching, within a walk radius (e.g., a distance to be traveled by a transportation requestor to a pick-up location) of the requestor device location, for waypoints of routes of existing plans. If user preferences indicate that a requestor is not willing to walk, this radius may be reduced to zero (or substantially zero). User preferences can also limit the walk radius, as can other conditions such as rainy weather.

Once the session plans have been determined, process 1100 may involve performing swapping and contention resolution at 1106. Swaps and contention resolution are described in greater detail below with reference to FIGS. 12 and 13. Briefly, a matched transportation requestor device may be swapped from one transportation provider device to another if doing so would improve the network, for example, by lowering overall ETA and/or average system cost. Such a swap may result in a chain of additional swaps in the same pre-request matching cycle (e.g., because a requestor device swapped to match with a different provider device may displace another requestor device previously matched with the different provider device, creating a need for the other requestor device to be swapped, which may potentially cause a further conflict and require a further swap, etc.). Also, "contention" may refer to a scenario in which multiple sessions are processed in parallel, potentially creating conflicting match that match a provider device to more than one requestor session. Accordingly, "contention resolution" may refer to the system resolving this contention by picking which match to preserve. The system may determine which match to preserve based on any of a variety of factors, including, e.g., which match would provide an overall improvement to ETA, which match would provide an overall improvement to transportation network conditions, which match would provide an overall improvement to system cost, etc. Thus, when two pre-request matches of different sessions are matched to the same provider device, the match that provides the best ETA, that demonstrates the greatest likelihood of conversion, and/or that most benefits the transportation network may be offered to that session, whereas the match for the other session is eliminated.

Continuing with reference to FIG. 11, once the assignments 1108 have been determined as a result of swapping and contention resolution, process 1100 may perform a reduction operation at 1110 by eliminating providers not impacted by the session (e.g., no match is made of the session to that provider, and no swap is triggered by the session that involves that provider). This reduction operation may involve starting with all of the providers and requestors who are in plans with the session and adding additional providers from the global plans who are matched with those requestors to obtain a subset of matchings 1112. Adding the additional drivers can potentially pull in the entire global solution (e.g., if every provider is impacted by a swap chain triggered by the session), so a threshold (e.g., maximum swap chain length) may be used to stop following the chain of impact that could be caused to the network by the potential session matching plans.

The subset of matchings 1112 may be used at 1114 to seed a solution space using a linear integer program (that, e.g., defines an objective function to maximize or minimize and constraints). The seeded solution space 1116 may then be used as input to a mixed integer program 1118 to obtain the per dynamic mode ranking of options 1120. The technique of seeding the solution space may be a relatively computationally inexpensive process that obtains a solution that is close to a globally optimal solution. As such, seeding the solution space at 1114 is a technique that assists in reduced computation time (e.g., to less than 400 milliseconds) without significantly impacting the accuracy of the pre-request matches.

Figure 12:
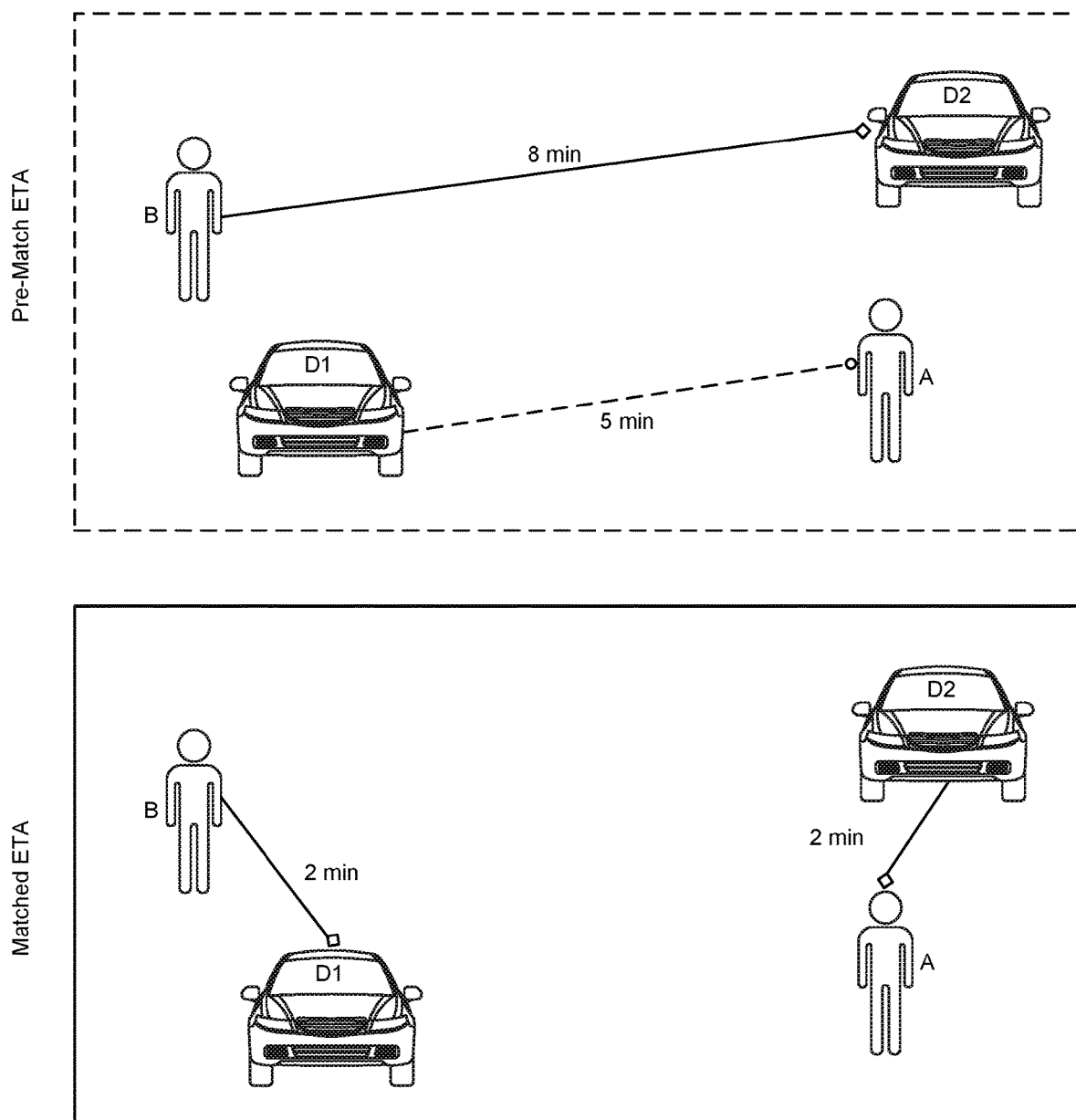
FIG. 12 is a diagram illustrating an example swap determination in accordance with the present disclosure.

FIG. 12 is a diagram illustrating an example swap prediction in accordance with the present disclosure. If swaps are not accounted for in a predicted ETA, then a session may show predicted ETAs that are not accurate and that result in greater discrepancy after requesting. This situation is illustrated where a requestor A may be shown a closest nearby provider D1 with an ETA of five minutes, because a closer provider D2 may already be matched to another requestor B with an ETA of eight minutes. When the requestor A submits a request, the matching compute engine may trigger a swap because it is determined that the swap will result in a lower overall ETA, lower average cost, or both. Accordingly, the provider D2 may be re-matched to requestor A, and provider D1 may be matched to requestor B, each with a matched ETA of two minutes. Pre-request matching as described herein may allow for such a triggered swap to be predicted pre-request, which may allow for the predicted ETA to more accurately reflect the matched ETA. Advantageously, the swap prediction can (e.g., before requestor A has made a request) increase session conversion (e.g., can encourage the requestor A to accept the offer and make the request) and decrease time per ride by encouraging requestors to make requests that trigger time saving swaps.

Figure 13:
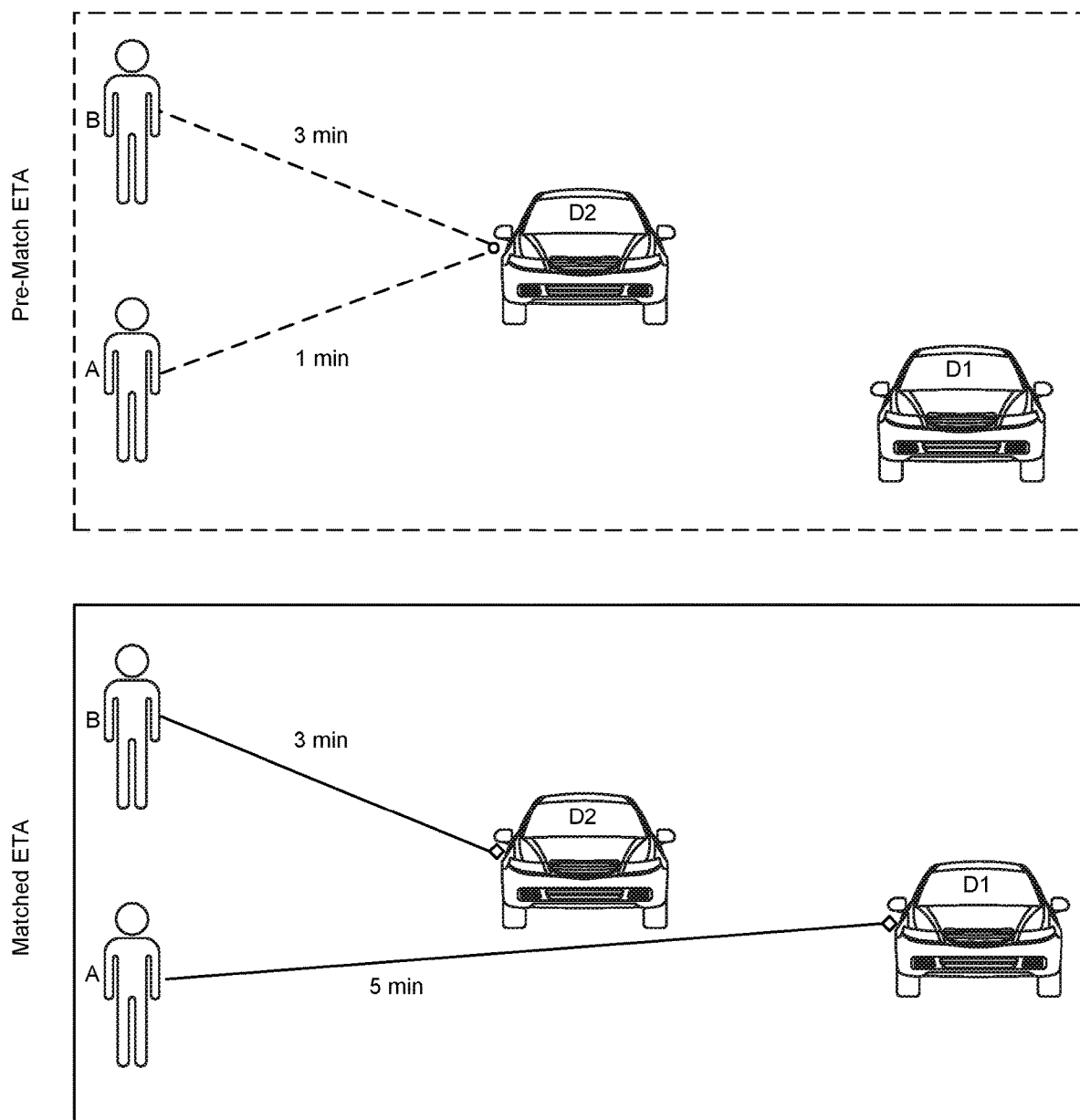
FIG. 13 is a diagram illustrating an example driver contention resolution in accordance with the present disclosure.

FIG. 13 is a diagram illustrating an example provider contention resolution in accordance with the present disclosure. Without pre-request match determination, multiple sessions can be notified of the same provider D1 nearest to their respective locations, although only one of the requestors A and B may be matched to provider D1 when a request is made. As detailed herein, a presentation system can resolve this sort of contention and avoid offering the same provider D1 to both requestors. As a result, predicted ETA can more closely correspond to an ETA post-request, which can decrease the rate of post-request cancelations by requestors.

In general terms, a presentation system may serve as an interface between a source of information about transportation provider availability (e.g., the pre-request matching system) and transportation requestor devices. The presentation system may be implemented as part of a dynamic transportation matching system and have server functionality. In some implementations, a client application running on a transportation requestor device may poll the presentation system for information about provider availability, and the presentation system may interact with the pre-request matching system to obtain the information, curate and arrange the information, and present the information to the devices.

Figure 14:
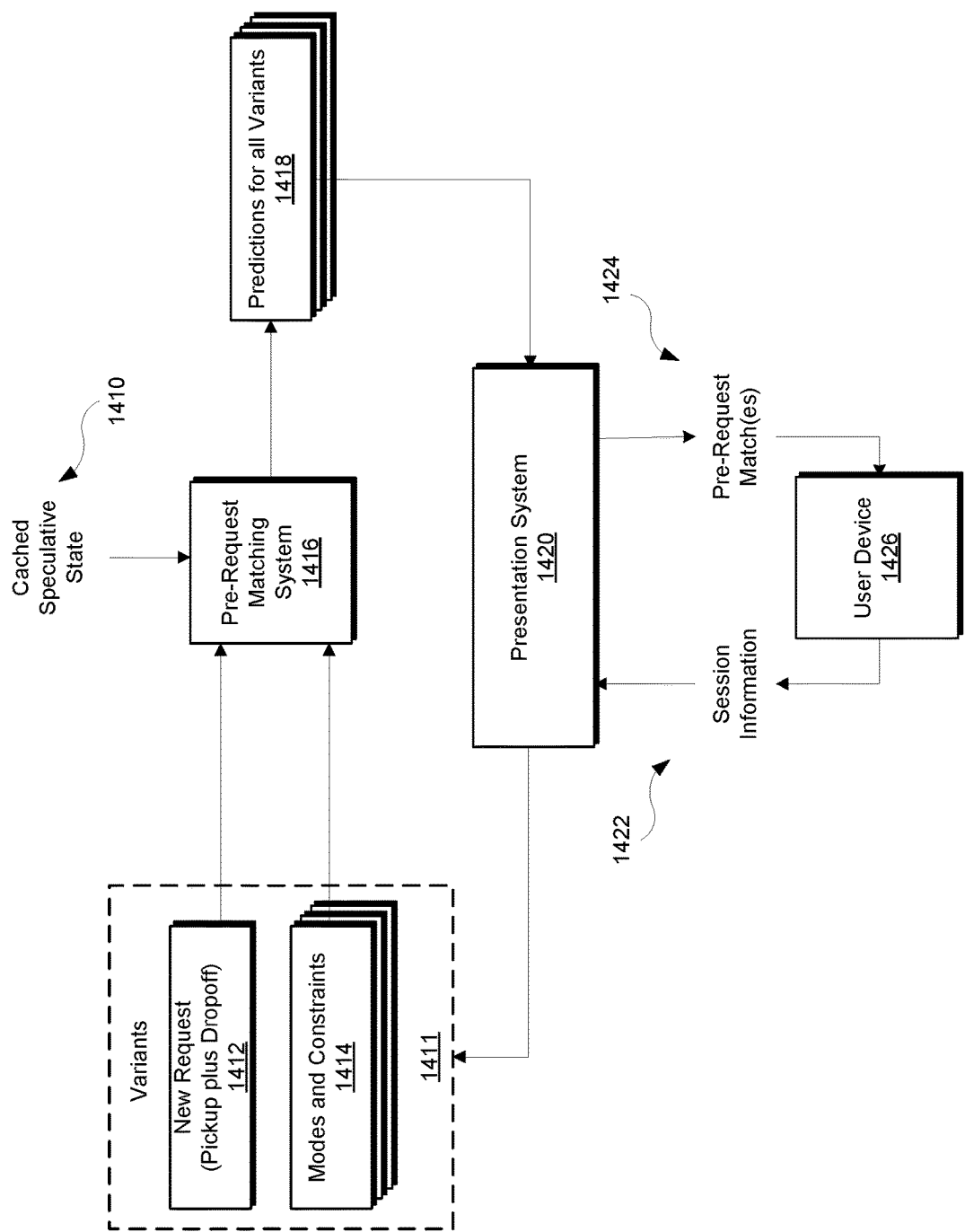
FIG. 14 is a block diagram illustrating an example presentation system receiving pre-request matches from a pre-request matching system and communicating the pre-request matches to a user device in accordance with the present disclosure.

FIG. 14 is a block diagram illustrating a presentation system 1420 receiving pre-request matches, that make up predictions for all variants 1418, from a pre-request matching system 1416 and communicating at least part of the pre-request matches 1424 to a user device 1426 in accordance with the present disclosure. The user device 1426 may be a smartphone, a vehicle navigation system, or any other computing device having communication capabilities and user interface functionality. The user device 1426 may be a transportation requestor device or a transportation provider device.

As a transportation requestor device, the user device 1426 may transmit session information 1422 (e.g., requestor current location and/or pickup location, requestor destination location and/or drop-off location, requestor preferences, etc.) to the presentation system 1420 when the session is opened (e.g., the requestor opens an application on the requestor's device) and either the user has entered destination information or the destination is otherwise known. For example, the destination may be known from a commuting pattern, appointment in a calendar application, reservation (e.g., scheduled flight, movie tickets, etc.), or another source of the destination information.

More generally, the session information may include the user's current location, destination, and/or user preferences. Alternatively, the user preferences may be stored by the presentation system 1420 as user data of a dynamic transportation matching system, as described below with reference to FIGS. 50-53.

Upon receiving the session information 1422, the presentation system 1420 may communicate variants 1411, such as request parameters, such as pickup and drop off locations 1412, and modes and constraints parameters 1414, to the pre-request matching system 1416. The pre-request matching system may access the cached speculative state 1410 and may generate predictions for all variants 1418, which may be the pre-request matches made available to the presentation system 1420. The presentation system may receive the pre-request matches as predictions for all variants 1418 and may communicate at least some of the pre-request matches to the user device 1426. For a transportation requestor user, the pre-request matches may be curated and arranged by the presentation system as described herein (e.g., by ranking, price, etc.). For a transportation provider device, the pre-request matches 1424 may include a pre-request match to a transportation requestor device that can be accepted instantly if the transportation provider comes online. This operation is described in greater detail below with reference to FIGS. 37-40.

Figure 15:
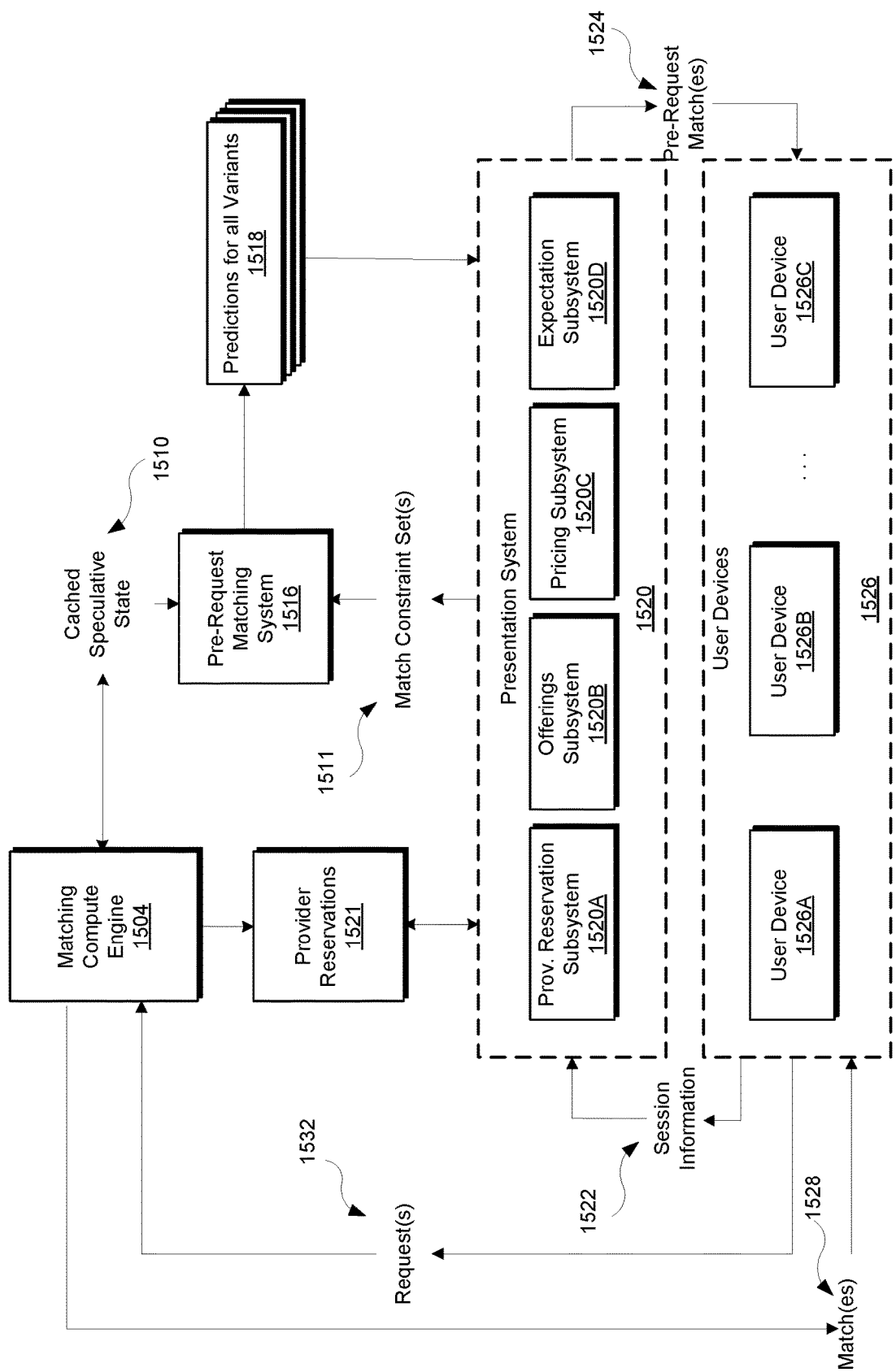
FIG. 15 is a block diagram illustrating an example presentation system having reservation functionality in accordance with the present disclosure.

FIG. 15 is a block diagram illustrating an example presentation system having reservation functionality in accordance with the present disclosure. Similar to the system of FIG. 14, presentation system 1520 may receive pre-request matches as predictions for all variants 1518 from a pre-request matching system 1516 and may communicate at least a portion of the pre-request matches 1524 to user devices 1526 in accordance with embodiments of the present disclosure. Upon receiving session information 1522 from user devices 1526, the presentation system 1520 may communicate match constraint sets 1511, such as request parameters and modes and constraints parameters, to pre-request matching system 1516. Pre-request matching system 1516 may access cached speculative state 1510 (e.g., which may be maintained and utilized by a matching compute engine 1504), and may generate predictions for all variants 1518, which may be made available to the presentation system 1520 (e.g., as pre-request matches displayed on a user device). The presentation system 1520 may receive the pre-request matches and may communicate at least some of the pre-request matches 1524 to the user devices 1526.

Presentation system 1520 may have a reservation subsystem 1520A, an offerings subsystem 1520B, a pricing subsystem 1520C, and an expectation management subsystem 1520D that can track ETAs of accepted matches and subsequently provide upgrades or other compensation or incentives to requestors when ETAs are not met. The offerings subsystem 1520B and pricing subsystem 1520C may have functionality as described herein with reference to FIG. 45 and as further detailed herein, and the expectation management subsystem 1520D may have functionality detailed herein with respect to FIGS. 43 and 44. Presentation system 1520 may receive session information 1522 from multiple user devices 1526, including device 1526A, device 1526B, and device 1526C. As a result, presentation system 1520 can receive matches for multiple sessions, can resolve contention between the sessions, and can track the offers made to the different devices.

Contention resolution can be performed in any of a variety of ways. In some examples, contention resolution may be performed by comparing ranked lists of matches (e.g., ranked by ETA, system cost, match efficiency, likelihood of conversion, etc.) for different requestor devices to detect incompatible matches and remove incompatible matches from at least one of the lists. Resolving contentions based on certain factors may benefit transportation requestors, transportation providers, and/or the dynamic transportation network. For example, resolving contention based on ETA may improve overall requestor satisfaction (by, e.g., improving the average ETA for providers to pick up requestors). In addition, resolving contention based on ETA may increase the likelihood that the system can find a new match with a comparable (or better) ETA for the requestor whose match (with a longer ETA) is dropped. Resolving contentions based on system cost may improve overall matching results across the dynamic transportation network (e.g., by resolving the contention in favor of the requestor whose request would be more costly to fulfill via an alternative match). Resolving contentions based on match efficiency may improve the experience of transportation providers and/or other transportation requestors who share a ride with a high match efficiency. Resolving contentions based on likelihood of conversion may improve the experience of transportation providers (whose matches may be less likely to be cancelled) as well as overall transportation network efficiency (by not wasting transportation resources on matches that will be cancelled). In one example, a contention may be resolved by selecting a requestor based on which session is older (e.g., was opened first or has been waiting in a queue the longest). Alternatively, the presentation system may assess a metric, such as average ETA or system cost savings, for each possible contention resolution solution, and select the solution that results in an optimal result for a selected metric (e.g., lowest average ETA or system cost). For any changed ranked lists, updated offers may be sent to the respective requestor devices. However, in resolving contention, the presentation system 1520 may also prevent provider devices that have been reserved for a session from being promised to another session, as described below.

Offers can be made that present, to transportation requestors, exact transportation providers that have elected to automatically accept matches, or for which acceptance by providers is otherwise not required (e.g., shared mode), and specific transportation providers for such offers may be reserved for a period of time. Subsystems 1520A-1520D may communicate with one another. In this case, reservation subsystem 1520A may store reservations 1521 for the transportation requestors, and these stored reservations may be accessed by matching system 1504. Accordingly, matching system 1504 can avoid matching that transportation provider to anyone else for the duration of the reservation, and presentation system 1520 can eliminate any pre-request match would attempt to promise the same transportation provider to another requestor for the duration of the reservation. Such reservations may have predetermined durations (e.g., thirty seconds) that allow a transportation requestor sufficient time to select the offer, and an indicator may be displayed to the transportation requestor to communicate time remaining to accept the offer. In some implementations, the duration of the reservation may be dynamically determined, for example, to be longer than a default duration when the provider-specific match is of particular benefit to the transportation network, and/or if the likelihood of conversion is determined to be above a threshold. Conversely, a duration may be shorter than a default duration when the benefit to the network (e.g., the utilization of transportation resources within the network) and/or likelihood of conversion falls below the threshold or another threshold. When the offer is accepted, a request 1532 may be sent to the matching system 1504, and this request 1532 may be sent directly to the matching system 1504. A corresponding match 1528 may be communicated to the requesting user device 1526.

Accordingly, either the matching system 1504 or the presentation system 1520 may remove a corresponding reservation in response to the request. Similarly, the reservation subsystem 1520A may remove the reservation upon expiration of the reservation.

Figure 16:
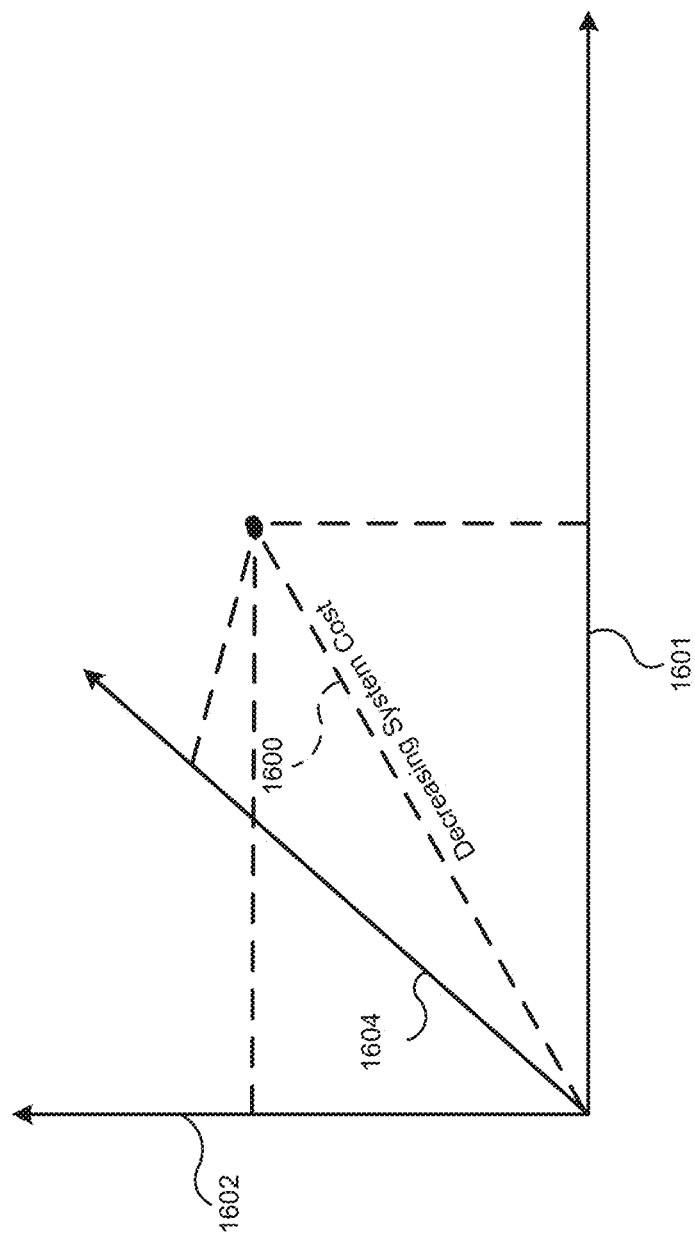
FIG. 16 is an example three-dimensional graphical illustration of decreasing system cost as a function of price, time, and inconvenience tradeoffs in accordance with the present disclosure.
Figure 17:
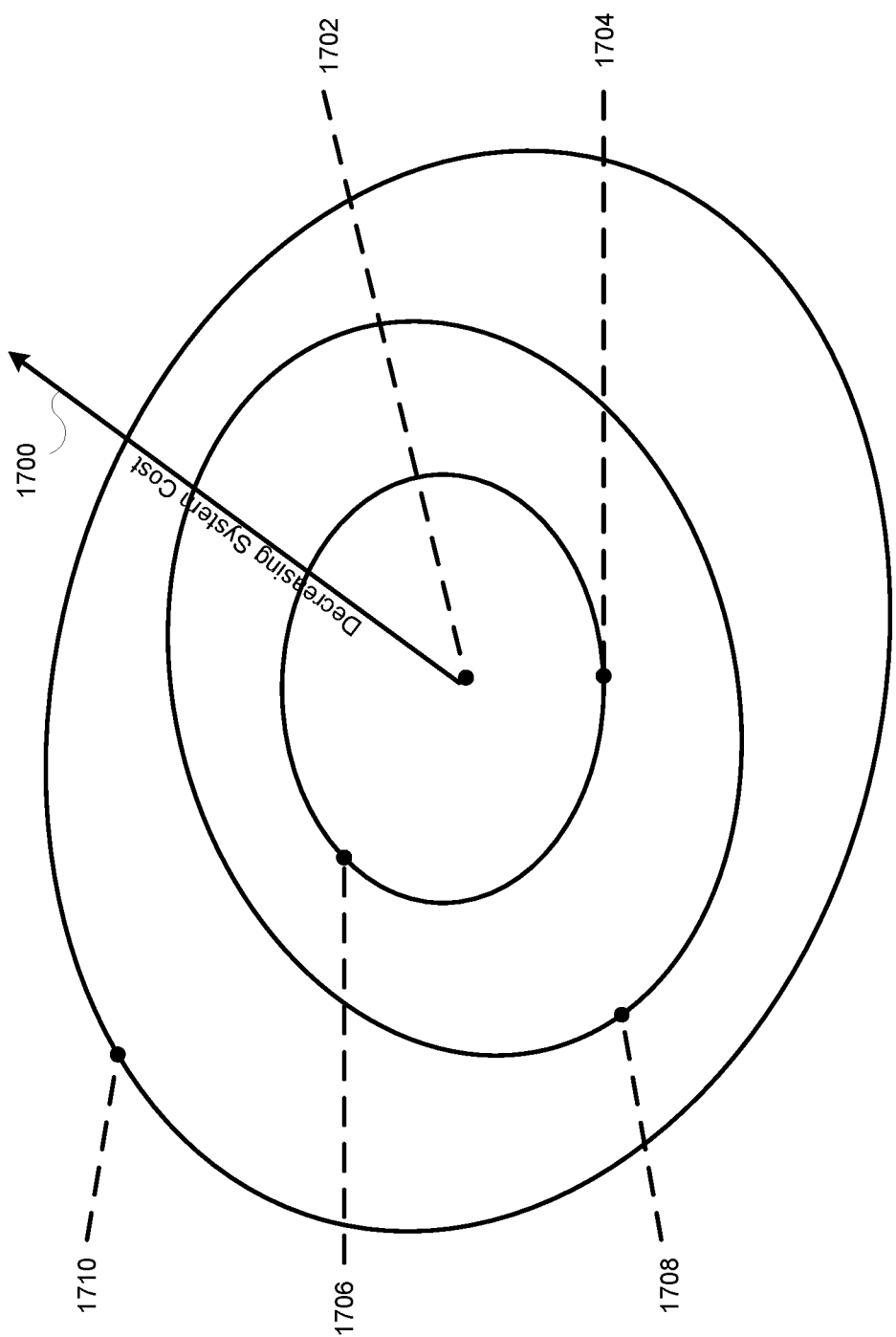
FIG. 17 is an example two-dimensional graphical illustration of decreasing system cost as a function of price, time, and inconvenience tradeoffs in accordance with the present disclosure.

FIGS. 16 and 17, respectively, are example three-dimensional and two-dimensional graphical illustrations of decreasing system cost 1600 and 1700 as a function of price, time, and inconvenience tradeoffs (e.g., walking 1602, detour 1604, batching/queuing 1601) in accordance with the present disclosure. System cost 1600 and 1700 reflect in part the availability of providers, which may impact how efficiently the system can match requestors to providers (in terms of ETA, etc.), how much overlap the system can achieve with shared rides, how much flexibility the system has in ensuring transportation resources are routed to an area of undersupply, and how the example constraints (e.g., no walking, no detour, no batching, no queueing) impact system cost (e.g., by reducing the flexibility with which the matching system may determine matches, potentially causing the matching solutions having the lowest ETAs to be less efficient than if fewer constraints were present). As shown in FIGS. 16 and 17, the system cost to a dynamic transportation system may be reduced (e.g., transportation resources may be allocated in increasingly optimal ways) as a matching system considers increasing tradeoffs. The total space of configurable modes and offers may grow combinatorially with each configuration dimension that is added. This complexity may be particularly pronounced for shared rides (e.g., due to the many potential pickup and drop-off locations), but may apply across modalities.

Figure 19:
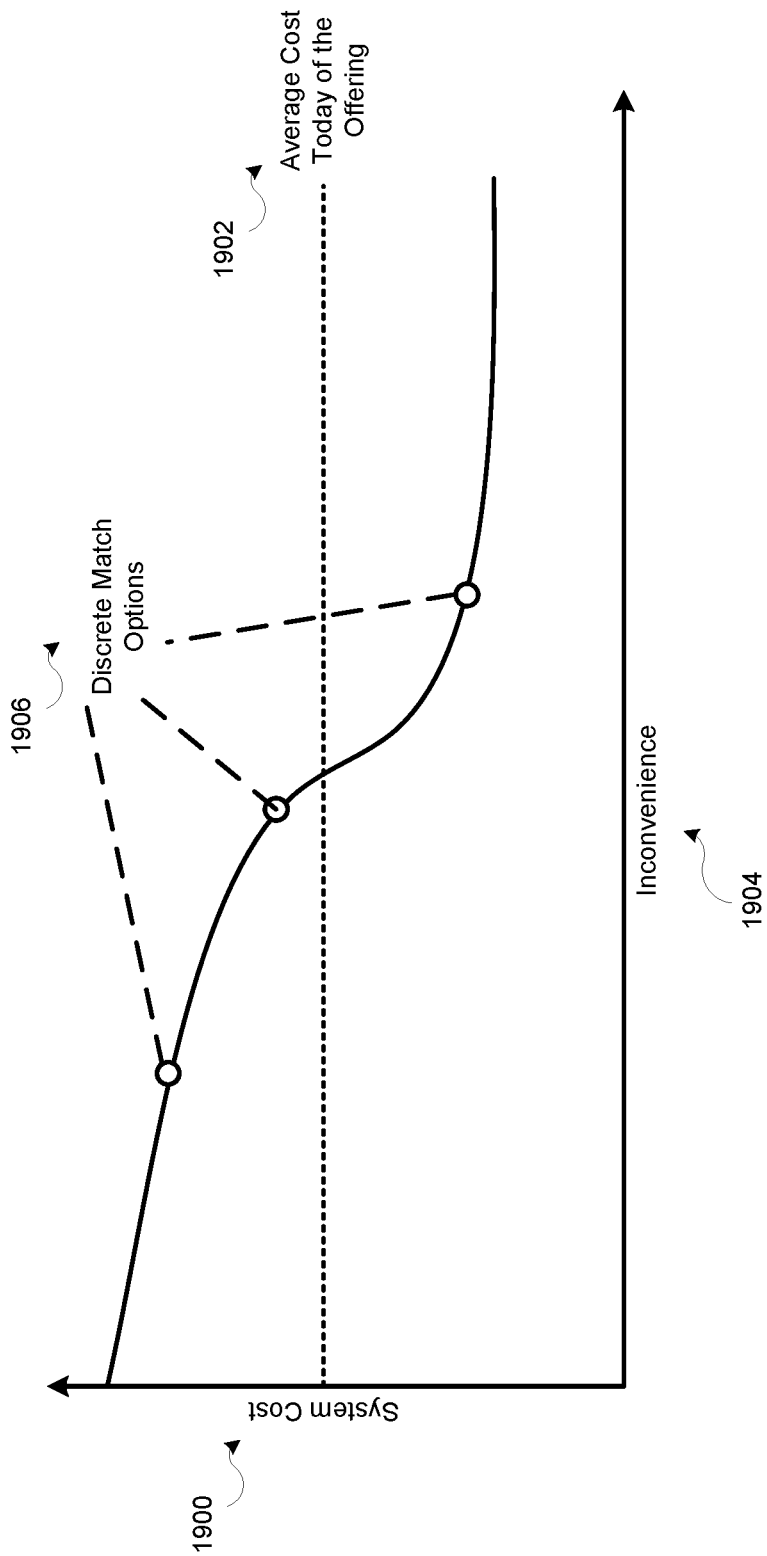
FIG. 19 is a graphical illustration of example system cost estimation as a function of inconvenience in accordance with the present disclosure.

As shown in FIG. 17, getting to a lower system cost may mean sharing resources, which is a higher cardinality problem than matching one requestor per one provider. In this example, a maximum constraint problem space is defined by the outer circle, which corresponds to a mode 1710 having shared rides and a wait in a queue. The space can be reduced by starting at the outer circle and dropping options that result in ETAs above a threshold (e.g., 20 minutes). Thus, moving in from the outer circle, options can be considered for modes corresponding to shared rides 1708, low detour shared rides 1706, direct vehicles combined with waiting in a queue 1704, and direct vehicles 1702. As shown in FIG. 19, a constraint space can be evaluated by observing the derivative of the reduction of the constraint option space as that constraint is constricted, alternating which dimension is constricted to determine impact on the number of options available and/or cost of a plan (i.e., marginal cost).

Figure 18A:
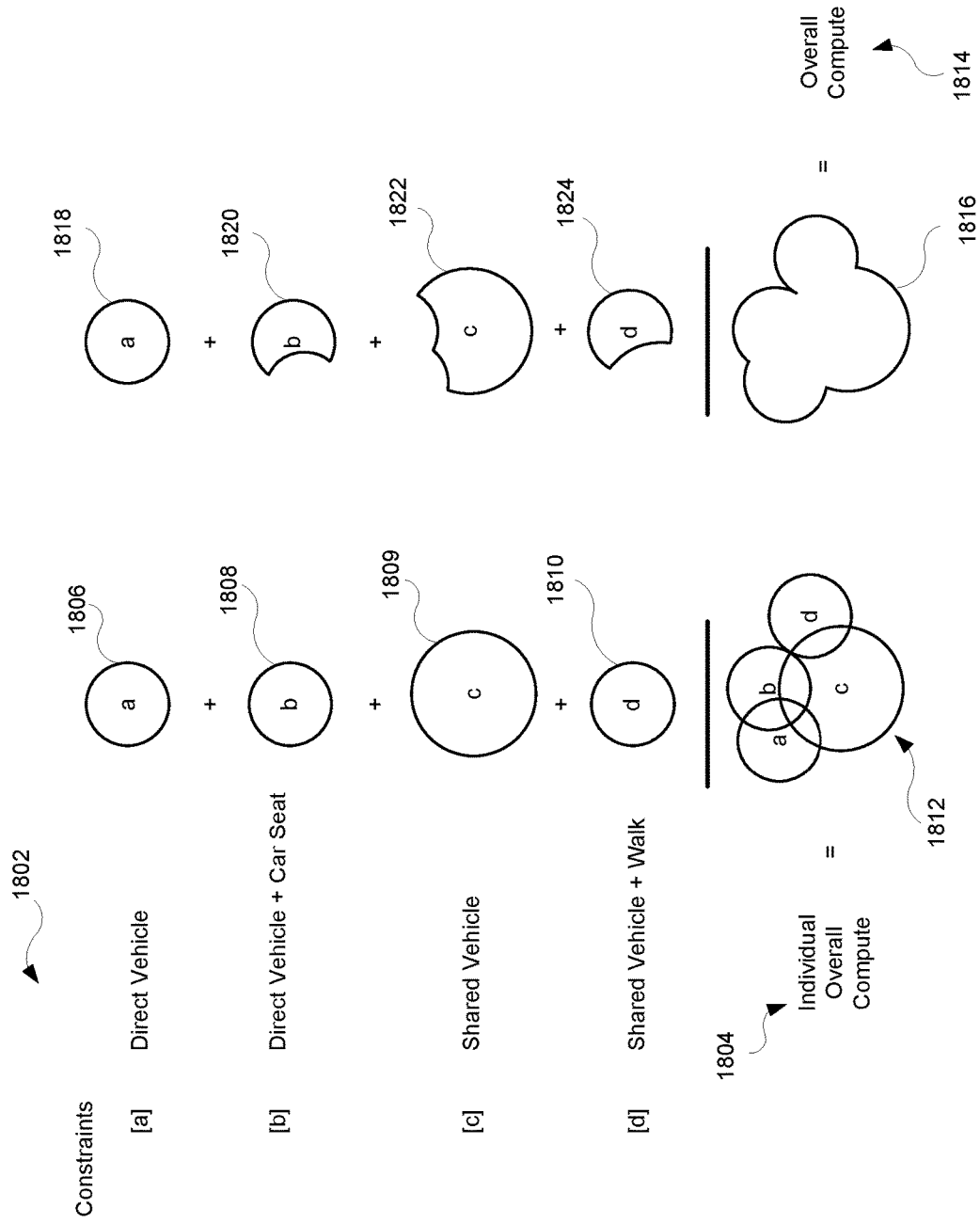
FIG. 18A is a diagram illustrating an example determination of predicted ETAs for a plurality of modes and constraints in accordance with the present disclosure.

FIG. 18A is a diagram illustrating an example determination of predicted ETAs for a plurality of modes and constraints in accordance with the present disclosure. A process 1800 of determining predicted ETAs may determine ETAs for various request constraints 1802, such as a direct vehicle constraint, a direct vehicle plus car seat constraint, a shared vehicle constraint, and a shared vehicle plus walk constraint. One way to compute the ETAs is to compute the ETAs for provider-requestor pairs for each constraint individually, but this process leads to an individual overall compute 1804 that is the sum of all of the individual computes for constraint sets 1806-1810. A less expensive overall compute 1814 may recognize that some of these pairs are contained in more than one of the constraint sets 1806-1810, such that the constraint sets overlap as shown at 1812. By determining only those ETAs for reduced constraint sets 1818-1824 that have not yet been determined for others of the reduced constraint sets 1818-1824, and reusing the ETAs from the other spaces, the overall compute may be reduced as shown at 1816. While the foregoing uses ETAs as an example of an attribute of potential matches that can be efficiently evaluated across a constraint space, it may be appreciated that other attributes of a potential match (e.g., probability of conversion) may be evaluated using the same approach.

Figure 18B:
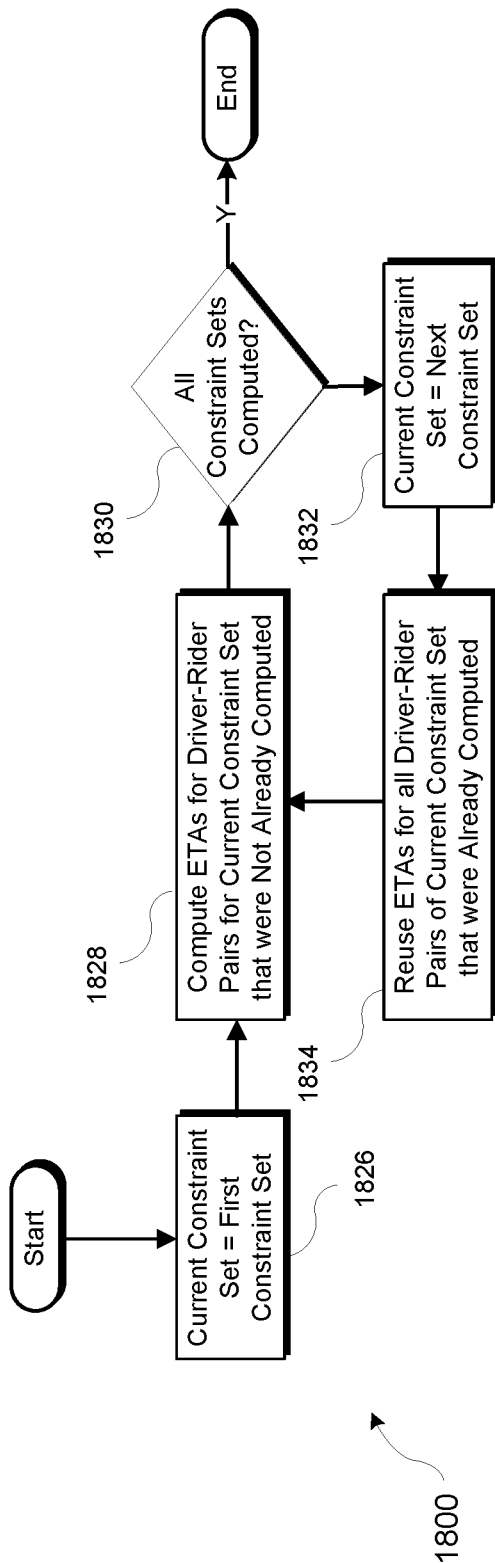
FIG. 18B is a flow diagram illustrating an example determination of predicted ETAs for a plurality of modes and constraints in accordance with the present disclosure.

FIG. 18B illustrates an example process 1800 for computing ETAs for prospective matches by constraint set. As shown in FIG. 18B, process 1800 may begin at block 1826 by setting a current constraint set variable to a first constraint set. Using FIG. 18A as an example, process 1800 may start with constraint set 1806, setting constraint set 1806 as the current constraint set. Process 1800 may then, at block 1828, compute ETAs for provider-requestor pairs that were not already computed. Continuing with the example of FIG. 18A, none of the provider-requestor pairs for constraint set 1806 may have previously been computed, so all provider-requestor pairs for constraint set 1806 may be computed. Process 1800 may then, at block 1830, determine if ETAs for all constraint sets have been computed. If so, the process may end; otherwise, the current constraint set variable can be reset, at block 1832, to the next constraint set. Continuing with the example of FIG. 18A, after computing ETAs for constraint set 1818, process 1800 may determine that ETAs for constraint sets 1808, 1809, and 1810 have yet to be computed, and may, therefore, set a new constraint set (e.g., constraint set 1808) as the current constraint set. Following block 1832, at block 1834, for the current constraint set, process 1800 may proceed by reusing ETAs for all provider-requestor pairs that were already computed. Continuing with the example of FIG. 18A, when computing ETAs for constraint set 1808, process 1800 may first reuse ETAs previously computed for constraint set 1806, made possible due to the overlap between constraint sets 1806 and 1808 as shown in 1812. Following block 1834, process 1800 may return to block 1828. Continuing with the example of FIG. 18A, this time process 1800 may not need to compute ETAs for all of constraint set 1808 at step 1834 because ETAs previously computed for constraint set 1806 have been reused, leaving only ETAs for provider-requestor pairs 1820 to be computed. In a similar fashion, constraint sets 1809 and 1810 may each in turn be selected as the current constraint set, and, in each case, previously computed ETAs may be reused, requiring only provider-requestor pairs 1822 and 1824, respectively, to be computed. After ETAs for constraint set 1810 are computed, at block 1830 process 1800 may determine that all constraint sets have been completed, and process 1800 may terminate.

Process 1800 may thus identify commonality between all of the different options and avoid duplicating solve efforts for those common pieces. For example, as depicted in FIG. 17, a set of constraints for a shared-ride option that involves the requestor walking to a pick-up location is the most complex to a degree that all provider-requestor pairs are included. Therefore, once ETAs for all of the pairs for the shared-ride-with-walking option have been solved, then there is no need to solve each of the pairs again for the other options.

FIG. 19 is a graphical illustration of an example system cost 1900 estimation in accordance with the present disclosure. System cost 1902 is graphed as a function of inconvenience 1904 (e.g., walking, detour, batching/queuing). As noted above, a constraint space can be evaluated by observing the derivative of the reduction of the constraint option space as that constraint is constricted, alternating which dimension is constricted to determine impact on the number of options available and/or cost of a plan (e.g., marginal cost of adding the plan). Pricing can incorporate additional information from the discrete options 1906 (i.e., provider-specific matches) generated by matching requestors to providers, and these options may be pre-request matches. Accordingly, pre-request matches may not only result in more accurate pre-request ETAs but also produce more accurate prices, which may be determined using a more accurately estimated system cost and one or more policies for determining price for a pre-request match based on system cost and other constraints (e.g., past unmet requestor expectations, current lack of transportation resources to support a particular mode, etc.).

Figure 20:
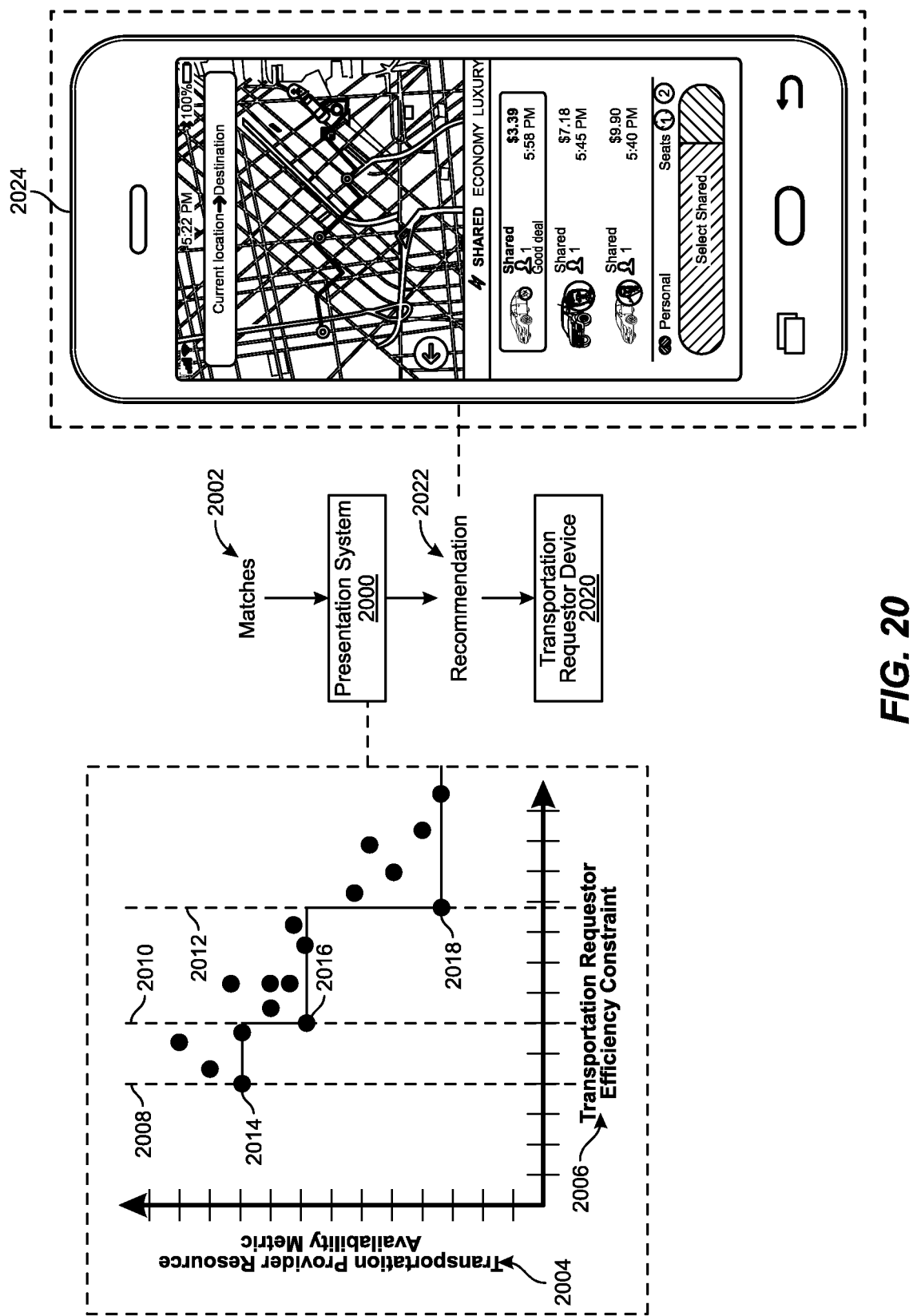
FIG. 20 is a diagram illustrating an example presentation system performing constraint space partitioning and communicating trip recommendations to a transportation requestor device in accordance with the present disclosure.

FIG. 20 is a diagram illustrating a presentation system 2000 performing constraint space partitioning 2008, 2010, 2012 and communicating recommendations 2022 for trips 2024 to a transportation requestor device 2020 in accordance with the present disclosure. The presentation system 2000 may analyze the tradeoff between a transportation provider resource availability metric 2004 and a transportation requestor efficiency constraint 2006. One way to analyze this tradeoff may be to sort the pre-request matches and, for a median value, determine if there is a fundamental cost difference and a fundamental change in ratio. A cost difference may be determined as a difference between an average cost of matches above a median cost value and average cost of matches below the median value. A fundamental cost difference may then be determined by observing that a magnitude of an absolute value of this cost difference exceeds a predetermined threshold (e.g., more than 10% of median cost). Similarly, a change in ratio may be determined as the derivative of the cost to inconvenience curve. A fundamental difference in this change in ratio may then be determined by observing that a magnitude of an absolute value of the derivative exceeds a threshold. If both there is both a fundamental change in ratio and a fundamental cost difference, then the matches can be separated. Another way to analyze the tradeoff may be to iteratively evaluate each pre-request match and find points at which a fundamental change in cost structure is observed. For example, a new product may be defined for each 10% change by partitioning the space at each 10% change in inconvenience. For example, with inconvenience plotted on the abscissa, nine evenly space partitions may be made of the abscissa between the origin and the match of greatest inconvenience. Then a predetermined number (e.g., three) of the lowest cost matches in each partitioned region may be used to determine ranges of cost and inconvenience (e.g., ETA, walking distance, etc.) for each of ten products.

A further way to analyze this tradeoff is for the presentation system 2000 to identify matches 2002 in the constraint space that exhibit local minima 2014, 2016, 2018 with respect to the metric 2004. A cost threshold may be set to the lowest cost yet observed while iteratively evaluating each pre-request match from least inconvenient (e.g., lowest ETA, least walking distance, etc.) to most inconvenient (e.g., highest ETA, greatest walking distance, etc.). Presentation system 2000 may then partition the constraint space based on the local minima 2014, 2016, 2018, for example, by partitioning the constraint space at the local minima each time the threshold is reduced during the iterative evaluation. Then, the matches 2002 exhibiting the local minima may be communicated as a recommendation 2022 to device 2020 as exact matches having values for the metric 2004. Alternatively or additionally, matches 2002 positioned between or about the partitions may be clustered and used to define ranges of the availability metric (e.g., cost) and/or the efficiency constraint (e.g., ETA, walking distance, etc.), as discussed above. These ranges may be used for products corresponding to the partitioned regions, and these products may be communicated as a recommendation 2022 to device 2020. Thus, the local minima may be identified (e.g., in order of increasing inconvenience) as the next match exhibiting the lowest yet value for the availability metric.

Figure 21:
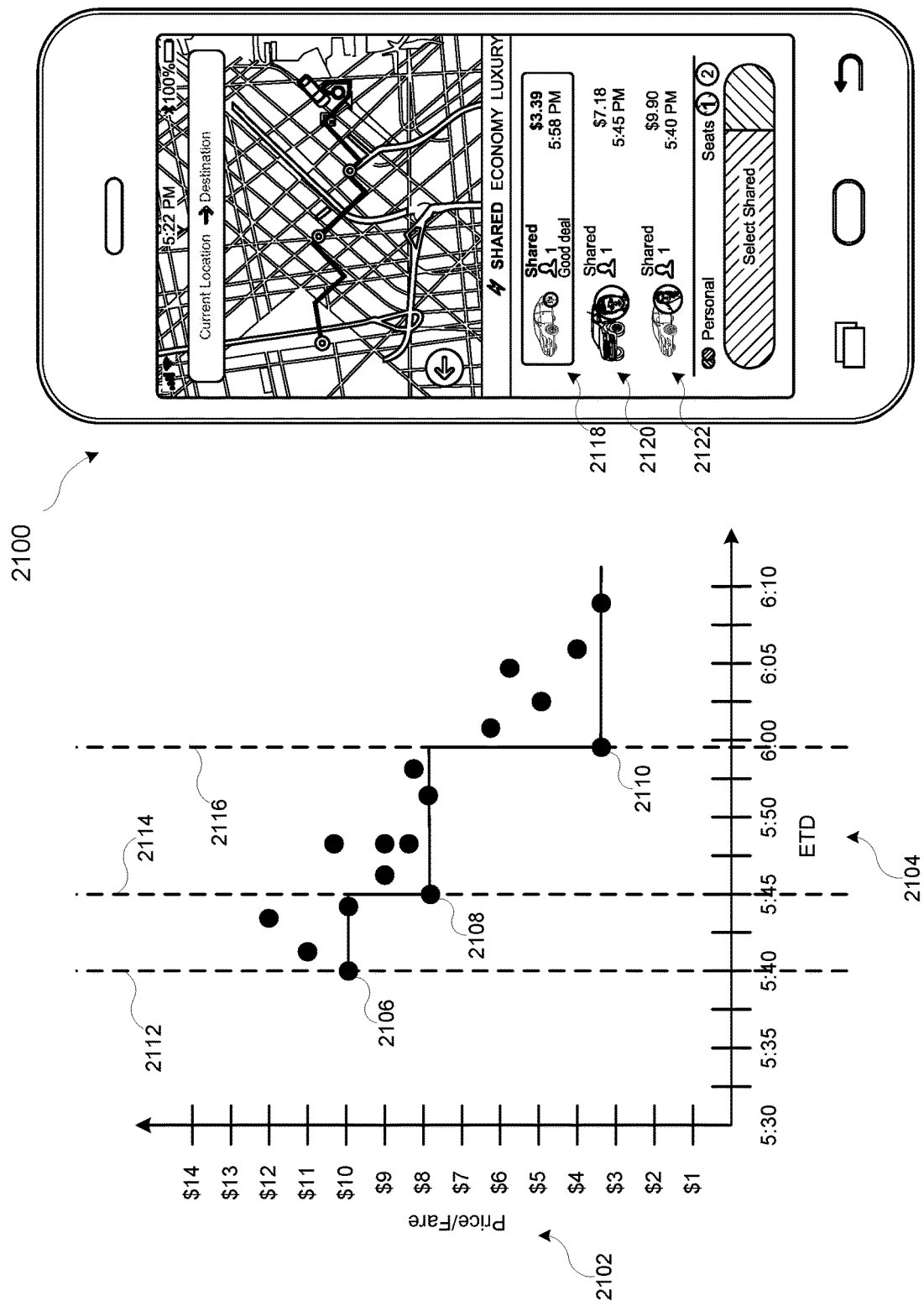
FIG. 21 illustrates an example of constraint space partitioning and the resulting presentation of trips by a transportation requestor device in accordance with the present disclosure.

FIG. 21 illustrates an example of constraint space partitioning and the resulting presentation of trips by a transportation requestor device 2100 in accordance with the present disclosure. In this example, the metric corresponds to a price/fare 2102, and the efficiency constraint corresponds to ETD 2104. The transportation requestor device 2100 thus displays matches 2118, 2120, and 2122 that correspond to minima 2106, 2108, and 2110 at which partitions 2112, 2114, 2116 are made. In some implementations, all pre-request matches that were generated for the session comply with known preferences of the requestor, and the requestor preferences may also be used in determining acceptable maximum values for cost and inconvenience prior to the constraint space partitioning. As a result, the matches that are communicated to the requestor device and displayed to the requestor are customized to the preferences of the requestor.

Figure 22:
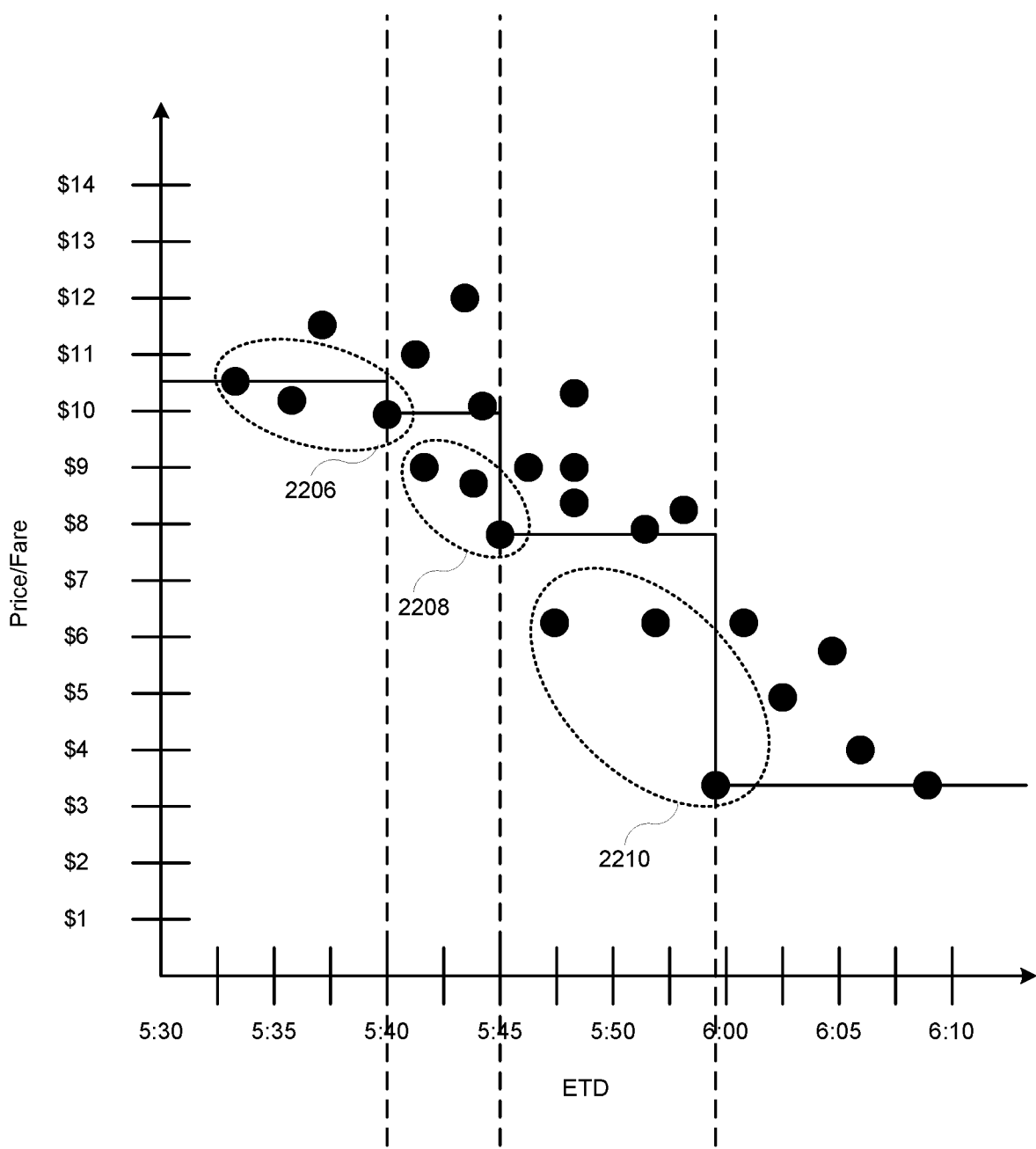
FIG. 22 illustrates an example of constraint space partitioning with clustering in accordance with the present disclosure.

FIG. 22 illustrates an example of constraint space partitioning with clustering in accordance with the present disclosure. In this example, there is a requirement for a pre-determined minimum amount of space between partitions to skip ahead to the next match exhibiting the lowest yet value for the metric. Such a requirement may be implemented as a condition that a minimum number of pre-request matches (e.g., at least three) having costs below the cost threshold be observed before the threshold is reduced again. In this way, the space may be partitioned, and products for a transportation mode may be defined as a product for each space between the partitions by clustering, at 2206-2210, three pre-request matches that lie below the threshold that was applied in evaluating that portion of the constraint space. Products for additional modes that are characterized by different efficiency constraint metrics can formulated in the same or a similar way. The partitioning with clustering ensures that the products of a mode offer meaningfully different cost/inconvenience tradeoffs, with a sufficient number of matches available for each product to confidently offer the product to the requestor for immediate selection.

Figure 23:
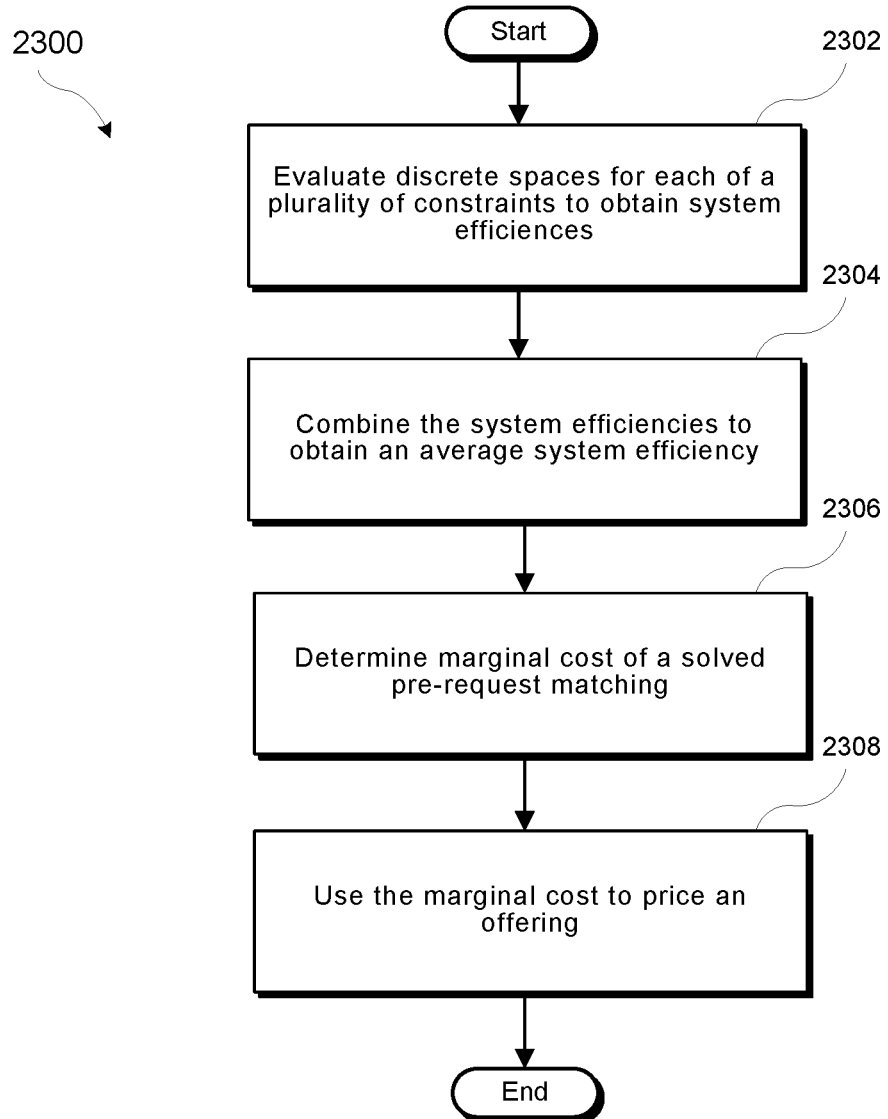
FIG. 23 illustrates an example combination of multiple dimensions in determining costs for offerings in accordance with the present disclosure.

FIG. 23 illustrates an example combination of multiple dimensions in determining costs for offerings in accordance with the present disclosure. In this example, a process 2300 may evaluate, at 2302, discrete spaces for each of a plurality of constraints to determine a system efficiency. Then, at 2304, these system efficiencies may be combined to obtain an average system efficiency. For each constraint, the process 2300 may determine system efficiency, which may be represented as a cost savings to the transportation network. This system efficiency may be determined for the relevant values and value ranges (e.g., from partitioning, clustering, etc.) of the constraint spaces. Then these system efficiencies may be totaled to obtain the average system efficiency, which may be represented as an average cost savings to the transportation network. Thereafter, marginal cost of a solved pre-request matching may be determined, at 2306, by determining a difference between the total cost of cached matchings and the total cost of the solved pre-request matchings. Such a marginal cost can be used, at 2308, to price an offering that would result in a request that would lead to the solved pre-request matching being implemented.

Figure 24:
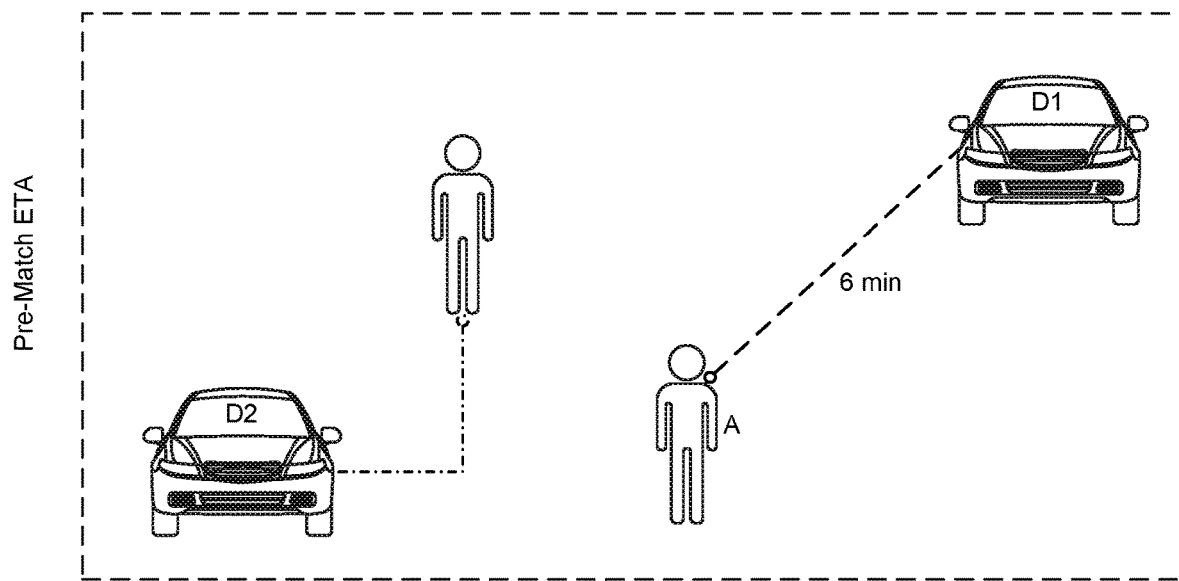
FIG. 24 is a diagram illustrating an example walk determination in accordance with the present disclosure.
Figure 24:
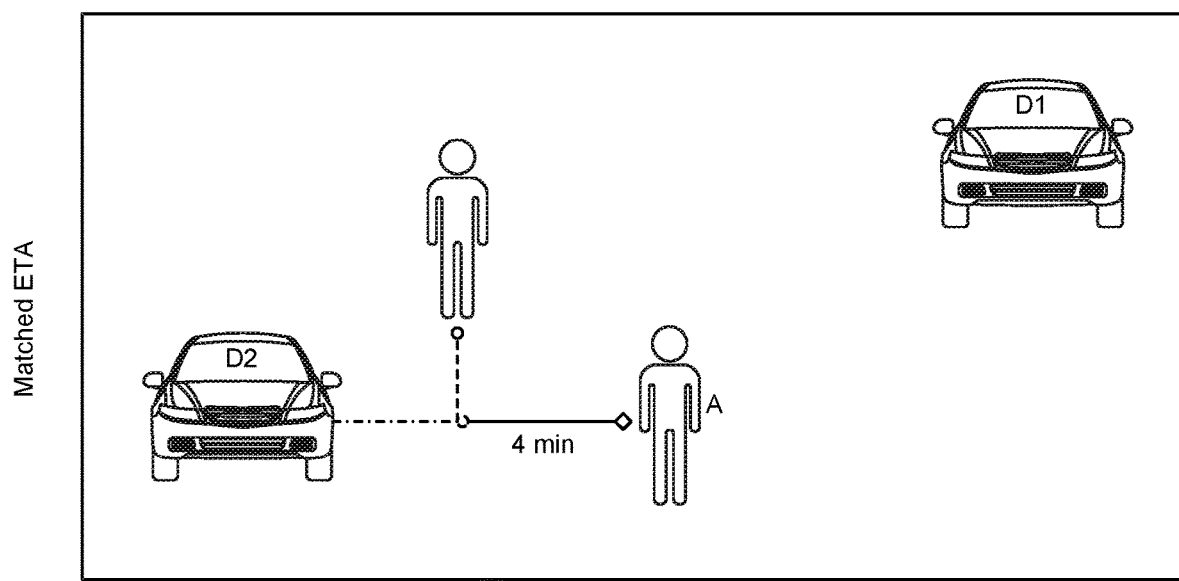

FIG. 24 is a diagram illustrating an example potential walk prediction in accordance with the present disclosure. Without pre-request matching and walk prediction, a requestor A may be shown a nearest provider D1 with an ETA of six minutes. However, as discussed earlier with reference to FIG. 8, a dynamic transportation matching system with pre-request matching capabilities may evaluate, pre-request, potential matches for a requestor device that involve or omit walks to a pick-up location. Upon identifying a potential match for the requestor device that involves a walk but also a lower ETA than the most optimal match that does not involve a walk, a presentation system may display an offer that links requestor A into a route of a plan for a shared ride match involving provider D2, resulting in a lower ETA of only four minutes. The walk implementation makes it possible for the requestor to change location to a waypoint of a route of an existing plan so that a provider can pick up the requestor without changing the route of the existing plan. Thus, pre-request match determination with potential walks, as detailed above, can determine when a shared ride is linkable onto a new route with a potential walk, and thus report a lower predicted ETA. Accordingly, similarly to predicted swaps, predicted walks can cause predicted ETAs to more accurately reflect matched ETAs. Advantageously, the walk prediction can lead to more accurate ETA predictions, and thus potentially increase session conversion (e.g., by encouraging the requestor A to accept the offer due to the favorable ETA that would not have otherwise been surfaced to the user and/or by avoiding the requestor canceling the match due to a discrepancy between the pre-request ETA and the post-request ETA).

Figure 25:
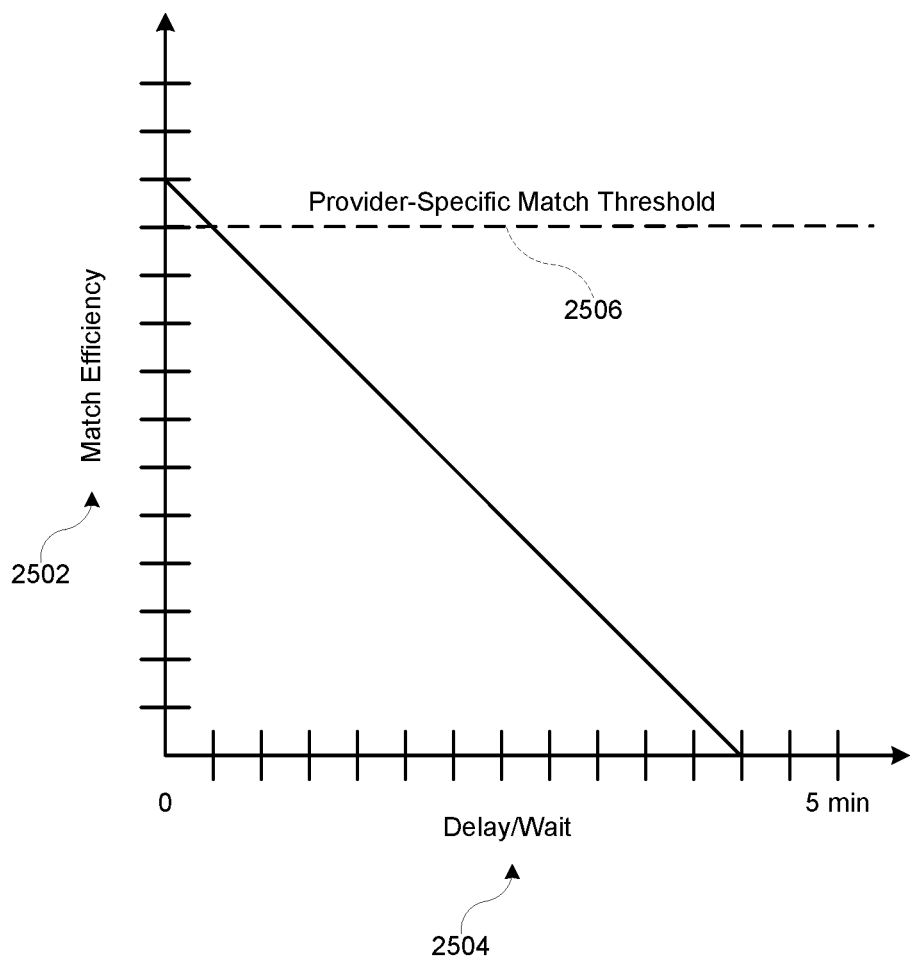
FIG. 25 is a graphical illustration depicting an example determination of a provider-specific match in accordance with the present disclosure.

FIG. 25 is a graphical illustration depicting the determination of a provider-specific match in accordance with the present disclosure. Provider-specific matches may be determined pre-request when a ratio of an inconvenience metric to a system cost metric is favorable. An inconvenience metric may include any factor that may define requirements, limitations, and/or potential drawbacks for a transportation plan for a requestor. For example, an inconvenience metric may specify whether a requestor walks as part of a transportation plan, whether a requestor shares a ride with other requestors, whether a shared ride includes significant detours for a requestor, whether a requestor waits in a queue for a match to a transportation provider, etc. A system cost metric may include any factor that defines how transportation resources within a transportation network are used. For example, a system cost metric may specify a utilization rate of transportation providers in terms of time spent transporting requestors to their destinations and/or a percentage of seats filled by requestors. For example, a match efficiency 2502 (e.g., system cost savings) may be evaluated with respect to an inconvenience metric 2504 (e.g., delay/wait). If a pre-request match exhibits a combination of match efficiency versus inconvenience that is above a threshold 2506, then a provider-specific match is determined.

Figure 26:
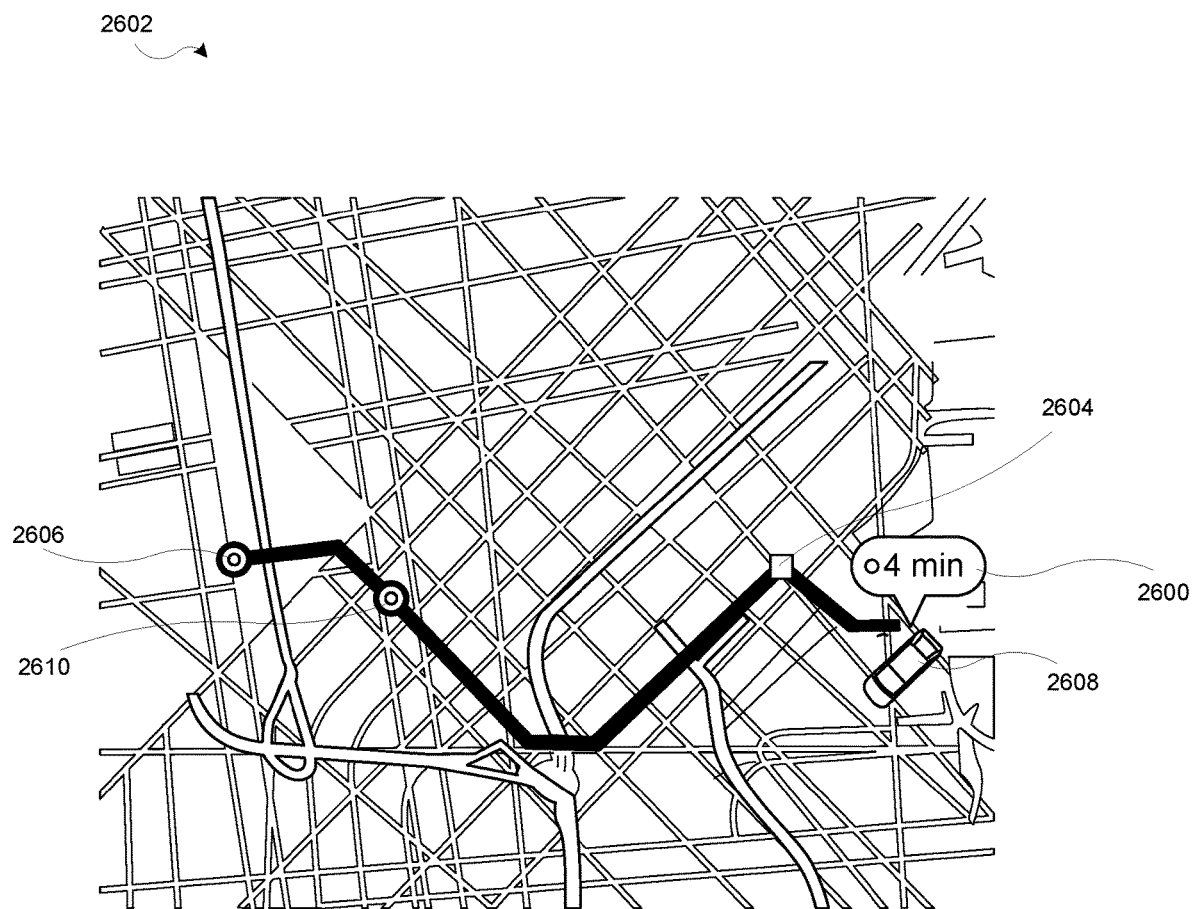
FIG. 26 is a diagrammatic view of a map illustrating a scenario leading to an example determination of provider-specific pre-request matches in accordance with the present disclosure.

FIG. 26 is a diagrammatic view of a map illustrating a scenario leading to the determination of provider-specific pre-request matches in accordance with the present disclosure. In the example shown at 2602, a transportation requestor device location 2604 and destination 2606 may lead to the determination of a provider-specific match to a provider 2608 that is already providing a shared ride to another requestor having drop-off location 2610. In this case, a quick ETA 2600 may be predicted, and a high efficiency/low cost may be determined because the existing route of the existing plan, which ends at drop-off location 2610, only needs to be extended from the drop-off location 2610 to the destination 2606. Stated differently, there is no need for the provider to deviate from a route of an existing plan in order to pick up the requestor, and the system cost is relatively low because the existing route only needs to be extended a relatively short distance. The requestor is also not inconvenienced because little or no walk is needed for the requestor to be at a waypoint of the route of the existing plan. As a result, a ratio of match efficiency versus inconvenience (e.g., provider detour length versus requestor walk length) exceeds a predetermined threshold for determining the provider-specific pre-request match. Such matches are beneficial to the transportation network, and thus are recommended strongly to the requestor on favorable terms and ranked higher then other matches or products.

Figure 27:
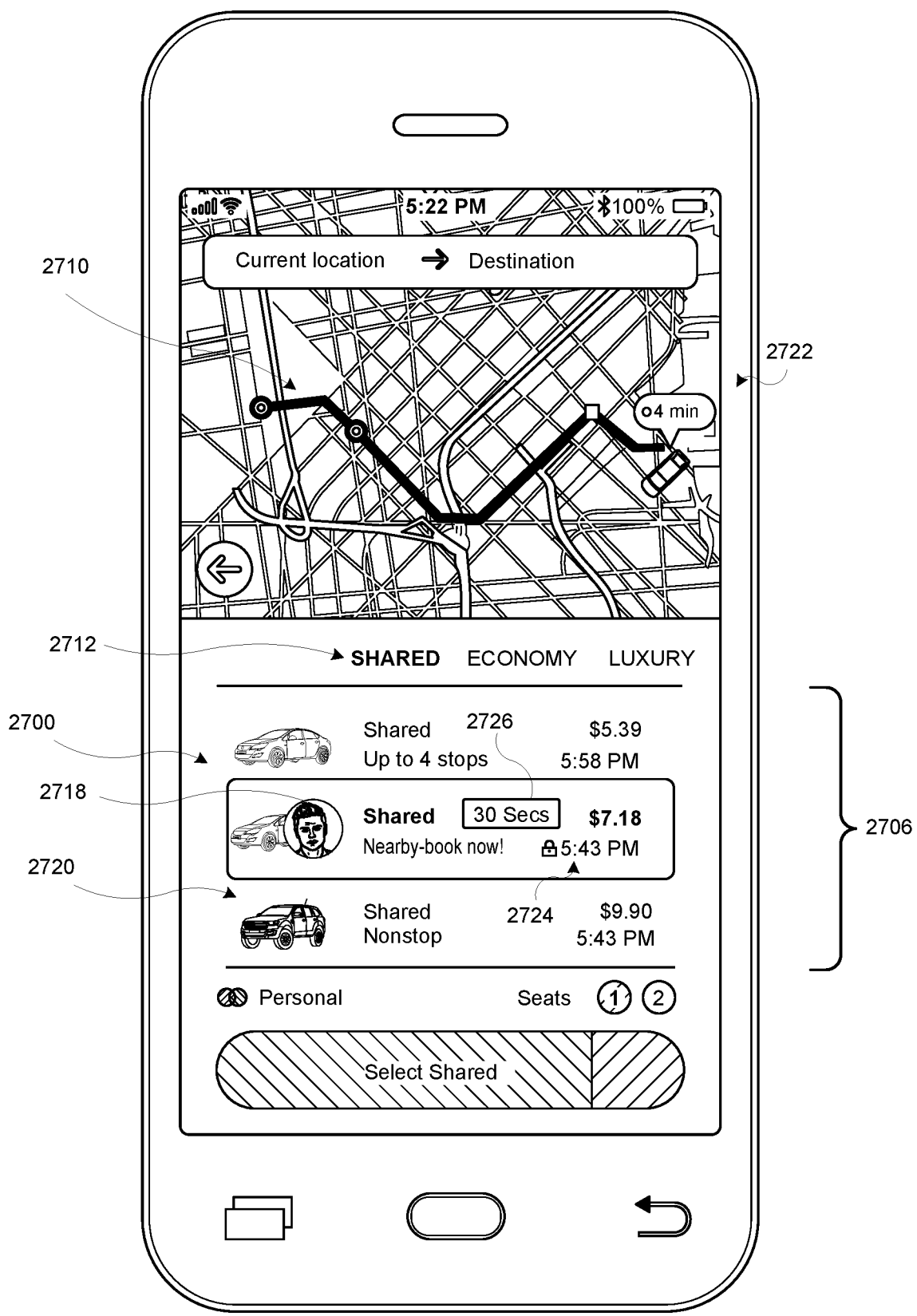
FIG. 27 is a view of an example transportation requestor device presenting pre-request matches including a provider-specific offer in accordance with the present disclosure.

FIG. 27 is a view of a transportation requestor device presenting example pre-request matches including a provider-specific offer 2700 in accordance with the present disclosure. For pre-request matches where no driver acceptance is required (e.g., shared matches, linked rides, auto accept, etc.), it may become possible to display a provider-specific offer 2700 having an exact driver 2718, route 2710, ETA 2722, and ETD 2724. This offer 2700 is based on a provider-specific match as described above. For example, a transportation requestor may open the client application on the user device and, with pre-request matching that determines an efficient shared ride match (e.g., a pre-request match with a high probability of matching, a system cost below a threshold, etc.), may observe that there is a provider-specific offer for a match to a specific provider routed two blocks away. With knowledge, based on stored user preferences specified by the requestor and/or developed based on past requestor activity, that the requestor is price sensitive, especially in the evening commute, and likely willing to walk to a pickup location within a requestor-specific radius of the requestor's current location, the requestor can be presented with an "instant offer," valid immediately if he walks, and this offer 2700 can have a low price and display the route. As described above, the presentation system can reserve a particular provider for the requestor (e.g., for a predetermined duration of 30 seconds), and a countdown 2726 can be displayed to the requestor to communicate remaining reservation offer duration. The offer 2700 can be displayed in region 2706 with one or more other offers 2720 of the selected shared mode 2712.

Figure 28:
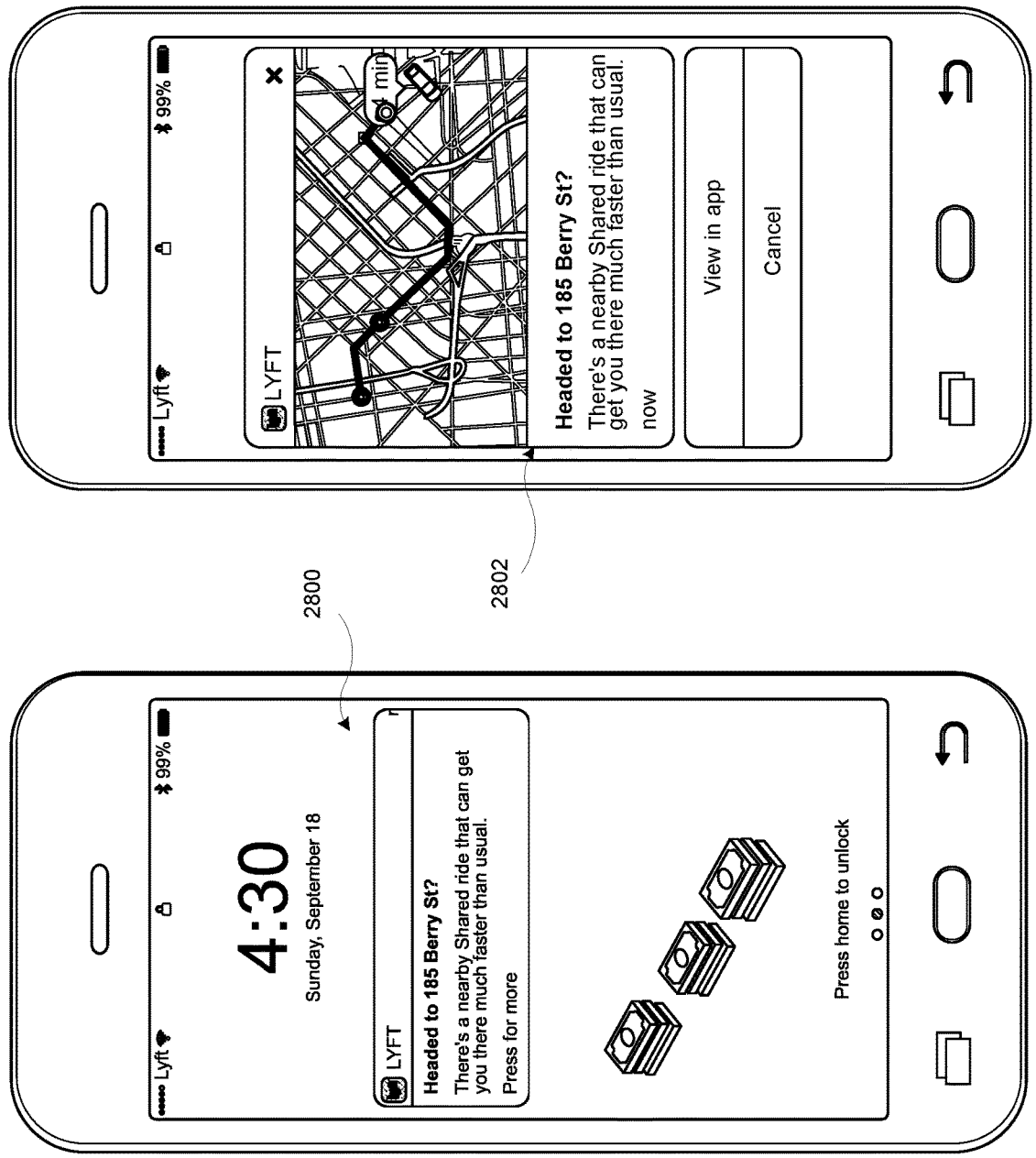
FIG. 28 is a view of example transportation requestor devices presenting an out-of-app instant match in accordance with the present disclosure.

FIG. 28 is a view of transportation requestor devices presenting an example out-of-application instant match in accordance with the present disclosure. Requestor activities may be observed over time to detect and store information about predictable habits, such as regular travel to particular locations according to a schedule. This information, as well as scheduled events of a calendar application, may be accessed periodically when the client application is running in the background on the requestor device. For passengers with predictable habits (e.g., daily commute) or for whom there is a scheduled activity (e.g., calendar appointment, airplane or event ticket, etc.), provider-specific matching can be triggered even before they have opened the application, either, e.g., when the device is locked as at 2800 or via a notification 2802 when the device is unlocked. This triggering may occur with the same or similar logic as described for a provider-specific match as described herein. For example, periodic assessment of calendar information may determine that a requestor has a flight scheduled and, based on the current location of the requestor, there is an immediate need for the requestor to travel to the airport. In response to this determination, the client application may communicate session information to the presentation system, and a provider-specific match may be determined based on the session information and a high likelihood of conversion. The presentation system may then communicate an offer to the provider device based on the provider-specific match, and the client application may notify the requestor of the offer by, for example, a push notification. The out-of-application provider-specific match process, with the provider-specific match as described above with reference to FIG. 27, may increase the number of requested rides and may reduce total system cost (e.g., by providing pre-request matches to potential requestors when the efficiency of the potential matches is particularly high).

Figure 29:
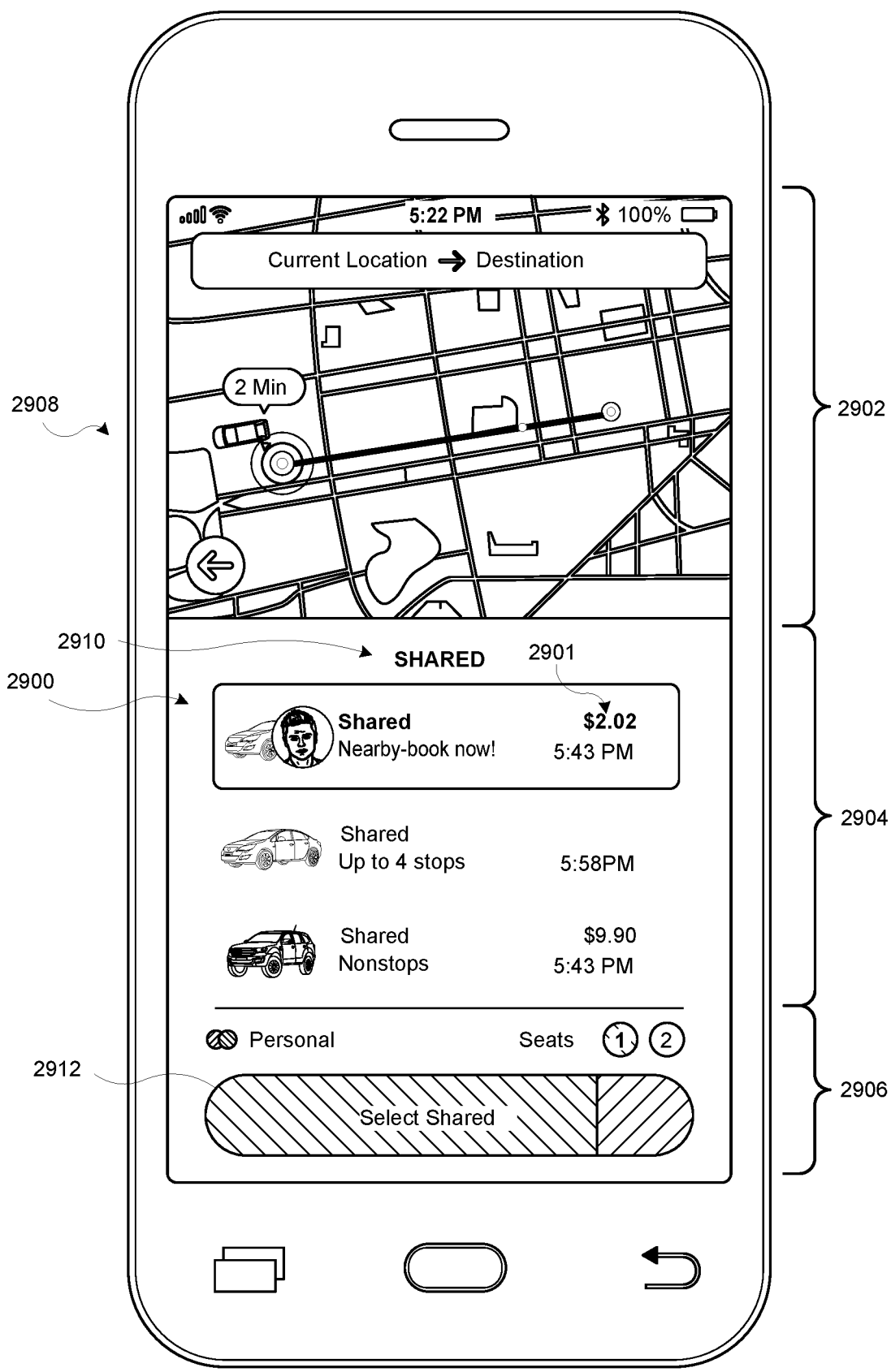
FIG. 29 is a view of an example transportation requestor device presenting pre-request matches including a marginal-cost based instant price in accordance with the present disclosure.

FIG. 29 is a view of a transportation requestor device presenting an offer 2900 for a pre-request match having a marginal-cost-based instant price 2901 in accordance with the present disclosure. An example user interface of a requestor application running on a requestor device may have a map display region 2902 displaying a route 2908 for a currently selected offer 2900 corresponding to a pre-request match. The user interface may also have another display region 2904 displaying a shared car transportation mode 2910 and a ranked list of offers corresponding to pre-request matches. The user interface may further have an interactive controls region 2906 having a control 2912 responsive to requestor actuation to make a request based on the currently selected offer 2900.

The marginal-cost based instant price 2901 may occur when, for example, a transportation requestor is matchable into a provider-specific route (e.g., using the same example logic as described above with reference to FIGS. 25-27) that would otherwise have low efficiency and no (or likely no) matches. In this situation, marginal cost may be zero (or substantially near zero). In some implementations, this may allow the dynamic transportation network to make offers reflecting the near-zero marginal cost, thereby inducing more transportation requests and increasing utilization of transportation resources. Accordingly, an offer 2900 can present this pre-request match at a very low price to the benefit of the transportation requestor, the transportation provider, and/or the dynamic transportation network. Such pricing, made practical by the instant matching functionality described herein (which, in turn, is enabled by the availability of pre-request match information), may increase the overall number of requested rides within the dynamic transportation network.

Figure 30:
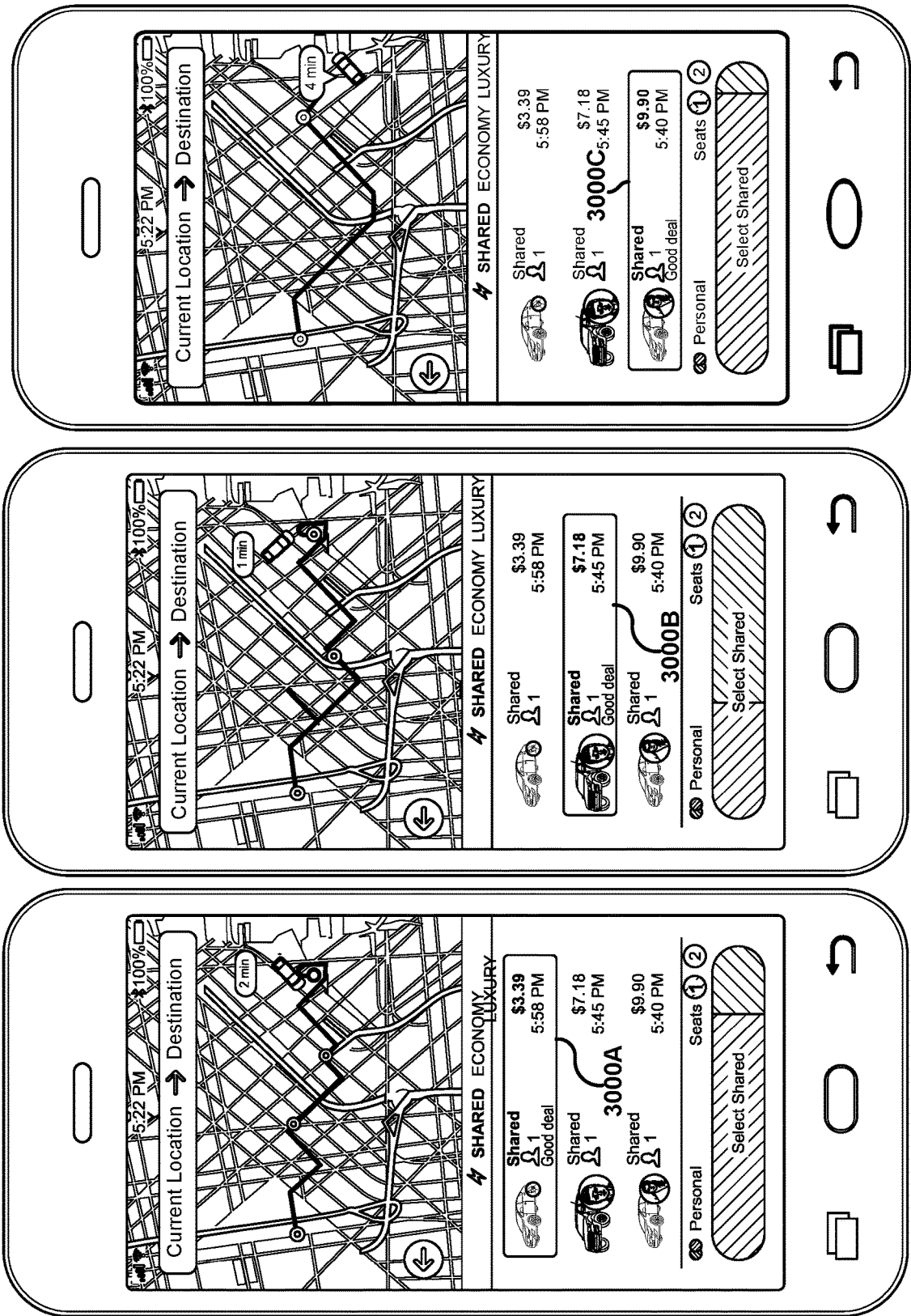
FIG. 30 is a view of example transportation requestor devices presenting multiple, concrete offerings for provider-specific plans for a transportation mode in accordance with the present disclosure.

FIG. 30 is a view of transportation requestor devices presenting multiple, provider-specific offerings for specific plans for a transportation mode in accordance with the present disclosure. In this example, it is possible to show multiple exact offers, which include all the elements of a transportation request such as price, ETA, ETD, which serves as information informing the requestor that, in comparison to other offers, this is the dominant one for their specific needs (e.g., no other offer is better by every metric). Accordingly, multiple, exact shared routes may be displayed that enable users make decisions based on informed price-time tradeoffs. Two of the pre-request matches 30006 and 3000C in this example are presented as provider-specific matches (e.g. the transportation provider who can service a transportation request within the constraints and attributes of the offer) as previously described. A third pre-request match 3000A is presented as a shared ride having a marginal cost-based price as described herein. Advantageously, the presentation of multiple, concrete offerings for specific plans for a transportation mode may increase shared rides and decrease the number of cancelations. Increasing shared rides can increase system efficiency, reduce traffic congestion, and have other positive benefits, including increasing session conversion. In contrast to offers formulated using the provider-availability problem, as described above with reference to FIGS. 1-3, the disclosed pre-request matching improves accuracy of predictions. This improved accuracy imparts confidence in the offers that are made based on the pre-request matches.

Figure 31:
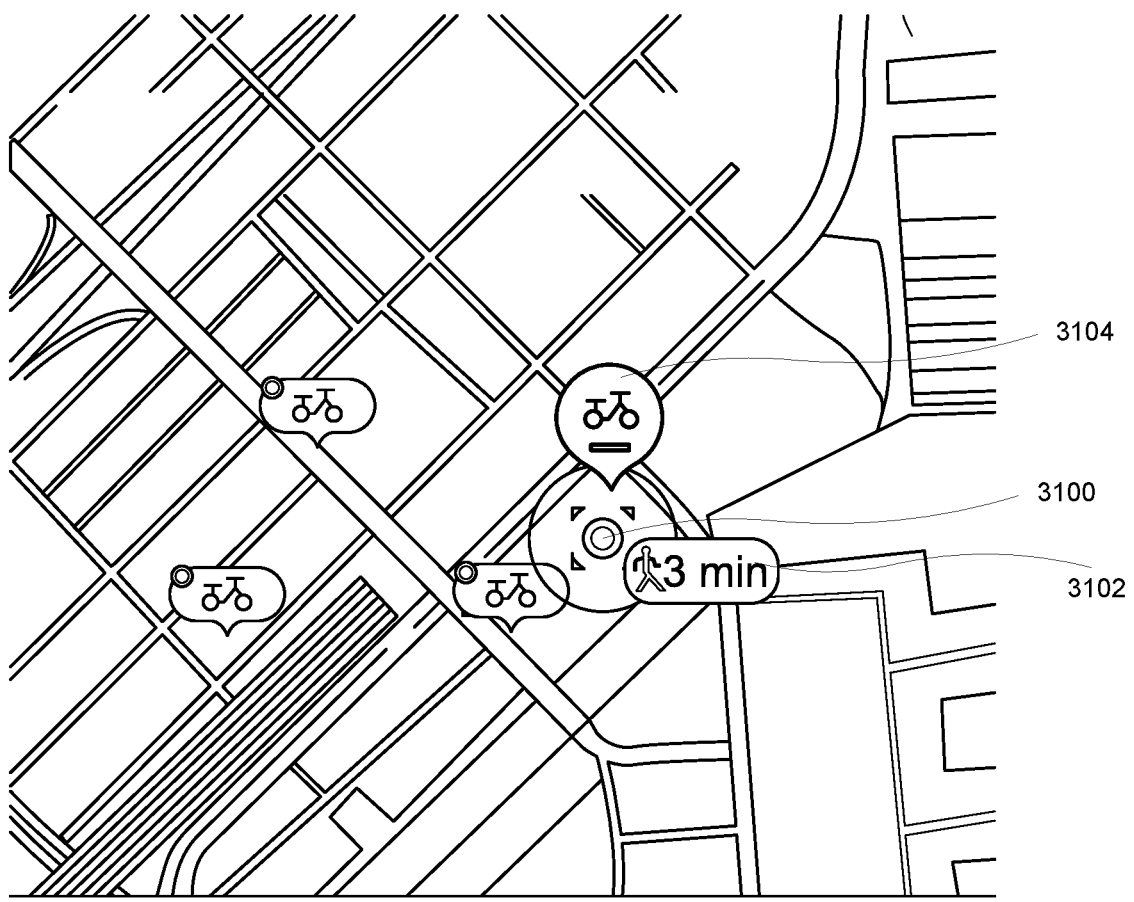
FIG. 31 is a diagrammatic view of a map illustrating a situation leading to an example adjustment, for a match and based on real-time information about transportation provider resource availability, of a value of the match and/or adjustment of an emphasis of presentation of the match.

FIG. 31 is a diagrammatic view of a map illustrating a situation in which a transportation offer may be emphasized (e.g., by a presentation system) based on real-time information about transportation provider resource availability. In this example, a transportation requestor device location 3100 and destination may be analyzed and lead to determination that the requestor device is within a predefined radius of a location 3104 of a micromobility vehicle. This micromobility vehicle may need to be moved to a loading platform corresponding to a waypoint at which the requestor will switch to public transportation. Thus, matching the requestor device to the micromobility vehicle may benefit the dynamic transportation network by moving the micromobility vehicle to the loading platform. In this case, the quick ETA 3102 of three minutes and high efficiency/low system cost can result in a provider-specific match that can be discounted in price and/or promoted in rank for more prominent display on the requestor device. A similar result may occur in other circumstances, such as when a provider located in an oversupplied area can be moved to an undersupplied area as a result of the match, thus improving resource allocation within the network, reducing latency, and reducing system cost.

Figure 32:
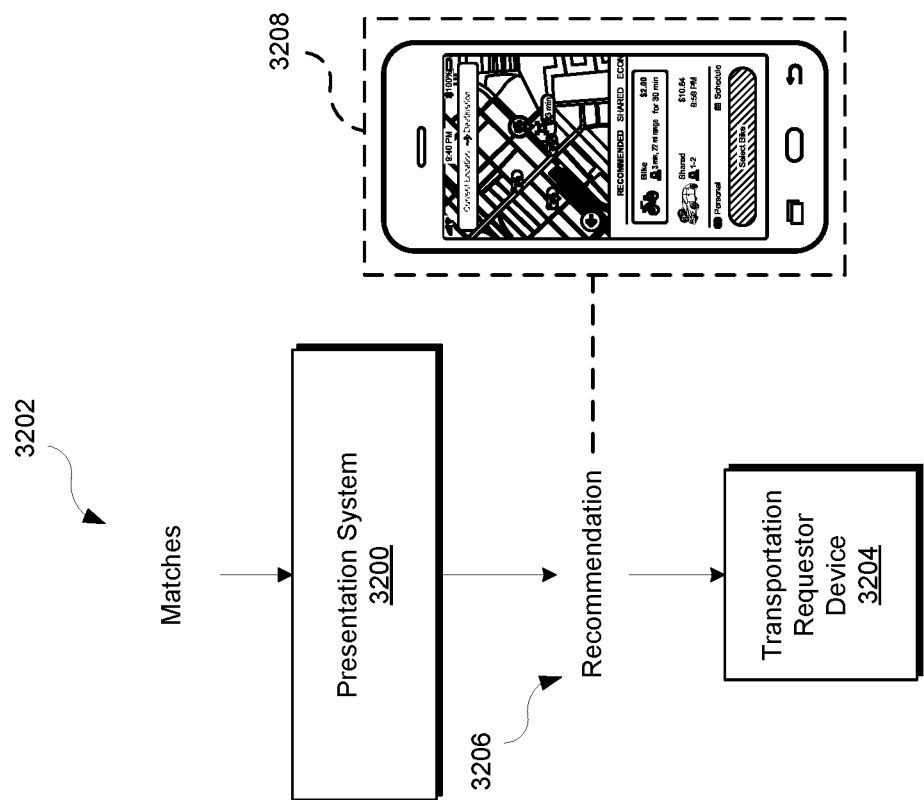
FIG. 32 is a block diagram illustrating an example presentation system receiving one or more matches and transmitting one or more recommendations of one or more trips to a transportation requestor device in accordance with the present disclosure.

FIG. 32 is a block diagram illustrating a presentation system 3200 receiving one or more matches 3202 and transmitting one or more recommendations 3206 of one or more trips 3208 to a transportation requestor device 3204. Presentation system 3200 may perform adjusting, for a match and based on real-time information about transportation provider resource availability, an emphasis of presentation (e.g., a rank affecting order or prominence of display to a requestor) and/or a value of a transportation provider resource availability metric. Presentation system 3200 may also have features and functionality of any presentation system described herein.

Figure 33:
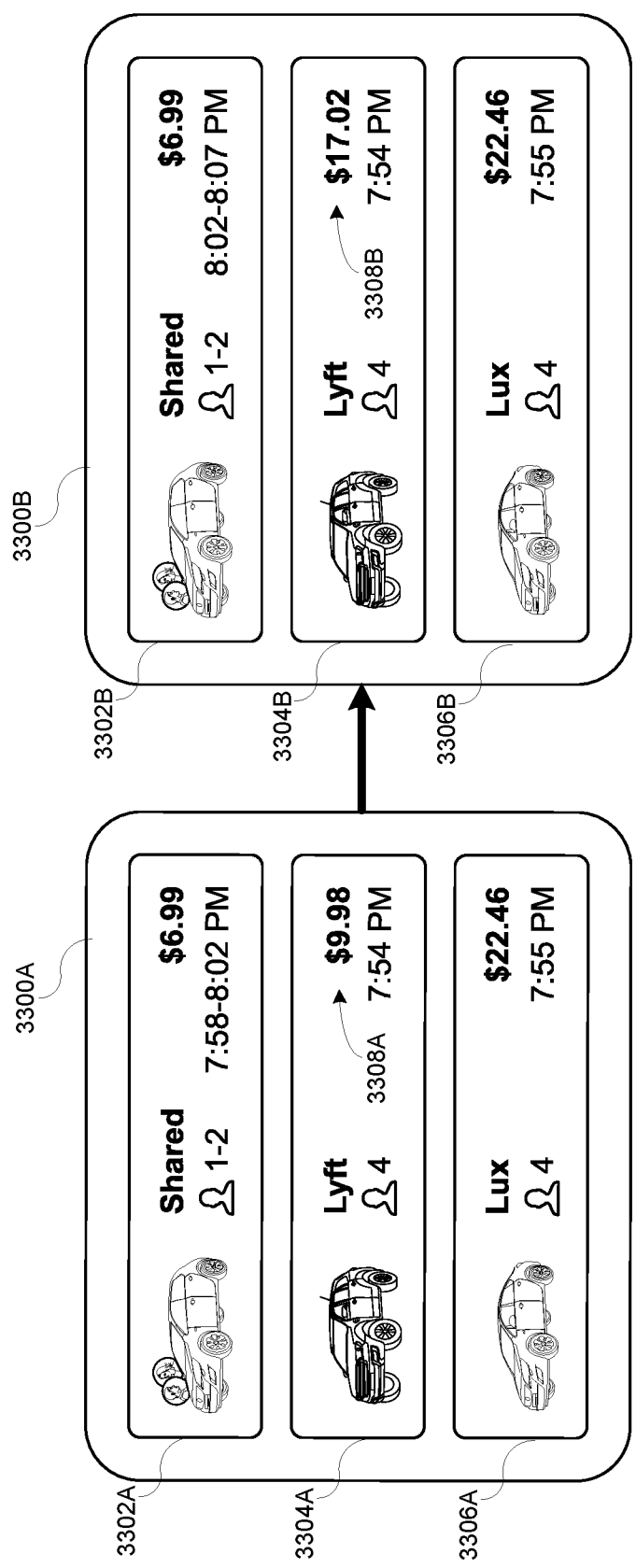
FIG. 33 illustrates an example presentation of multiple pre-request matches resulting from adjusting, for a match and based on real-time information about transportation provider resource availability, the value of a transportation provider resource availability metric in accordance with the present disclosure.

FIG. 33 illustrates an example presentation of multiple pre-request matches resulting from adjusting, for a match and based on real-time information about transportation provider resource availability, a value of a transportation provider resource availability metric in accordance with the present disclosure. In this example, a set of offerings 3300A may include a offering 3302A for a shared ride, an offering 3304A for a private ride, and an offering 3306A for a private luxury ride. A resource (i.e., vehicle) used to service the offer 3304A for a private ride may also be used to service offers for shared rides with greater efficiency. Accordingly, when such resources are undersupplied, the presentation system described herein may enact measures to encourage requestors to select the offering 3302A for the shared ride instead of the offering 3304A for the private ride. Accordingly, the presentation system may incentive such selections by formulating an optimal set of offerings 3300B to maximize both system efficiency and profit given current transportation network conditions. Based on market conditions, an exact ETA can be presented to the requestor to maximize system efficiency and, in some embodiments, maximizing system efficiency may result in reduced latency, higher utilization, or increased profit. Stated differently, the presentation system may incentivize requestor selection of a shared ride offering 3302B by increasing price 3308A to the requestor for the offering 3304A for a private ride to price 3308B for the offering 3304B for the private ride. As a result of this adjustment, the price of the private ride in offering 3304B is adjusted to be closer to the price of a private luxury ride in offering 3306B.

In another example, pre-request matching may determine that real-time current transportation provider resources (e.g., cars) are undersupplied (e.g., comparing current conditions against historical data), are going to be further undersupplied (e.g., based on a forecast), and may find the discrete product combinations needed to steer requestors away from using scarce transportation resources unnecessarily. Stated differently, pre-request matching may identify the offers that affect the weighting for the ranking for display, where the ranking has different weights based upon a desired objective function (e.g., to maintain optimal supply demand balance, increase utilization, reduce ETA, etc.). For example, a duration of a batch window for a queuing mode, as described herein (e.g., a window during which a request for transportation may be batched with other transportation requests to be matched with a single transportation provider), may be determined by evaluating the effect on a provider availability metric (e.g., cost) while constricting a constraint space for this batch window duration constraint as detailed herein. Accordingly, offerings having different batch window durations may be formulated and presented to the transportation requestor. A longer one of these batch window may be combined with walking and a low-detour shared ride that has a low system cost due to likelihood of matching. In this case, a normal shared mode may be inefficient (e.g., significantly less likely to match with other requestors) compared to these options, so the normal shared mode may be filtered out entirely. Also and as noted above, the use of transportation providers for private rides may impose a high system cost since those transportation providers can also service shared rides. In this scenario, a pricing subsystem/service of the presentation system may create a large price difference between the efficient shared variant and private rides. This type of functionality may require real-time information about the state of the transportation network. Merely using historical data and forecasts may not allow for assessing resource levels and trends with sufficient accuracy. The accurate assessment of resource levels and present trend may be needed to effectively steer requestors away from scarce resources and towards oversupplied resources, thereby utilizing a transportation network more efficiently.

Figure 34:
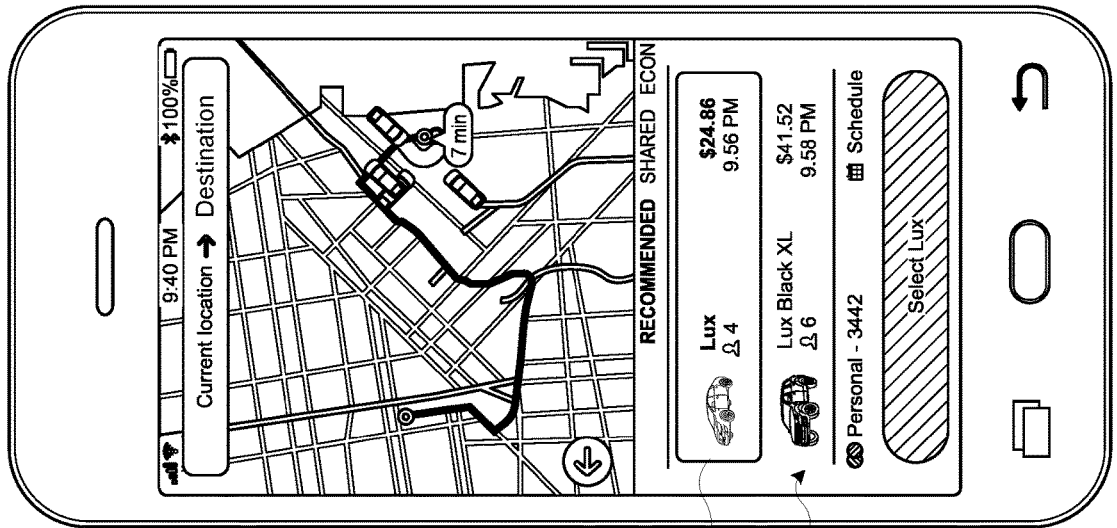
FIG. 34 is a view of example transportation requestor devices presenting multiple pre-request matches based on personal preferences in accordance with the present disclosure.
Figure 34:
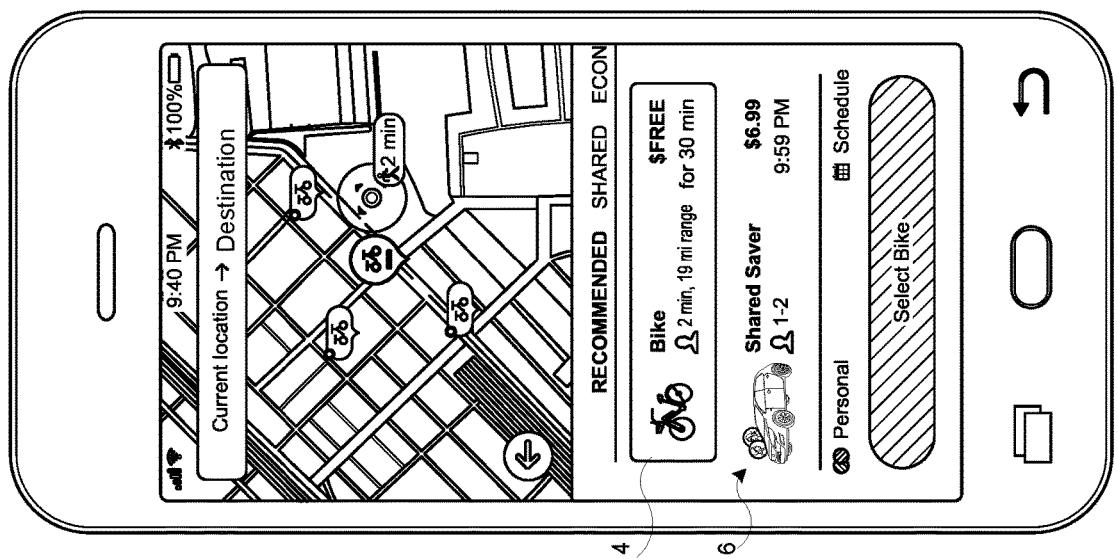

FIG. 34 is a view of transportation requestor devices presenting multiple pre-request matches based on personal preferences in accordance with the present disclosure. Customization of offers may be based on historical data, which can include user preferences due to previous offer selections, implemented as a repository learning system and correlating data points, to find offers, rank the offers, and present the offers. In this example, a first requestor device 3400 presents a set of offers that are tailored to the first requestor's price sensitivity, such as an offer 3414 for bikes and an offer 3416 for shared ride matches that involve the requestor walking to a pick-up location. In contrast, a second requestor device 3450 presents a set of offers that are tailored to the second requestor's preference for private cars, including an offer 3462 for LUX matches and an offer 3464 for LUX Black matches. In contrast to offers formulated using the provider-availability problem, as described above with reference to FIGS. 1-3, the disclosed pre-request match determination may reference user preferences when determining the pre-request matches, thereby delivering personalized offers.

Figure 35:
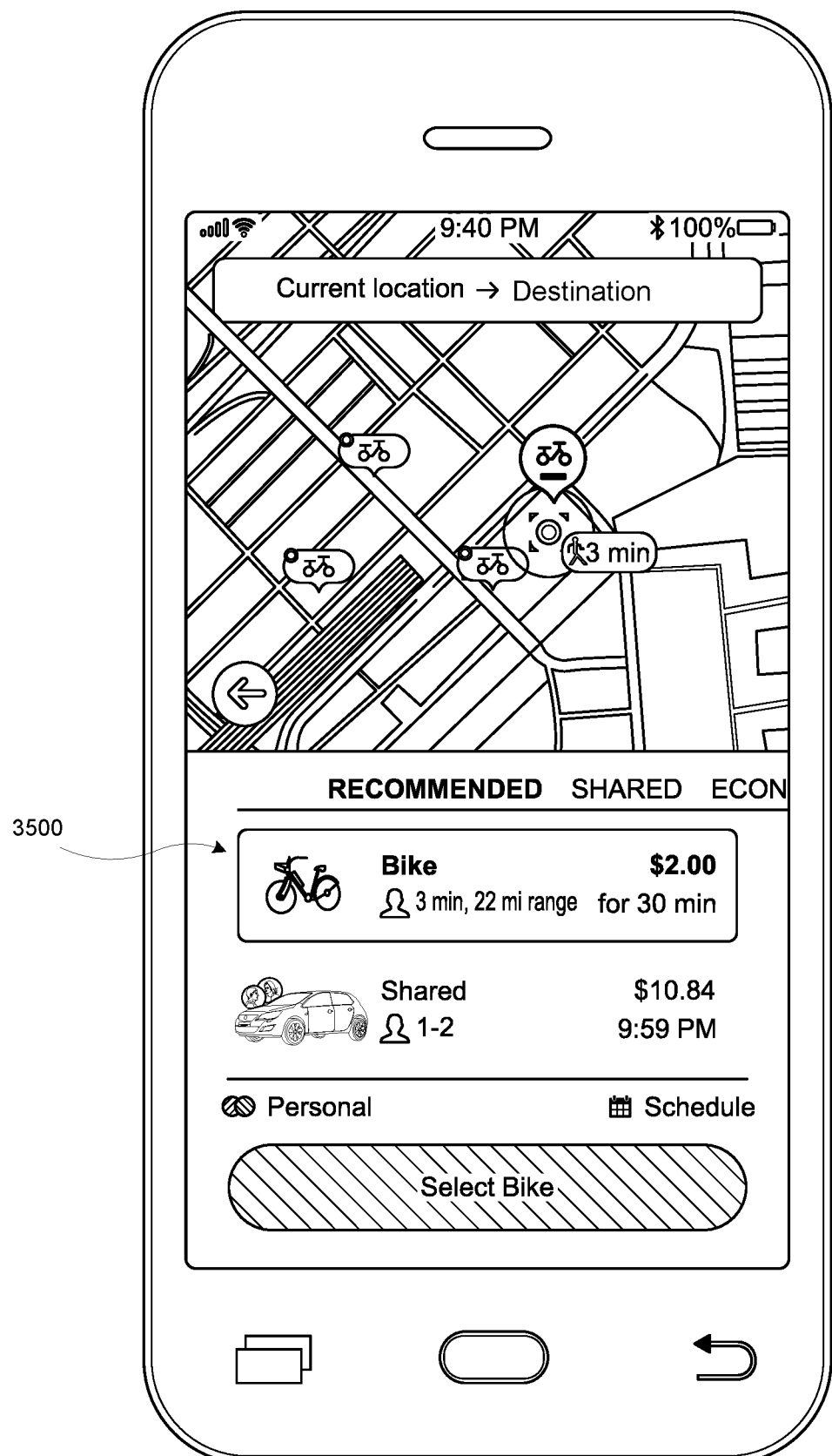
FIG. 35 is a view of an example transportation requestor device presenting multiple pre-request matches resulting from adjusting, for a match and based on real-time information about transportation provider resource availability, an emphasis of presentation in accordance with the present disclosure.

FIG. 35 is a view of a transportation requestor device presenting multiple pre-request matches resulting from adjusting, for a match and based on real-time information about transportation provider resource availability, an emphasis of presentation in accordance with the present disclosure. As described above, the presentation system may adjust a price of an offer to incentive requestor selections that result in more efficient utilization of transportation network resources. This example shows that the presentation system described herein may adjust a ranking of an offer 3500 instead of or in addition to a price of the offer. In this example, a flexible requestor may wish to travel to a nearby location. This may entail, e.g., a short ride and a low value to the transportation network compared to longer rides, and may still take transportation resources away from the requestor's starting location. Such a situation may occur when an event (e.g., an athletic event) is ending and providers are unable to serve all requestors exiting the event and/or are unable to navigate effectively near the venue. In such situations, modalities may be weighted differently based on location, current market conditions, and user preferences, and additional penalties or gains may be given to certain modalities when pre-request matches can be determined to help balance system resources. Accordingly, pre-request matching may use price differentiation to encourage the requestor to use a micromobility vehicle (such as a scooter or a bike) by ranking offer 3500 for a bike higher in the list of offers, thereby saving resources for higher value trips that require a car to reach their destination. In some situations, it may be possible for a benefit to the system to exceed the cost of a proposed fare, such as when a bike needs to be moved from its current location to a loading platform. In such a case the bike may be offered for free because the bike re-balancing cost (e.g., a cost of paying an employee or contractor to move the bike to the loading platform) is higher than the proposed fare. Additionally, offerings with high system cost, such as private cars, can be deemphasized in presentation by demoting them in rank so that the requestor must scroll down to see those offers. Accordingly, during peak need for transportation resources within the network, the presentation system may encourage a flexible requestor to choose an offering with low system cost instead of assigning a provider for a private ride to the requestor. In this way, the presentation system may save network resources for high-value trips that require a car to reach their destination. This functionality may improve the overall requestor experience and increase rides within the transportation network.

Figure 36:
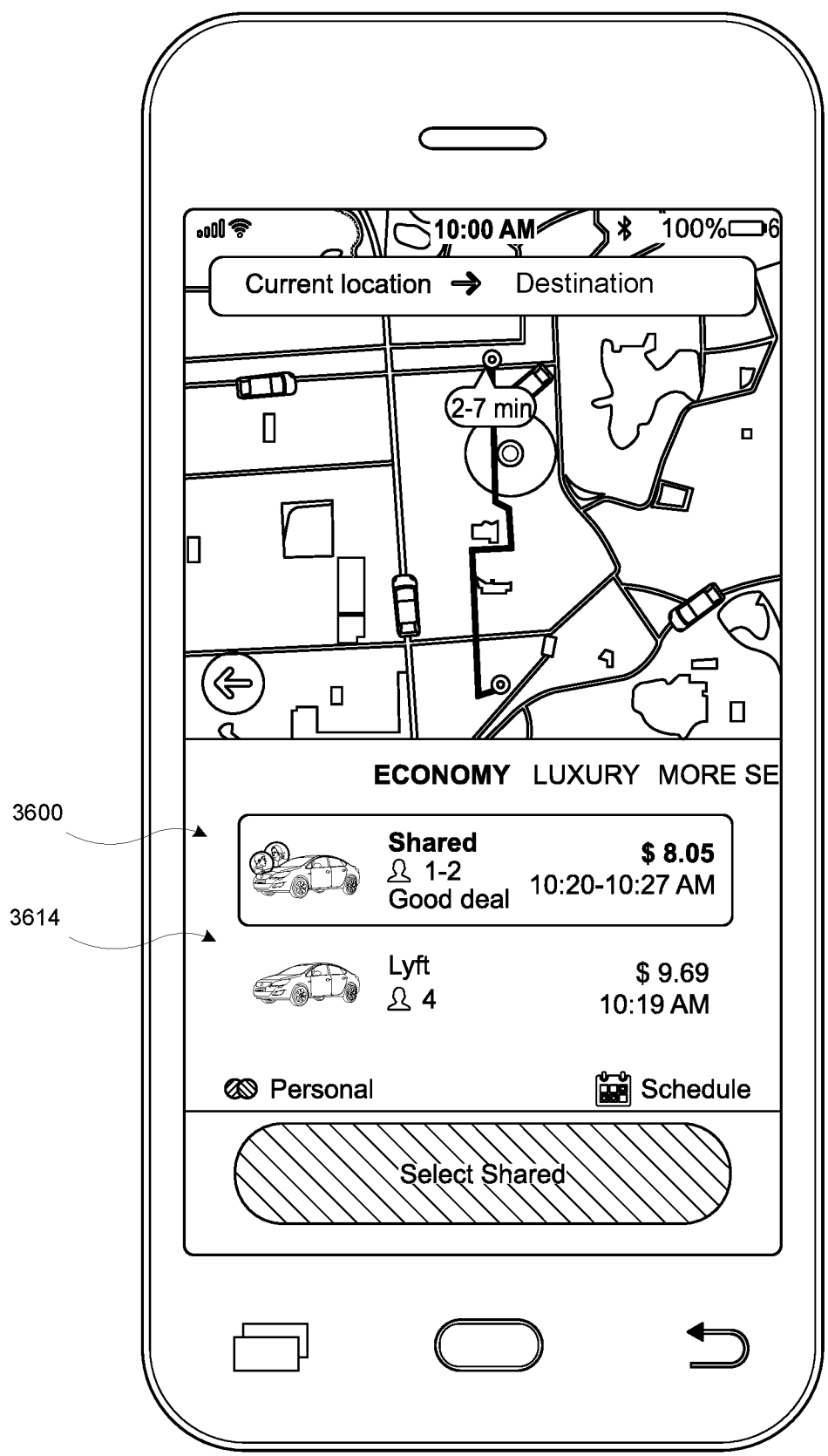
FIG. 36 is a view of an example transportation requestor device presenting multiple pre-request matches resulting from filtering based on match likelihood in combination with adjusting, for a match and based on real-time information about transportation provider resource availability, a value of a transportation provider resource availability metric in accordance with the present disclosure.

FIG. 36 is a view of a transportation requestor device presenting multiple pre-request matches resulting from filtering based on match likelihood. This filtering can be performed in combination with adjusting, for a match and based on real-time information about transportation provider resource availability, the value of a transportation provider resource availability metric. In this scenario, the presentation system may avoid offering low-cost sharing that has a low likelihood of matching and may filter out offerings with high wait times and walking, as they may be unlikely to reduce system cost. As a result, an offer 3600 for shared cars can be priced close to an offer 3614 for private cars, and no variants of saver mode are offered. Thus, in the case that a product is formulated for the transportation provider that involves walking, has a relatively high batch window, and a low liklihood of matching, this product may be filtered out by ranking it below a predetermined threshold for presenting offers to user. Stated differently, a maximum number of offers may be presented in each mode, and offers for products that are ranked lower than other offers within the mode may be filtered out as a result. In contrast to using the provider availability solution with historical data, the use of pre-request matching with real-time information may allow pricing to accurately reflect provider availability and thus improve the efficiency of the transportation network by reserving scarce resources for when and where they are most needed.

Figure 37:
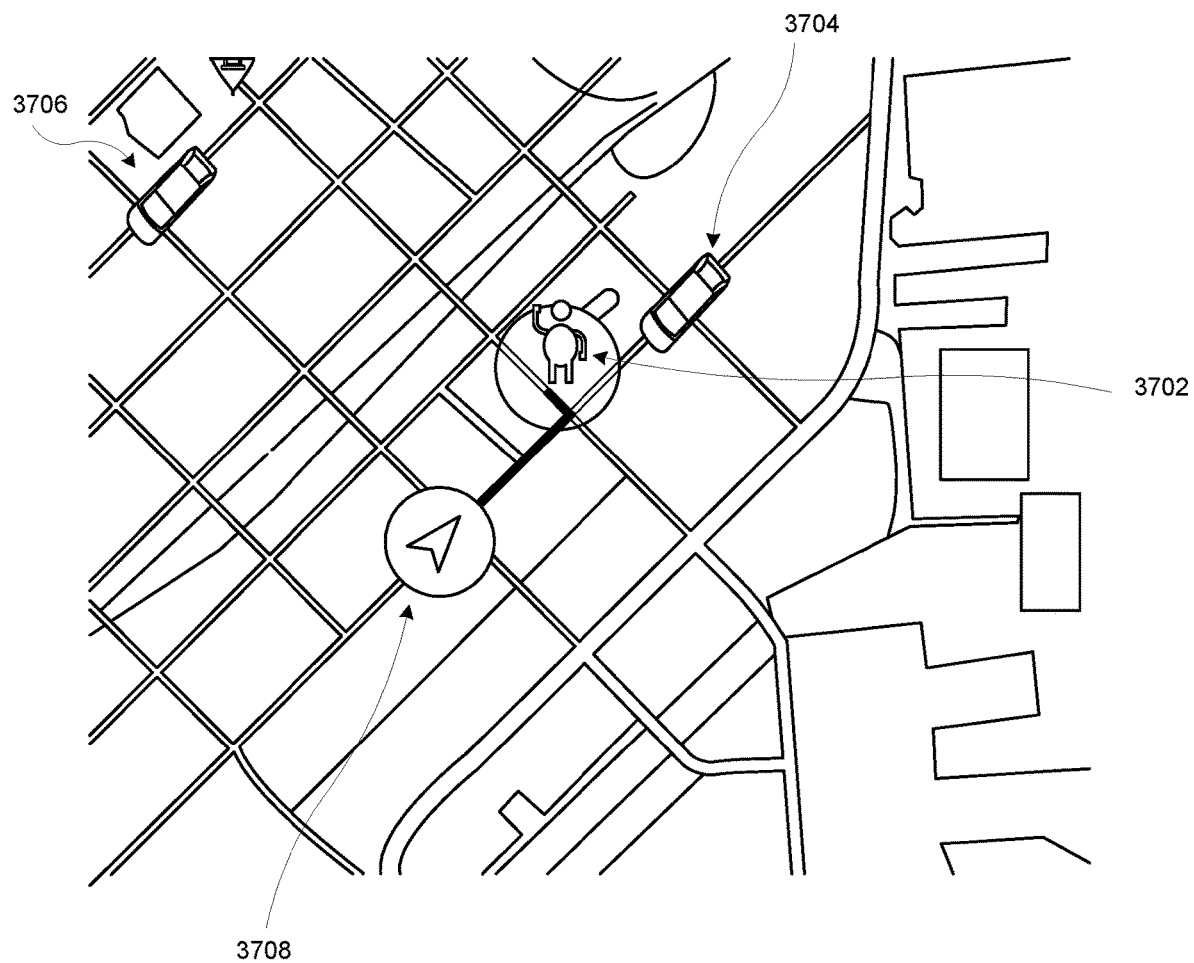
FIG. 37 is a diagrammatic view of a map illustrating a situation leading to an example offline driver match in accordance with the present disclosure.

FIG. 37 is a diagrammatic view of a map illustrating a situation leading to an offline driver match in accordance with the present disclosure. In this example, a transportation requestor device location 3702 may be very close to an offline transportation provider device location 3708. Other providers 3704 and 3706 may not meet certain constraints (e.g., no car seat) or may be too expensive for the requestor. The requestor, therefore, may choose a transportation mode including a queue to see if other providers become available that have attributes that more fully meet requestor preferences than attributes of providers 3704 and 3706. Here, an offline provider device at location 3708 may display a good match to the nearby requestor device in order to entice the offline provider to go online and service the ride. In contrast to using the provider-availability solution with historical data, the use of pre-request matching with real-time information may allow the matching system to surface offers which utilize system resources more efficiently, such as delaying dispatch immediately for a reduction in price. Accordingly, the system may encourage requesters to wait if needed, rather than repeatedly requesting and canceling. As a result, transportation network volatility may be decreased, and computational resources of the system may be preserved.

Figure 38:
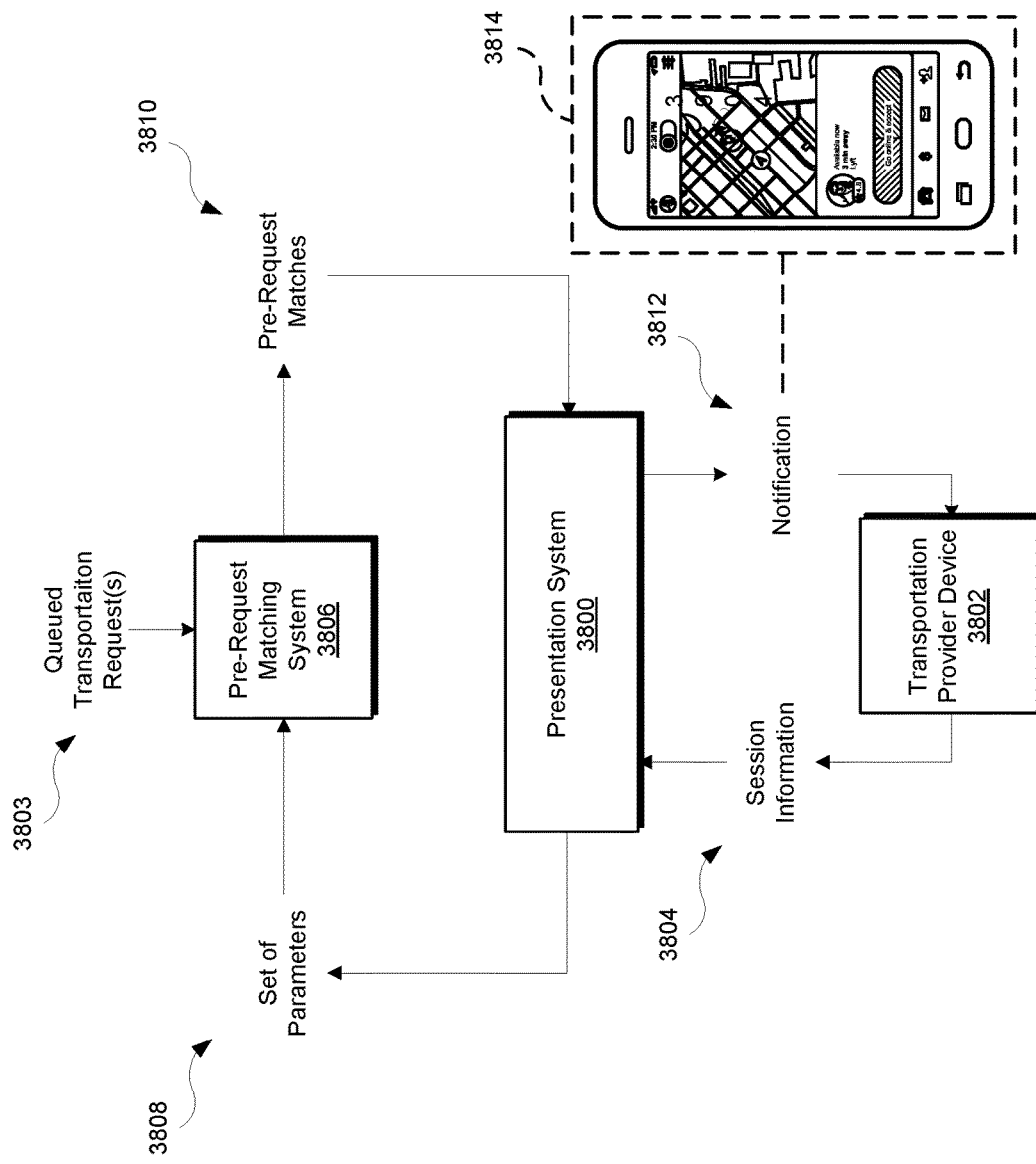
FIG. 38 is a block diagram illustrating a presentation system communicating an example concrete offering to a transportation provider device of an offline transportation provider in accordance with the present disclosure.

FIG. 38 is a block diagram illustrating a presentation system 3800 communicating a concrete offering 3812 for a ride 3814 to a transportation provider device 3802 of an offline transportation provider in accordance with the present disclosure. When an offline provider of transportation provider device 3802 fits the desired constraints/attributes of one or more queued transportation requests 3803, the system (e.g., pre-request matching system 3806 and/or presentation system 3800) performs a determination of benefits of having the offline provider come online as the pre-request matching system 3806 operates. The presentation system 3800 then selectively surfaces a selectable notification 3812 to the provider device. If the provider accepts, then the match is made. In addition, when the provider accepts provider device 3802 may enter an online mode, such that the transportation provider device is set to accept new transportation requests (e.g., after completing transportation for the newly accepted match). For example, presentation system 3800 may receive session information 3804 from provider device 3802 and may transmit a set of parameters 3808 to a pre-request matching system 3806. System 3806 may generate pre-request matches 3810, which may be received by presentation system 3800. System 3800 may also have the features and functionality of any other presentation system described herein. The use of pre-request matching with real-time information may enable the determination of a pre-request match for an offline provider with sufficient accuracy that the provider does not need to come online to see what match they can get. This may avoid unnecessary cancelations, thus reducing network volatility and improving requestor and provider experience. In addition, this may encourage providers that would not otherwise come online to come online and participate in the transportation network (e.g., for the initial concrete offering and for subsequent matches), thereby providing more transportation resources to the dynamic transportation network.

Figure 39:
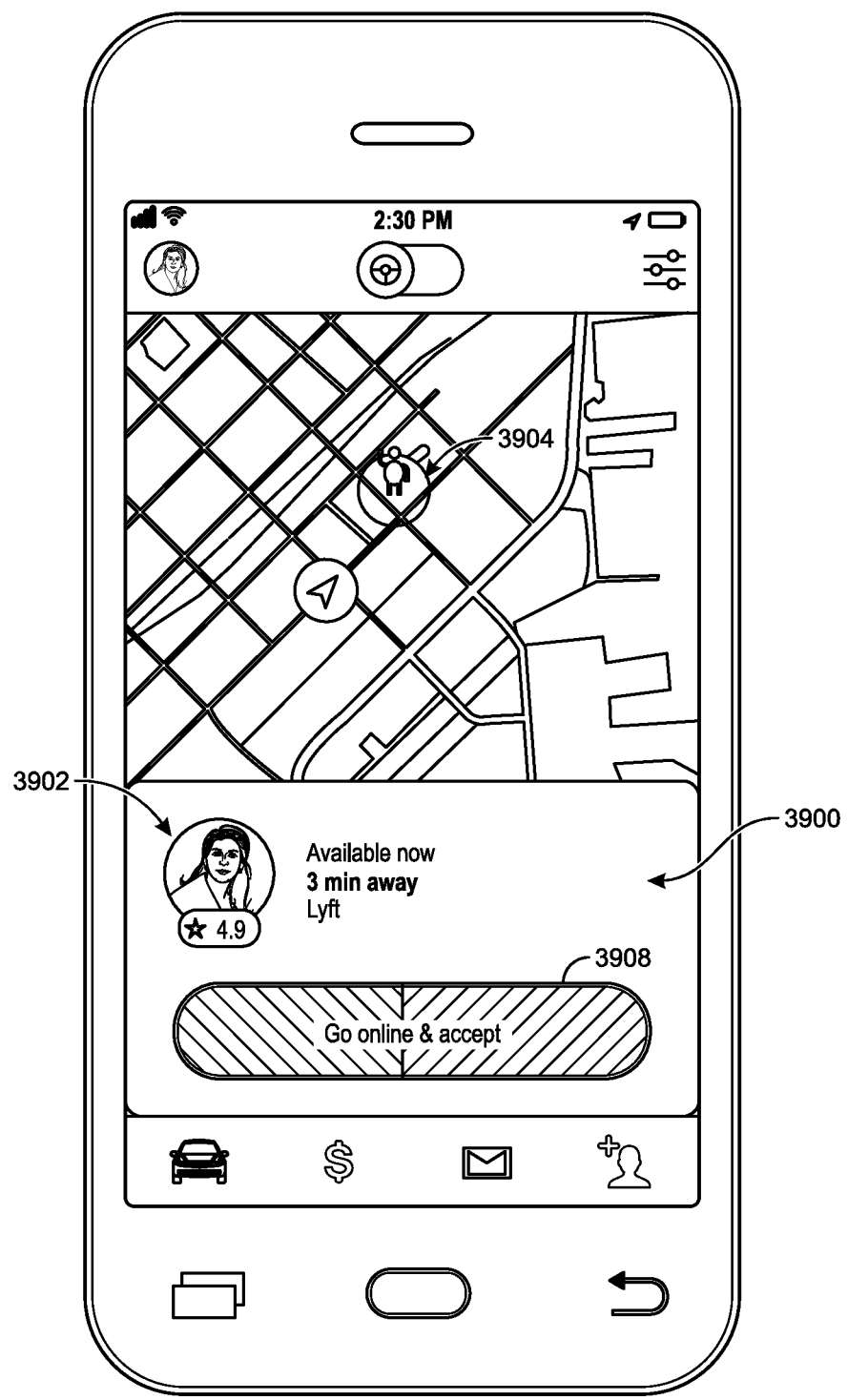
FIG. 39 is a view of a transportation provider device presenting an example concrete offering to an offline transportation provider in accordance with the present disclosure.

FIG. 39 is a view of a transportation provider device presenting a requestor-specific offering 3900 to an offline transportation provider in accordance with the present disclosure. The requestor-specific offering 3900 may be presented only to the offline driver for a predetermined duration (e.g., 5 to 10 seconds) in order to encourage the driver to go online, and the offer may include an option 3906 for the transportation provider to go online and accept a ride corresponding to the pre-request match. For example, the requestor-specific offering 3900 may be configured to cause the display of an exact transportation requestor 3902, value, time, distance, requestor location 3904, and route.

This example depicts an offline match to a queued ride. In this scenario, when there is a nearby queued rider waiting during a lack of transportation resources, offline drivers can be notified of an available match to a specific requestor and allowed to accept the ride directly. Queued requestors may stay unmatched until close drivers are available and encourage drivers to go online, thus potentially increasing rides per driver hour as well as driver hours during peak times. As a result, transportation network resources may be improved at times of undersupply.

Figure 40:
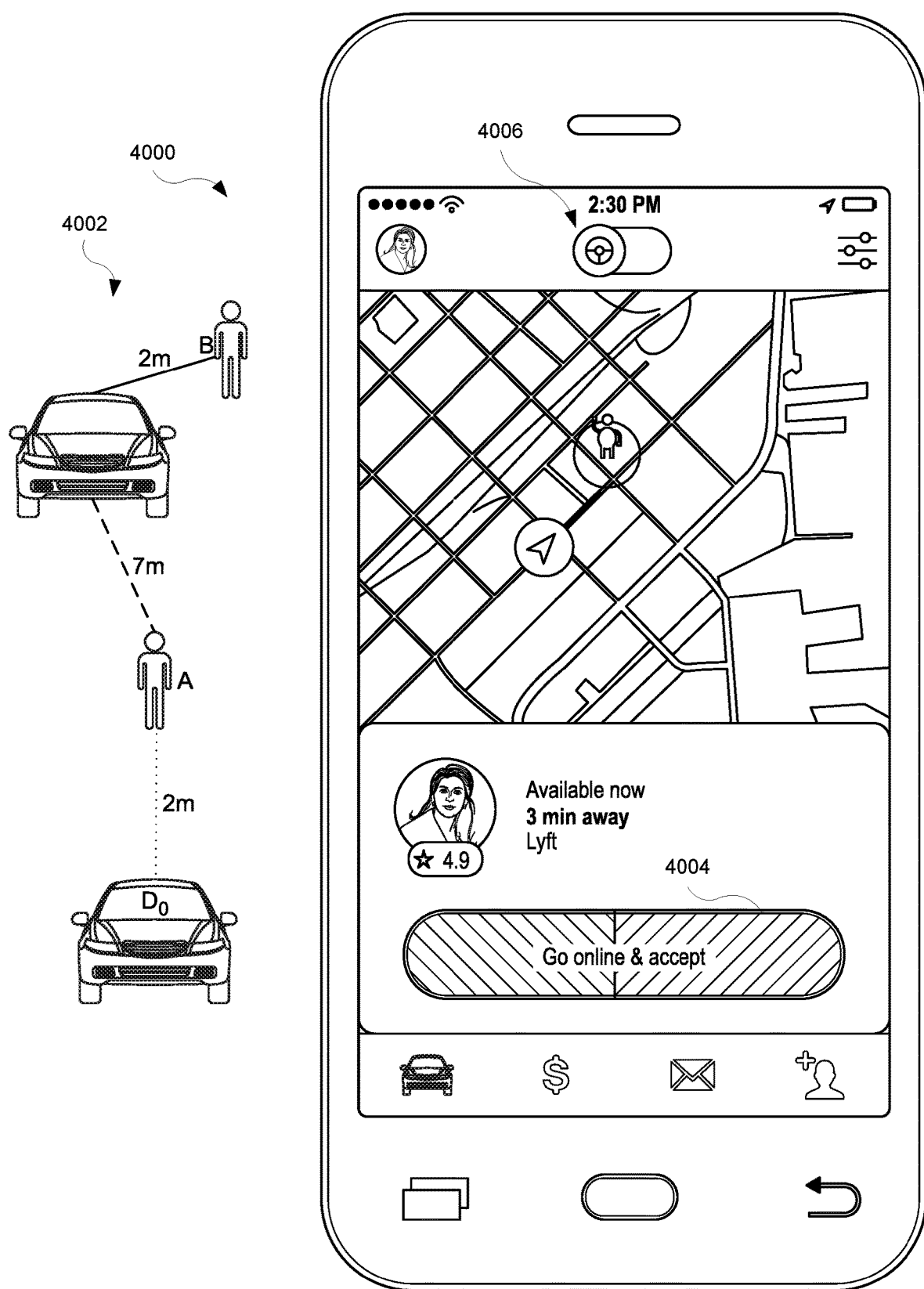
FIG. 40 is a view of a transportation provider device presenting an example concrete offering for a ride that, if accepted by the offline transportation provider, will trigger a predicted swap.

FIG. 40 is a view of a transportation provider device presenting a requestor-specific offering 4000 for a ride to a transportation provider who is offline, as indicated by offline indicator 4006. If accepted by the offline transportation provider, the offer will trigger a predicted swap 4002. With a "go online and accept" option 4004, a swap chain can be executed immediately upon the transportation provider going online and accepting the match by exercising option 4004. This functionality can increase total driver hours and decrease time per route that the provider spends driving to pick up a requester with no passenger in the vehicle.

Figure 41:
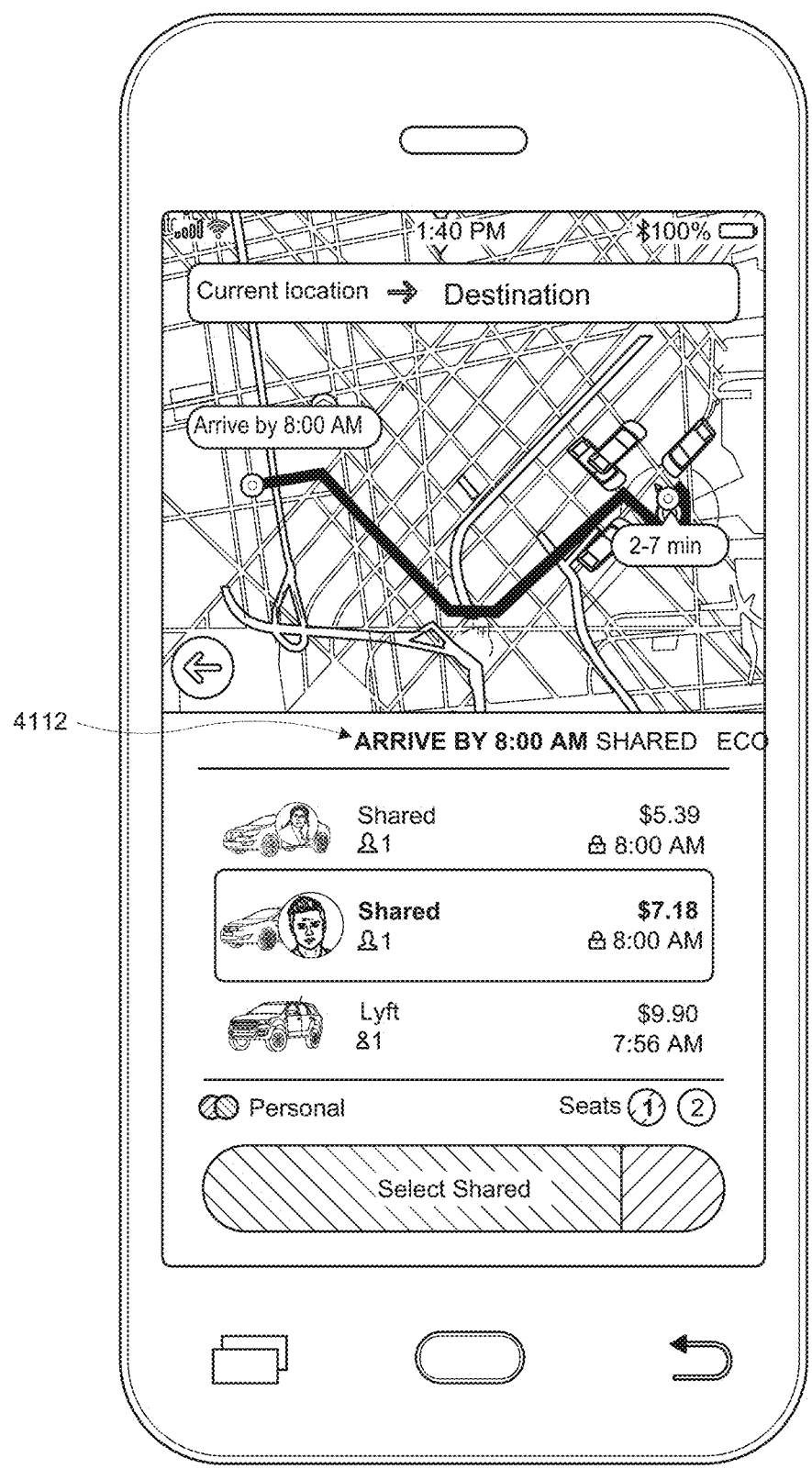
FIG. 41 is a view of a transportation requestor device presenting example pre-request matches across transportation modes for an arrival time constraint in accordance with the present disclosure.

FIG. 41 is a view of a transportation requestor device presenting pre-request offers corresponding to pre-request matches across transportation modes for an arrival time constraint 4112 in accordance with the present disclosure. With more reliable ETAs and ETDs as a result of pre-request matching, offers based on pre-request matches can be adapted in a mode selector of a requestor's application to a transportation requestor's personal needs, like arrival time. For an arrival time constraint 4112, the presentation system may receive the constraint 4112 in session information and determine which pre-request matches have an ETD corresponding to the arrival time, earlier than the arrival time, or within a threshold range earlier than the arrival time. A list of these matches may be curated (e.g., pruned or filtered to avoid rapid change of offers), ranked, and provided to the requestor's device by presentation system 1420 (see FIG. 14). Depending on requestor preferences received in the session information, various transportation modes may be included in the matches of the list, and this list may be presented as a mode in the mode selector.

Figure 42:
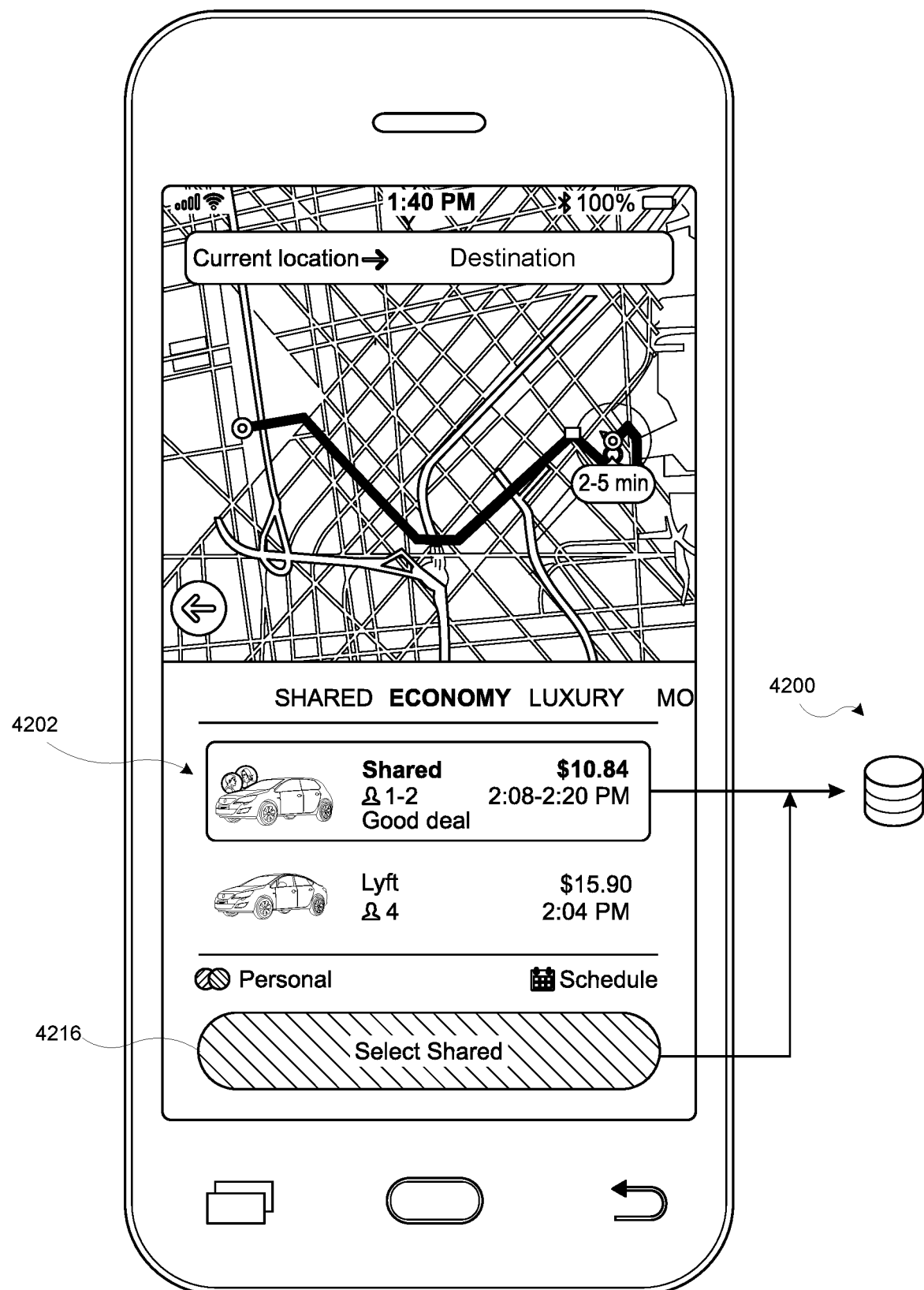
FIG. 42 is a view of a transportation requestor device presenting example pre-request matches with requestor expectation tracking in accordance with the present disclosure.

FIG. 42 is a view of a transportation requestor device presenting pre-request matches with requestor expectation (e.g., predicted ETA/ETD) tracking in accordance with the present disclosure. In order to meet requestor expectations (based, e.g., on projections presented on a requestor device), the expectations, such as an ETA/ETD of the currently selected offer 4202, given to a transportation requestor may be stored throughout a session at the time of request, such as when the requestor actuates control 4216. With the expectations subsystem 1520D described herein (see FIG. 15), a requestor expectation may be tracked by storing an offer ID in memory 4200 (e.g., database, computer memory, etc.). Tracking of requestor expectations in this fashion may aid in determining which offerings were selected for future forecasting and intelligent nudging, and also provide downstream systems with access to requestor expectations (e.g., ETA/ETD of a selected offer), for example by keeping ETD even after a driver cancel-rematch. In this case, a match may have been canceled by a provider and/or because of a triggered swap. The matching compute engine may then use the stored ETD of the canceled match as a constraint in requesting a re-match for the requestor. Accordingly, a level of utilization of a driver may be maintained despite a canceled request from a passenger, while simultaneously fulfilling the request of a ride, even in a shared rides context. Additionally, rider retention may be increased because requestors receive accurate offers for pre-request matches, requestor expectations are usually met, and requestors are fairly compensated for rare failures to meet expectations.

Figure 43:
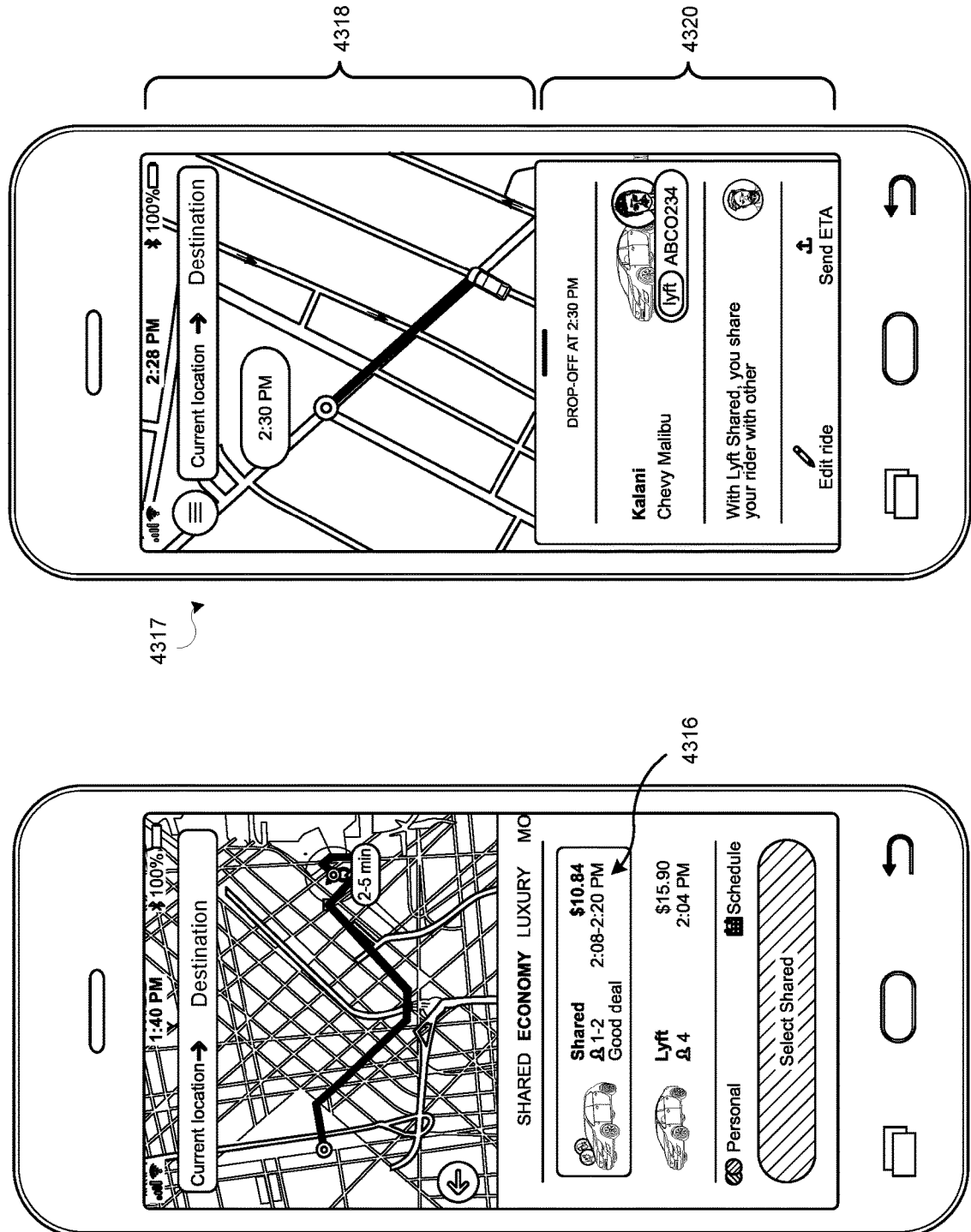
FIG. 43 is a view of transportation requestor devices presenting example pre-request matches by tracking the failure to meet requestor expectations across rides in accordance with the present disclosure.

FIG. 43 is a view of transportation requestor devices presenting pre-request matches by tracking unmet expectations across rides in accordance with the present disclosure. In this example, a requestor is shown an expected ETD 4316, but the actual shared ride has many detours and traffic proves to be an issue (and/or other potential factors, such as navigation routing errors, which may also contribute to a failure to meet an ETD). As a result, the actual time at which the requestor arrives at the destination turns out to be ten minutes later than expected. The requestor device and/or provider device may notify the presentation system of the actual ETD upon ride completion, and, with the requestor's permission, the presentation system may store this information as an unmet expectation. Accordingly, the next time the user, who has opted into expectation tracking, requests shared offerings at 4317, the presentation system may observe the unmet expectation stored in memory and respond by presenting an upgrade to the requestor. For example, the system can generate a match for the requestor more quickly by promoting a position of the requestor in a queue, the system can ensure a highly accurate ETA/ETD, and/or the system can preferentially generate a match for the requestor based on attributes that a requestor profile indicates are preferred based on past requestor selections (e.g., similar offerings to the requestor resulted high rates of session conversion, where the requestor tended to accept the similar offerings and/or not cancel matches corresponding to the similar offerings) and/or information the system has accumulated about the requestor's profile. For example, the system may use a lower detour threshold for requesting pre-request matches and/or for curating and arranging the matches in display region 4320. In this way, for a subsequent ride following an unmet expectation, the requestor may be ensured a good experience with less detours exhibited in a route displayed in region 4318. Advantageously, this functionality may increase requestor retention. In contrast to using the provider-availability solution with historical data, the use of pre-request matching with real-time information may allow offers to be formulated with accurate ETAs, ETDs, and prices, and this accuracy may decrease the frequency with which requester expectations are not met. As such, the expectations may be tracked and rewards provided that make up for unmet expectations, and the system costs of these rewards may be accurately determined, thus avoiding detrimental impact to the state of the transportation network at critical times. Accordingly, the expectation subsystem can provide a dynamic system customizable for each requestor as it relates to current market conditions.

Figure 44:
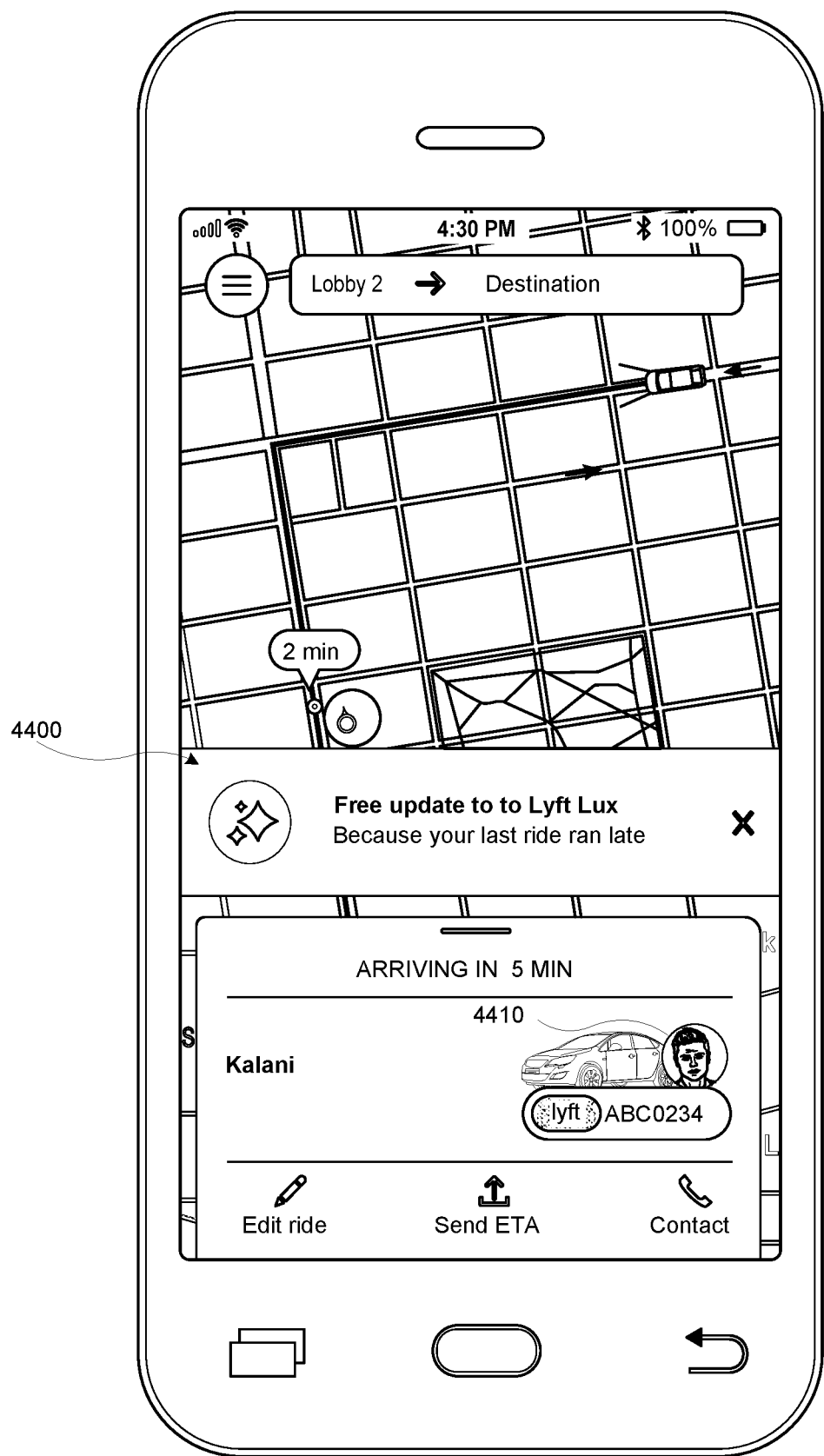
FIG. 44 is a view of a transportation requestor device presenting example pre-request matches that make up for an unmet requestor expectation in accordance with the present disclosure.

FIG. 44 is a view of a transportation requestor device presenting pre-request matches that are configured as a reward for a requestor in response to an unmet expectation (e.g., a previous transportation request did not satisfy the ride attributes of an offer previously presented) in accordance with the present disclosure. In this example, an offer 4400 for an automatic upgrade to a luxury level private car may be provided to a requestor when an expectation is not met. This upgrade may be triggered in a situation where there is little system cost for the upgrade, and because requestor preferences and past behavior indicate that the offer will be perceived as an upgrade (e.g., the requestor does not normally use luxury level private cars), and the requestor is seeking a private ride in private car mode. Accordingly, the presentation system may be notified of and store an unmet expectation, such as when a provider of an accepted offer for a private ride cancels on a requestor. The next time the requestor selects private car mode, the expectation sub-system 1520D (see FIG. 15) of the presentation system 1500 may observe the unmet expectation stored in memory of the presentation system 1500 and respond by requesting pre-request matches from pre-request matching system 1516 to luxury level private cars, determining that there is a luxury level private car match available with system cost below a threshold, and present an offer 4400 for a free upgrade to the requestor.

Figure 45:
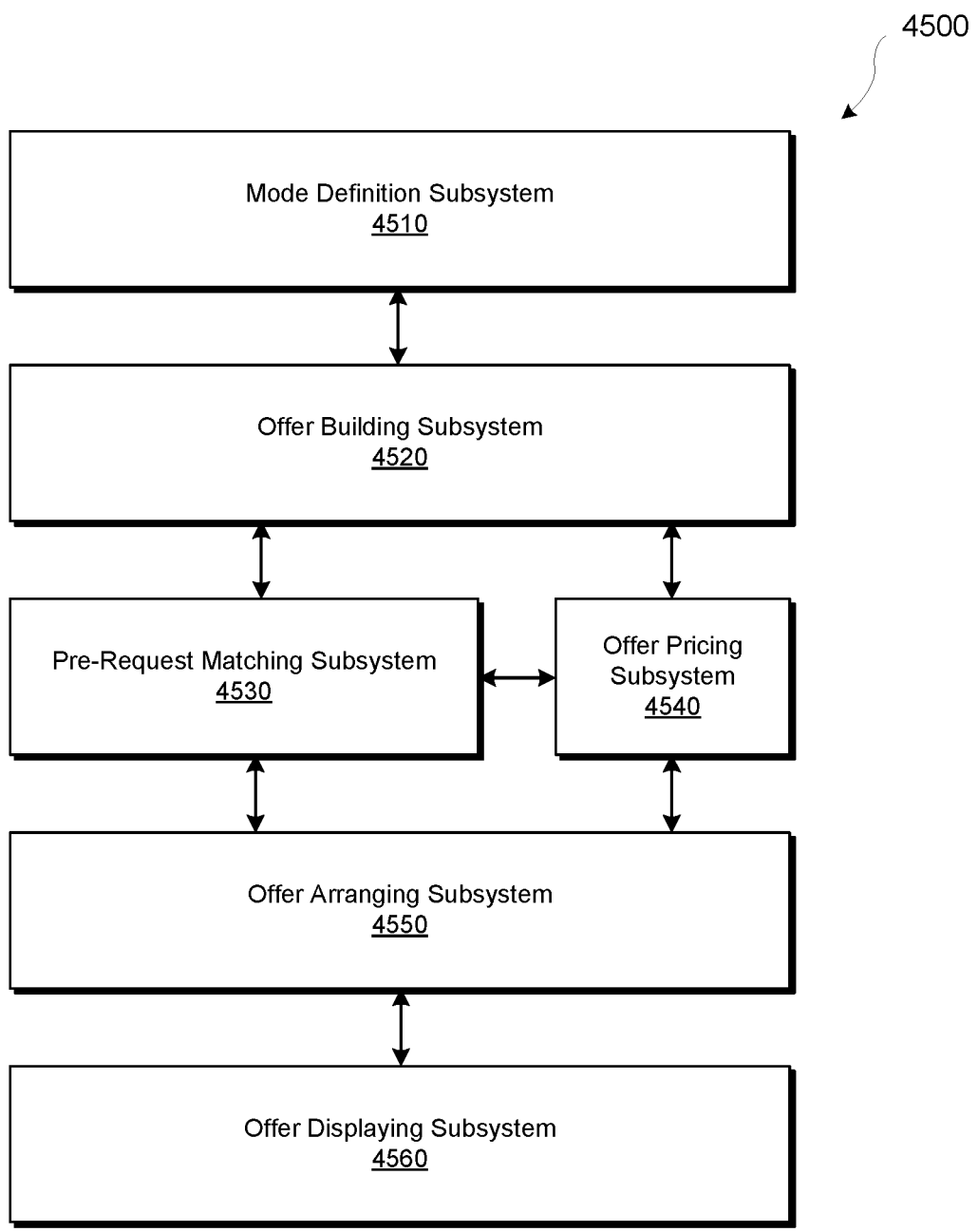
FIG. 45 is a block diagram illustrating an example pre-request matching service platform in accordance with the present disclosure.

FIG. 45 is a block diagram illustrating a pre-request matching system 4500 in accordance with the present disclosure. This system 4500 may invoke a collection of subsystems, each providing a different function. For example, mode definition subsystem 4510 may define transportation modes based on product lines (which, e.g., may be manually curated) and/or be associated with one or more attributes. Inheritance features (combinations of curated product lines, attributes, constraints, etc.) may make ride type a viewable abstraction for humans to easily curate without needing downstream changes. Example curated product lines include a private car mode corresponding to direct trips provided by vehicles with drivers, shared vehicles (e.g., multiple requestors sharing a vehicle) with drivers, luxury vehicles with drivers, micromobility vehicles (e.g., electric bikes, two-wheeled scooters, three-wheeled scooters, etc.), and/or public transportation. Example attributes may include miles per gallon (MPG) constraints, walking constraints, waiting constraints, and metrics associated with provider compensation. Transportation modes can thus be defined in minutes as combinations of other modes, attributes, constraints, etc., with examples being detailed below with respect to FIGS. 10-12.

Offer-building subsystem 4520 may build out potential offers for the modes (e.g., walk-to-save, green mode, etc.). An offer, for example, may provide a transportation experience specific to a requestor (e.g., a lower cost) in exchange for walking and/or waiting. An example walk-to-save offer (e.g., for a requestor to walk to a pick up location) may define a distance limit (e.g., two blocks) and an example wait-to-save offer (e.g., for the requestor to delay being matched to a provider for a less expensive transportation cost) may define a time limit (e.g., up to eight extra minutes). This offer-building subsystem 4520 may enable tuning of experiences in real time to supply a balance-based batch window and detour constraints based on past matches.

Pre-request matching subsystem 4530 may determine pre-request matches for the potential offers as described herein. Pre-request matching subsystem 4530 may operate as a source of truth predictions by using real-time information about the state of the transportation network as described herein. The process used to determine pre-request matches may be the same or similar process that is used to make matches, and it may take advantage of matches that are already available (e.g., cached). Offer arranging subsystem 4550, as described in FIGS. 14 and 15 as a presentation system, may use a set of match constraints to present the most likely transportation provider, considerate of swaps, matches, and walks.

Offer pricing subsystem 4540 may price the potential offers according to pricing policies (heuristics, rules, schemes, etc.). For example, offer pricing subsystem 4540 may price potential offers within each possible batch window for all transportation modes. In some implementations, the pricing may be carried out with the pre-request matches providing real-time transportation network conditions as described in more detail below.

Offer arranging subsystem 4550 may curate and arrange a set of offers for a transportation requestor in various ways that are described in greater detail below. In brief, offer arranging subsystem 4550 can apply a user-specific filter to a set of pre-request matches for a user and sort the offers for presentation to the user. For example, offer arranging subsystem 4550 may arrange categories, modifiers, and upsells (based on ETA, likelihood of conversion, etc.) as detailed above with reference to FIGS. 14-23. For example, in various categories that can correspond to transportation modes, attribute modes, constraint modes, etc., offer arranging subsystem 4550 can provide a ranked list of matches and corresponding prices.

Offer displaying subsystem 4560 may display offers to users on user devices. Offer displaying subsystem 4560 may be implemented as a requestor app that presents offers for a user-selected menu option (e.g., mode, constraint, etc.) according to the arrangement provided by offer arranging subsystem 4550. A user may select a displayed offer to make a request and do so confidently because the offer presented to the user is accurate such that the information displayed associated with the transportation request is based on information that is updated in real-time based on an updated, cached global matching solution. Each offer may already contain all of the request parameters needed to match as each offer was developed using pre-request matching. For example, an offer may have the mode, attributes and constraints (e.g., price, transportation type, etc.), and other parameters that were used as variants by the pre-request matching system in in determining the likelihood of the match. Accordingly, when a requestor selects the offer and makes the request to accept the offer, a corresponding call of the matching compute engine uses those parameters, and thus results in a conforming match for the requestor. Prices, requestor expectations (e.g., ETA, ETD, etc.), and constraints may be immutably stored and fully resolved after upsells and/or modifiers are applied.

In operation, offer displaying subsystem 4560 may poll offer arranging subsystem 4550 when the user opens the app and/or accesses the user device. Offer arranging subsystem 4550 may receive session information from the user device and then call the other subsystems. Offer arranging subsystem 4550 may provide the match constraint set to pre-request matching subsystem 4530 based on the session information and may receive pre-request matches for offers that it curates, arranges, and communicates to the user device.

Figure 46:
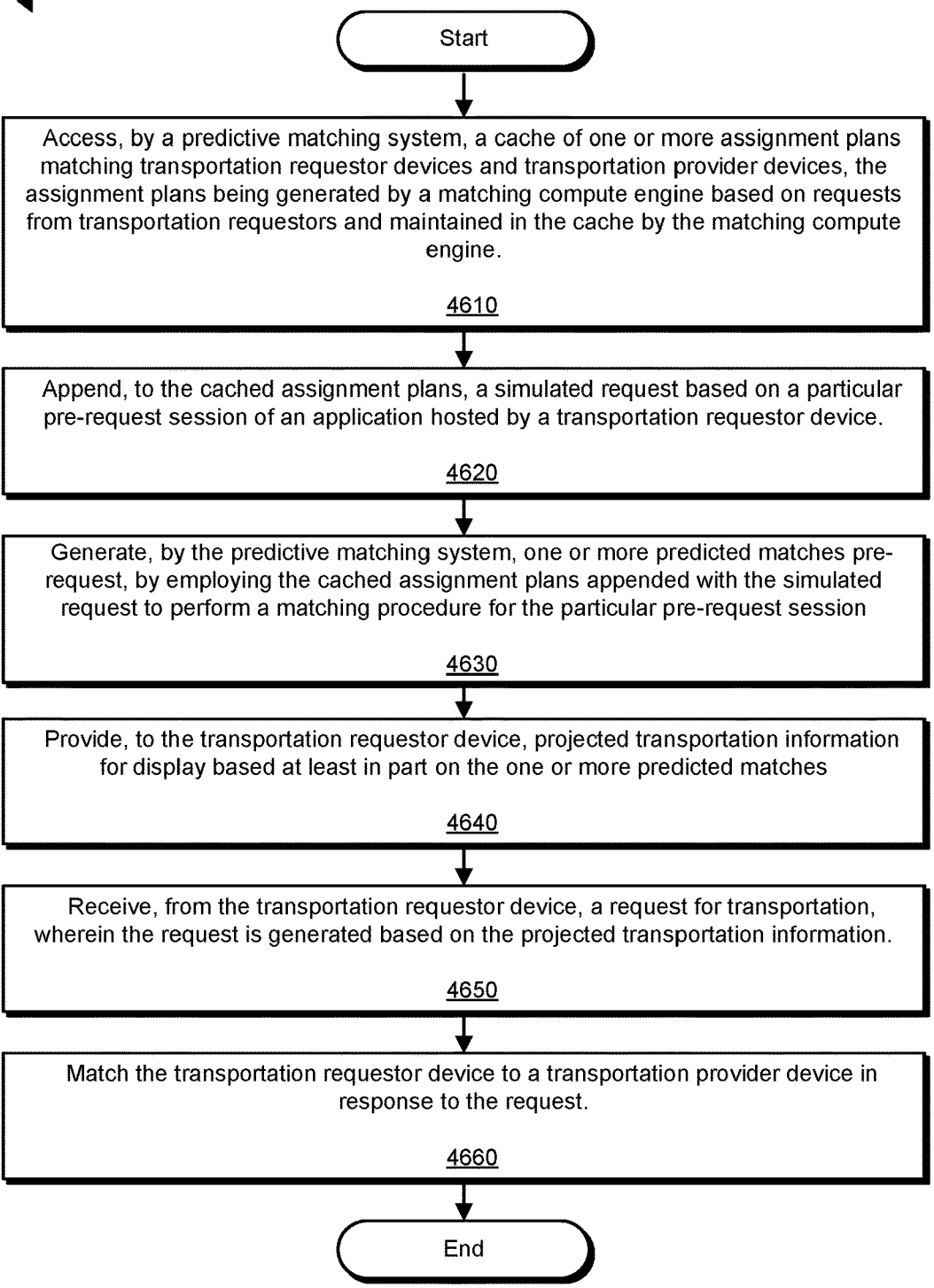
FIG. 46 is a flow diagram of an exemplary method for performing pre-request matching of transportation provider devices to transportation requestor devices in accordance with the present disclosure.

FIG. 46 is a flow diagram of an exemplary method for performing pre-request matching of transportation provider devices to transportation requestor devices in accordance with the present disclosure. Steps 4610-4660, described immediately below, may be carried out by one or more physical processors of a dynamic transportation matching system (e.g., as described later with reference to FIGS. 51-53). One or more physical processors may be implemented as one or more servers configured to serve client applications operating on user devices as will be further detailed below.

Continuing with reference to FIG. 46, beginning at step 4610, the method 4600 includes accessing, by a predictive matching system, a speculative state in a cache of one or more assignment plans matching transportation requestor devices and transportation provider devices, the assignment plans being generated by a matching compute engine based on requests from transportation requestors and maintained in the cache by the matching compute engine. By way of example, the cache may be represented by cached speculative state 810 in FIG. 8. For example, the speculative state may include information about transportation providers that are available for a match and unmatched transportation requests that are provided as input to the subsequent matching operation (assuming, e.g., that matches from a previous matching operation are successfully executed). Additionally or alternatively, the speculative state may include information about existing transportation plans based on matches (e.g., a route to be taken by a transportation provider to provide transportation to one or more transportation requestors including, e.g., estimated times of pick-up and drop-off events). In some examples, the speculative state may include information about hypothetical matches between transportation providers and transportation requestors (e.g., hypothetical routes, predicted estimated time of arrival (ETA) of providers to requestors and/or predicted estimated time to destination (ETD) for requestors, etc.).

The speculative state may be generated by a matching system based on the status of transportation providers and requests from transportation requestors and maintained in the cache by the matching system. An individual match of a requestor device to a provider device may be characterized by a matching plan that has a specific route, provider, and requestor, and may also have an associated ETA, an ETD, a system cost, a price, etc., that are determined and/or predicted based on characteristics of the route (e.g., geolocations of the origin and destination), the provider, and/or the requestor. The matching plan may describe a trip or ride provided to the requestor by a provider. Processing may proceed from step 4610 to step 4620.

At step 4620, the method 4600 may include appending, to the cached assignment plans, a simulated request based on a particular pre-request session of an application hosted by a transportation requestor device. The simulated request may include pickup location and drop off location information for the session, along with a plurality of potential constraints that may be based on user preferences. However, unlike an actual request, the simulated request does not specify a particular transportation mode and set of constraints. Processing may proceed from step 4620 to step 4630.

At step 4630, the method 4600 may include generating, by the predictive matching system, one or more predicted matches pre-request, by employing the cached assignment plans appended with the simulated request to perform a matching procedure for the particular pre-request session. In some examples, the pre-request matching system may generate pre-request matches for a plurality of variants (e.g., that include one or more parameters and/or constraints under which a match is to be made). The pre-request matches may be generated by employing the speculative state to call a matching procedure pre-request for a particular session of an application hosted by at least one of a transportation provider device or a transportation requestor device. In some examples, the pre-request matching system may use different sets of attributes that are each compatible with user attributes for a user (e.g., requestor or provider) of the particular session. In some examples, the variants may be defined based on user preferences (e.g., that may be stored locally as user data and/or received from a user device). User preferences may include user-supplied preferences and/or may be based on historical data of observed user behavior. Examples of transportation modes, which will be described in greater detail below, include, a direct ride mode (e.g., where a requestor is picked up in a private vehicle at the requestor's origin and taken to the requestor's destination), a shared ride mode (e.g., where parts of a requestor's trip overlap with parts of other requestors' trips, resulting in sharing the provider vehicle with other requestors for at least a portion of the requestor's trip), a luxury ride mode (e.g., where the provider vehicle is a luxury vehicle as defined by make, model, and/or other attributes), a micromobility vehicle mode (e.g., where a requestor reserves and rides on a micromobility vehicle), a shared-ride-with-walking mode (e.g., where a requestor shares the provider vehicle with other requestors for at least a portion of the trip and the requestor walks to a pick-up location, thereby minimizing detours for other requestors in the provider vehicle), an economy mode (e.g., using a non-luxury provider vehicle and allowing the requestor to use the available seats in the provider vehicle for accompanying passengers), a queueing mode (e.g., where a requestor waits in a queue for a match instead of being matched to a transportation provider within seconds), and/or a green mode (e.g., where the provider vehicle is a an ecologically friendly vehicle, such as a hybrid or electric vehicle, as specified by make, model, and/or other attributes). User attributes may include preferred transportation modes and/or constraint parameters. Example user attributes include attributes for providers (e.g., vehicle attributes (e.g., passenger capacity, car seat availability, make, model, luxury type, etc.), driver location, driver preferences, driver rating, etc.) and requestor attributes (e.g., passenger preferences (e.g., modes (e.g., saved preference for and/or probability of conversion for a transportation request with attributes associated with a walking distance, vehicle capacity, modality type, etc.), priority of price versus convenience, etc.) passenger location, passenger destination, number of seats required, the need for car seats, departure time requirement, arrival time requirement, maximum price, etc.). Processing may proceed from step 4630 to step 4640.

At step 4640, the method 4600 may include providing, to the transportation requestor device, projected transportation information for display based at least in part on the one or more pre-request matches. In some examples, the pre-request matching system may be configured to generate a pre-request match for the particular session that remains accurate (e.g., in terms of ETA/ETD) at least until the end of a subsequent matching window (e.g., duration of two seconds or less), which is a time duration for which a matching solution, and thus predictions based on the matching solution are treated as accurate. Pre-request matches may be updated at the end of the matching window. The speculative state may correspond to a union of all unchanged matching plans and new matching plans not requiring acceptance. A solution resulting from this union may be identical to a solution that would result from solving the entire matching problem again, but the union operation may be carried out with much greater speed compared to an entire resolve operation. Processing may proceed from step 4640 to step 4650.

At step 4650, the method 4600 may include receiving, from the transportation requestor device, a request for transportation, wherein the request is generated based on the projected transportation information. This request may be received from a transportation requestor device by the matching compute engine as discussed herein and as illustrated in FIGS. 14 and 15. Processing may proceed from step 4650 to step 4660.

At step 4660, the method 4600 may include matching the transportation requestor device to a transportation provider device in response to the request. The matching compute engine may perform the matching as described above with reference to FIGS. 7-9. The match may further be communicated to the requestor device.

The matching procedure called by the pre-request matching system may utilize the same or a similar matching process (e.g., the same matching filters, the same scoring logic, etc.) utilized by the matching compute engine as described herein (e.g., with reference to FIGS. 7-9). The matching procedure called by the pre-request matching system may also account for potential swaps caused by a request that can be made by the user. As used herein, the term "swap" may, in some examples, refer to any scenario in which a transportation requestor matched to a transportation provider is re-matched to a different transportation provider. As may be appreciated, an initial swap may precipitate a chain of swaps as transportation requestors are unmatched from transportation providers. The matching procedure called by the pre-request matching system may further determine pre-request shared rides matches by allowing for requestors to be matched to a same provider under certain constraints. Example constraints may include a first constraint that a later-in-time requestor must have a pickup location within a threshold radius of a point along a not-yet-traversed portion of a route of a plan for an already matched requestor, and a second constraint that a drop-off location for one of the requestors is within another threshold radius of a not-yet-traversed portion of a route of a plan for the other one of the requestors. Potential walks (i.e., the incorporation of walking into a transportation plan) can also be accommodated in a similar fashion, by allowing for a pickup location and/or drop-off location to be within another threshold radius of the requestor's location or destination, respectively. In this way, the pre-request matching system may achieve swift and accurate pre-request match determination.

In some implementations, step 4640 may additionally include receiving, from the transportation requestor device, a request for transportation and matching the transportation requestor device to a transportation provider device in response to the request and based at least in part on the one or more pre-request matches. In this case, the match that is made is a post-request match that results in a plan that is communicated to a transportation provider device. This match can be made using the same parameters that resulted in the pre-request match, as these parameters are embodied in the pre-request match. Thus, selection of the pre-request match can cause communication of a request specifying the parameters of the pre-request match, thereby causing the post-request match to be made based on the pre-request match.

In additional or alternative implementations, the projected transportation information for display at step 4640 may include, in addition to other information detailed herein, an estimated time of arrival (ETA) of a transportation provider and is based at least in part on the one or more pre-request matches. For example, one or more of the pre-request matches may have an ETA, and this ETA can be displayed as part of the projected transportation information. Depending on the types of pre-request matches, more than one of the pre-request matches may have an ETA, and these ETAs may be different from one another. Accordingly, the information for display may show the ETA for each pre-request match in a way that clearly communicates which ETA is associated with which pre-request match. Additional information displayed at step 4640 may include a route, a provider, a pickup location, a drop off location, and a price.

In additional or alternative implementations, the pre-request matching system generates the one or more pre-request matches before the matching system generates matching plans again. In some implementations, a cycle of the pre-request matching system may be configured to run, and thus process each session information in parallel, immediately after a cycle of the matching compute engine is completed. This configuration may ensure that the pre-request matches will be accurate for as long as possible, and when another cycle of the matching system is run, the pre-request matching system may run again based on cached request information to determine if pre-request matches are still optimal and update any pre-request matches that are no longer optimal. When a request is received from a session of a device, then any pre-request matches impacted by the received request (e.g., pre-request matches involving that session) may be pruned, flushed, or otherwise deleted from memory. Reservations for that session may also be removed.

In additional or alternative implementations, step 4630 may include appending a simulated request based on the pre-request session to the cached matching plans and performing the matching procedure by the pre-request matching system on cached matching plans appended with the simulated request. The simulated request may be based on pickup and drop-off locations specified in the session information, as well as one or more additional selections that are in accordance with preferences of the requestor. For example, a simulated request may be generated for each of multiple transportation modes that are compatible with requestor preferences, and various constraints may also be specified in various simulated requests.

In additional or alternative implementations, step 4630 may include generating, by the pre-request matching system, one or more additional pre-request matches pre-request, by employing the cached matching plans to perform a matching procedure for a different particular pre-request session of the application hosted by a different transportation requestor device. Accordingly, step 4640 may include providing, to the different transportation requestor device, projected transportation information for display based at least in part on the one or more additional pre-request matches. In this way, multiple sessions of multiple transportation requestor devices can receive pre-request matches based on session information received from the respective devices.

In additional or alternative implementations, step 4630 may include generating, by the pre-request matching system, one or more additional pre-request matches by employing the cached matching plans to perform a matching procedure for an offline session of an application hosted by a transportation provider device. Accordingly, step 4640 may include providing, to the transportation provider device, projected transportation information for display based at least in part on the one or more additional pre-request matches. The offline session of the transportation provider device may be one that does not indicate that a transportation provider is currently available, even though an application may be open on the device of the transportation requestor. The pre-request matching procedure may, based on session information indicating at least a location of the transportation provider device, determine a pre-request match by simulating availability of the transportation provider in the cached matching plans.

Figure 47:
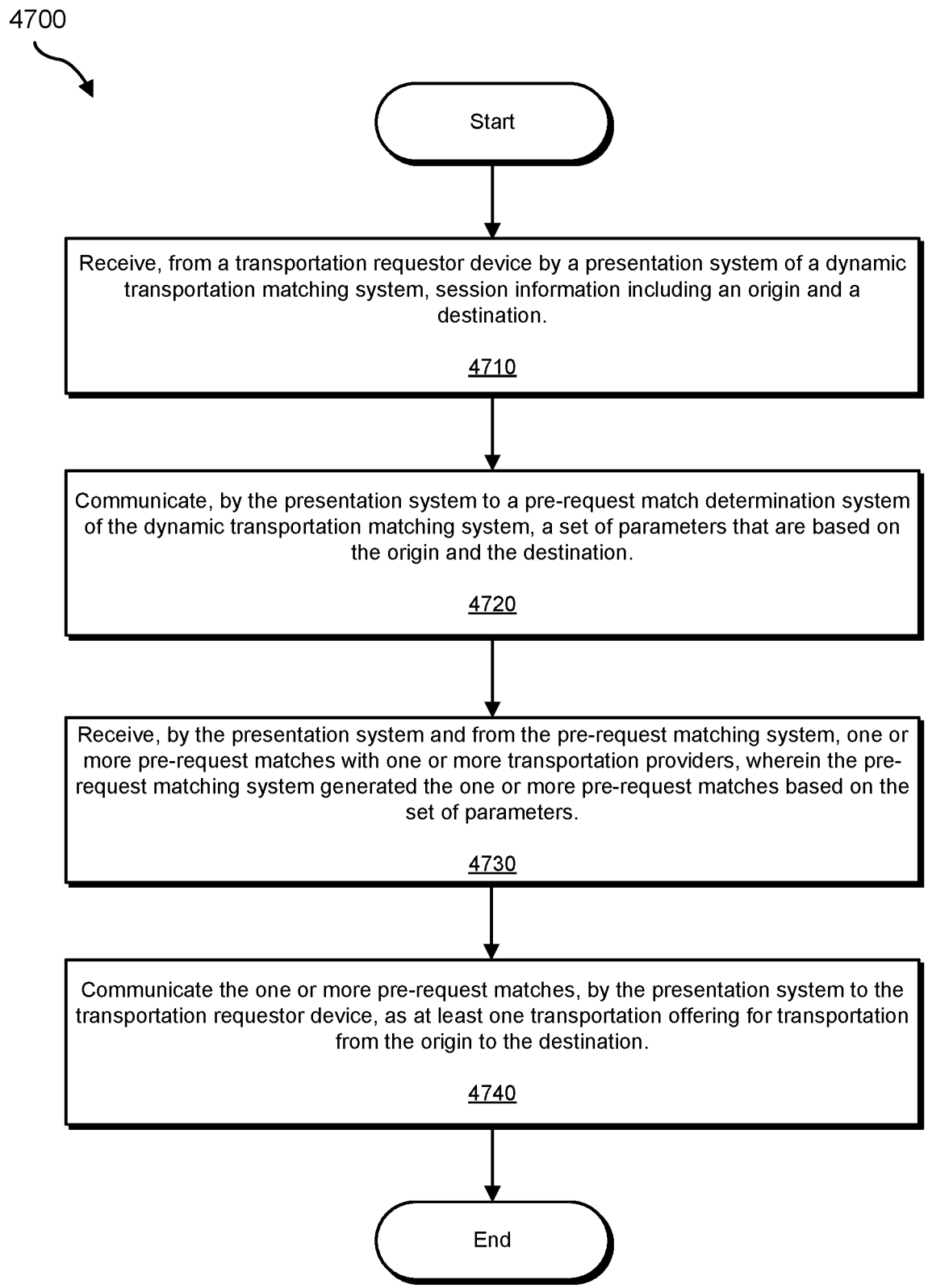
FIG. 47 is a flow diagram of an exemplary method for communication multiple, concrete offering for specific plans for a transportation mode in accordance with the present disclosure.

FIG. 47 is a flow diagram of an exemplary method for communicating multiple, provider-specific offering for specific plans for a transportation mode in accordance with the present disclosure. Steps 4710-4740, described immediately below, may be carried out by one or more physical processors of a dynamic transportation matching system as described later with reference to FIGS. 51-53. It is envisioned that the one or more physical processors may be implemented as one or more servers configured to serve client applications operating on user devices as will be further detailed below.

Continuing with reference to FIG. 47, beginning at step 4710, the method 4700 may include receiving, from a transportation requestor device by a presentation system of a dynamic transportation matching system, session information including an origin and a destination. In some embodiments, the origin may be the current location of the device or a location specified by a requestor, and the destination may be specified by session information. Additional session information may include, for example, requestor preferences that can indicate a value or upper or lower limit for a value range of one or more constraints (e.g., a maximum walking distance, a minimum number of car seats, etc.). Processing may proceed from step 4710 to step 4720.

At step 4720, the method 4700 may continue by communicating, by the presentation system to a pre-request matching system of the dynamic transportation matching system, a set of parameters that are based on the origin and the destination. In some examples, the set of parameters may be further based on user preferences. In various examples, user preferences may specify, constrain, and/or influence constraints that are utilized for making and/or evaluating pre-request matches. Also, the pre-request matching system may be configured to generate pre-request matches for a plurality of variants that include pickup and drop off request parameters and transportation modes and/or other constraints. Processing may proceed from step 4720 to step 4730.

At step 4730, the method 4700 may continue by receiving, by the presentation system and from the pre-request matching system, one or more pre-request matches with one or more transportation providers, wherein the pre-request matching system generated the one or more pre-request matches based on the set of parameters. In this example, the pre-request matching system may have generated two or more pre-request matches based on the set of parameters in any manner previously described. At least one aspect of a pre-request match received in step 4730 may be based on a selected preference of a transportation requestor. For example, a requestor preference (e.g., regarding willing to walk, price sensitivity, etc.) may set a value or limit for a constraint that is used to determine pre-request matches. Additionally, at least one of the two or more of pre-request matches may be selected by the pre-request matching system based on at least one current transportation matching condition. The current transportation matching condition may include any condition that may contribute to a determination that a potential match is suitable for presenting to a transportation requestor, such as the various criteria for determining a match described herein. For example, the current transportation matching condition may include a determination that matching a transportation provider to the transportation requestor would increase overall matching efficiency within the dynamic transportation network, that matching the transportation provider to the transportation requestor would increase overall transportation resource utilization within the dynamic transportation network, a determination that a match between the transportation requestor and the transportation provider would result in transportation resources within the dynamic transportation network being distributed more efficiently (e.g., would result in the transportation provider being relocated to an area where the transportation provider could be efficiently utilized within the dynamic transportation network), a determination that the transportation provider is not currently the basis for a pre-request offering to another transportation requestor, etc. Processing may proceed from step 4730 to step 4740.

At step 4740, the method 4700 may continue by communicating the one or more pre-request matches, by the presentation system to the transportation requestor device, as at least one transportation offering for transportation from the origin to the destination. The matches that are presented may be selected from among a plurality of matches based on constraint space optimization and ranking as described herein at least with reference to FIGS. 16-23.

As detailed above with reference to FIG. 15, the method 4700 may also include additional steps, such as receiving, by the presentation system of the transportation requestor device, a selection of one of the transportation offerings (e.g., where the selected offering corresponds to a pre-request match). In some implementations, information about such selections may be saved by a presentation system as historical data. Such historical data may be used to develop user preferences and/or to track requestor expectations so that upgrades can be offered when the expectations are not met, as detailed herein. Further, the method 4700 may include a step of communicating, by the presentation system, the selected transportation offering to the matching compute engine (e.g., in the form of a transportation request) for determination of a match that assigns the requestor device to a provider device. In some examples, the request may include a set of request parameters configured to cause the dynamic transportation matching system to match the transportation requestor to a transportation provider according to the pre-request match.

As detailed above, multiple, alternate, offerings communicated at step 4740 may be for one or more provider-specific matches. For example, the provider-specific match may correspond to a pre-request match where transportation provider devices are automatically matched to transportation requester devices. Additionally, the provider-specific match may be triggered based on the personal preferences of the transportation requestor. Also, the provider-specific match may cause the display of a concrete offer that includes the exact driver, route, ETA, and/or ETD in a mode selector of an application hosted on the transportation requestor device.

In some implementations, the provider-specific match may be communicated to the transportation requestor device before a transportation requestor opens the application. Additionally, the presentation system may create and manage a reservation of the exact driver as described above with reference to FIG. 15. Further, the provider-specific match may, under certain conditions, have a marginal-cost based instant price.

Figure 48:
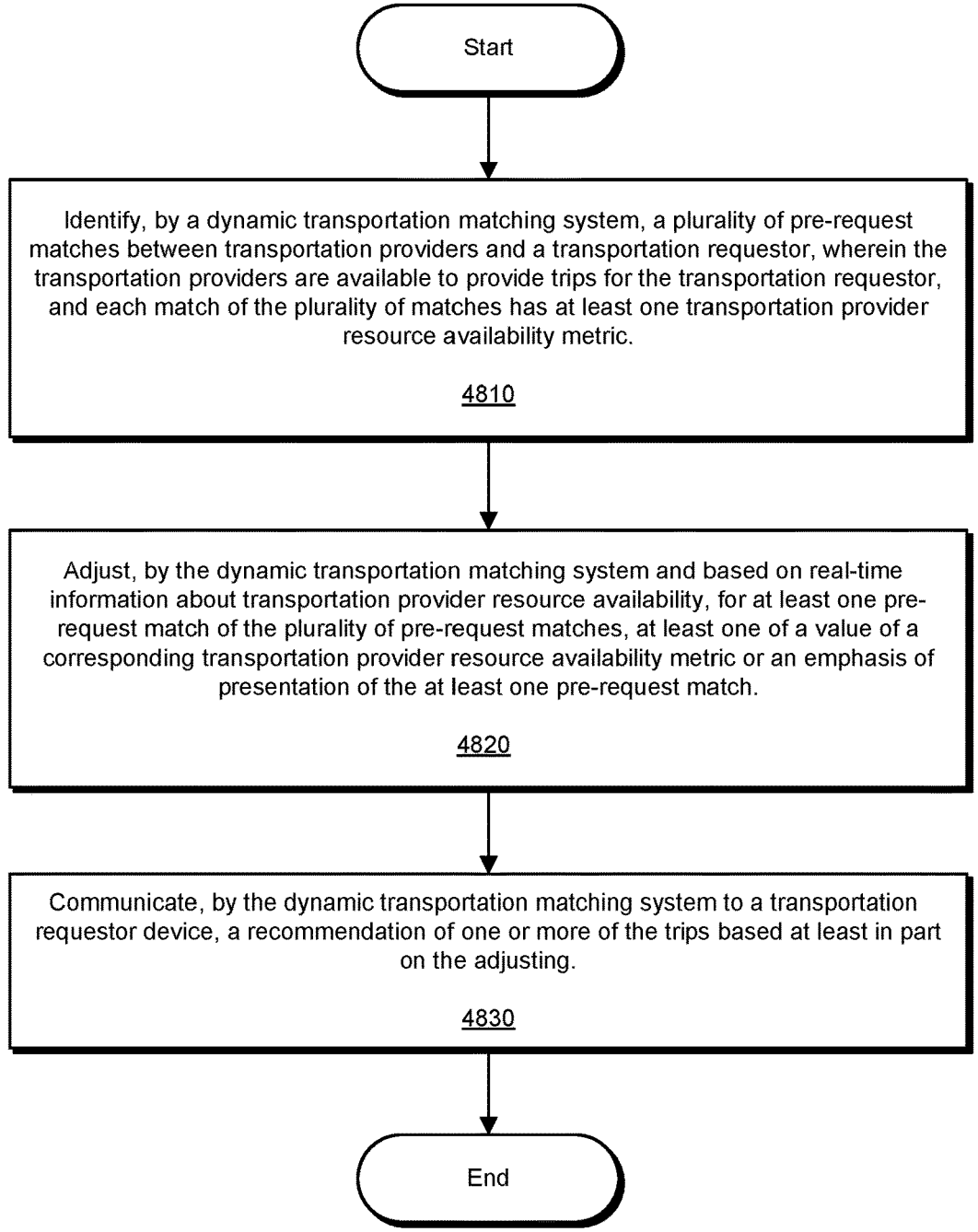
FIG. 48 is a flow diagram of an exemplary method for adjusting, for a match and based on real-time information about transportation provider resource availability, the emphasis of presentation and/or the value of a transportation provider resource availability metric in accordance with the present disclosure.

FIG. 48 is a flow diagram of an exemplary method for adjusting, for a match and based on real-time information about transportation provider resource availability, an emphasis of presentation (e.g., a ranking impacting order of presentation) and/or a value of a transportation provider resource availability metric in accordance with the present disclosure. Steps 4810-4830, described immediately below, may be carried out by one or more physical processors of a dynamic transportation matching system as described later with reference to FIGS. 51-53. It is envisioned that the one or more physical processors may be implemented as one or more servers configured to serve client applications operating on user devices as will be further detailed below. While method 4800 describes the presentation of pre-request matches, in some examples, a method may be applied to the presentation of any transportation matches (e.g., pre-request matches or post-request matches).

Continuing with reference to FIG. 48, beginning at step 4810, the method 4800 may include determining, by a dynamic transportation matching system, a plurality of pre-request matches between transportation providers and transportation requestors. The transportation providers may be available to service transportation requests for the transportation requestor, and each match of the plurality of matches may have at least one transportation provider resource availability metric (e.g., price/fare, system cost, vehicle luxury level, transportation mode, etc.). Processing may proceed from step 4810 to step 4820.

At step 4820, the method 4800 may include adjusting, by the dynamic transportation matching system, for at least one pre-request match of the plurality of pre-request matches, at least one of a value of a corresponding transportation provider resource availability metric or an emphasis of presentation of the at least one pre-request match. The adjusting may be based on real-time information (e.g., a cached speculative state from a most recent cycle of the matching compute engine as described herein) about transportation provider resource availability. In some implementations, the real-time information about transportation provider resource availability may be sourced as pre-request matches from a pre-request matching system, and the at least one match may be at least one pre-request match. System cost may thus be accurately determined, as described herein at least with reference to FIG. 23, for each pre-request match and used to influence pricing and/or emphasis of presentation. Accordingly, the adjusting performed at step 4820 may include increasing a price in a time of under resourcing. Alternatively or additionally, the adjusting performed at step 4820 may include adjusting a ranking in a list of matches by demoting the at least one match in the list of matches in a time of under resourcing. Prices may alternatively or additionally be lowered and/or rankings promoted in a time of oversupply. These and additional examples of factors that may trigger the adjusting are detailed herein at least with reference to FIGS. 31-36. Processing may proceed from step 4820 to step 4830.

At step 4830, the method 4800 may include communicating, by the dynamic transportation matching system to a transportation requestor device, a recommendation of one or more of the trips based at least in part on the adjusting. Communicating the recommendation of one or more of the trips at step 4830 may include transmitting the list of pre-request matches to the transportation requestor device.

Figure 49:
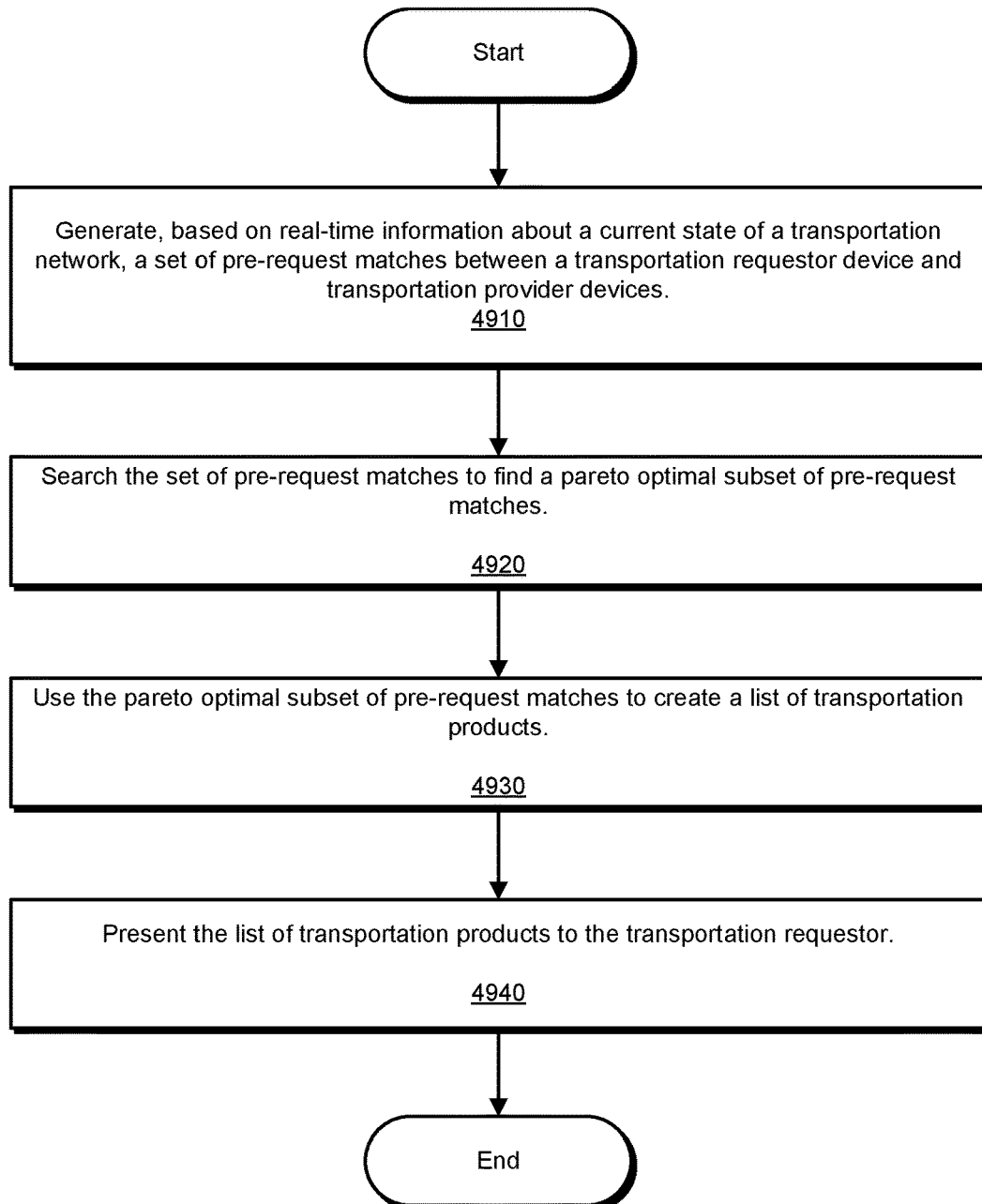
FIG. 49 is a flow diagram of an exemplary method for performing constraint space partitioning in accordance with the present disclosure.

FIG. 49 is a flow diagram of an exemplary method for performing constraint space partitioning in accordance with the present disclosure. Steps 4910-4950, described immediately below, may be carried out by one or more physical processors of a dynamic transportation matching system as described later with reference to FIGS. 51-53. It is envisioned that the one or more physical processors may be implemented as one or more servers configured to serve client applications operating on user devices as will be further detailed below.

Continuing with reference to FIG. 49, beginning at step 4910, the method 4900 may include generating, based on real-time information about a current state of a transportation network, a set of pre-request matches between a transportation requestor device and transportation provider devices. The transportation providers may be available to provide trips for the transportation requestor according to transportation requestor constraints that include at least one transportation requestor efficiency constraint (a walking distance, a number of detours, a detour radius, a queuing time, a batch window time, a pickup time, estimated time to destination (ETD), estimated time of arrival (ETA), etc.). Also, each match of the plurality of matches may have at least one transportation provider resource availability metric (e.g., price, system cost, vehicle luxury level, transportation mode, number of available vehicle seats, etc.). Processing may proceed from step 4910 to step 4920.

At step 4920, the method 4900 may include searching the set of pre-request matches to find a pareto optimal subset of pre-request matches. For example, analyzing the search may include analyzing, by a dynamic transportation matching system for at least one match of the set of pre-request matches, a tradeoff between the at least one transportation provider resource availability metric and the at least one transportation requestor efficiency constraint. The search may also include partitioning, by the dynamic transportation matching system based on the analyzing, a constraint space for the at least one transportation requestor efficiency constraint. The search may further include determining, by the dynamic transportation matching system, a value or range of the at least one transportation provider availability metric corresponding to a value or range of the at least one transportation requestor efficiency constraint based at least in part on the partitioning. Processing may proceed from step 4920 to step 4930.

The analysis performed at step 4920 may include sorting the pre-request matches, and determining, for a median value, if there is a fundamental cost difference and a fundamental change in ratio. In this case, the partitioning may include separating the pre-request matches at the median value in response to determining that there is both a fundamental cost difference and a fundamental change in ratio.

The analysis performed at step 4920 may alternatively include iteratively evaluating each pre-request match and finding points at which a fundamental change in the resource availability metric is observed. In this case, the partitioning may include partitioning the constraint space based at one or more points at which the fundamental change in the resource availability metric is observed.

The analysis performed at step 4920 may alternatively include observing a derivative of a reduction of a constraint option space as a corresponding constraint is constricted, alternating which dimension in the constraint space is constricted to determine impact on the transportation provider resource availability metric. In this case, the partitioning may include partitioning the constraint space at one or more locations at which a value of the derivative peaks.

At step 4930, the method 4900 may include using the pareto optimal subset of pre-request matches to create a list of transportation products in any manner described herein. Processing may proceed from step 4930 to step 4940.

At step 4940, the method 4900 may include presenting the list of transportation products to the transportation requestor device in any manner described herein. For example, presenting the list may include communicating one or more trips corresponding to one or more matches at which a partition has been made. Alternatively or additionally, presenting the list may include communicating one or more ranges for products corresponding to a plurality of one or more matches clustered with reference to the partitions, as described herein at least with reference to FIG. 22. Accordingly, the method 4900 may include clustering the plurality of the one or more matches according to a clustering technique. Example clustering techniques include grouping all matches having a predetermined positional relationship with respect to a partition, grouping a threshold number of matches having the predetermined positional relationship with respect to the partition, and/or grouping matches having the predetermined positional relationship with respect to the partition in a manner that ensures a threshold range. Because each listed transportation product is pareto optimal, each listed transportation product will have some advantage over each other listed transportation product (e.g., will always have at least attribute with a value that is more optimal than the value of the same attribute of another listed transportation product). These and other aspects are described in greater detail below.

Figure 50:
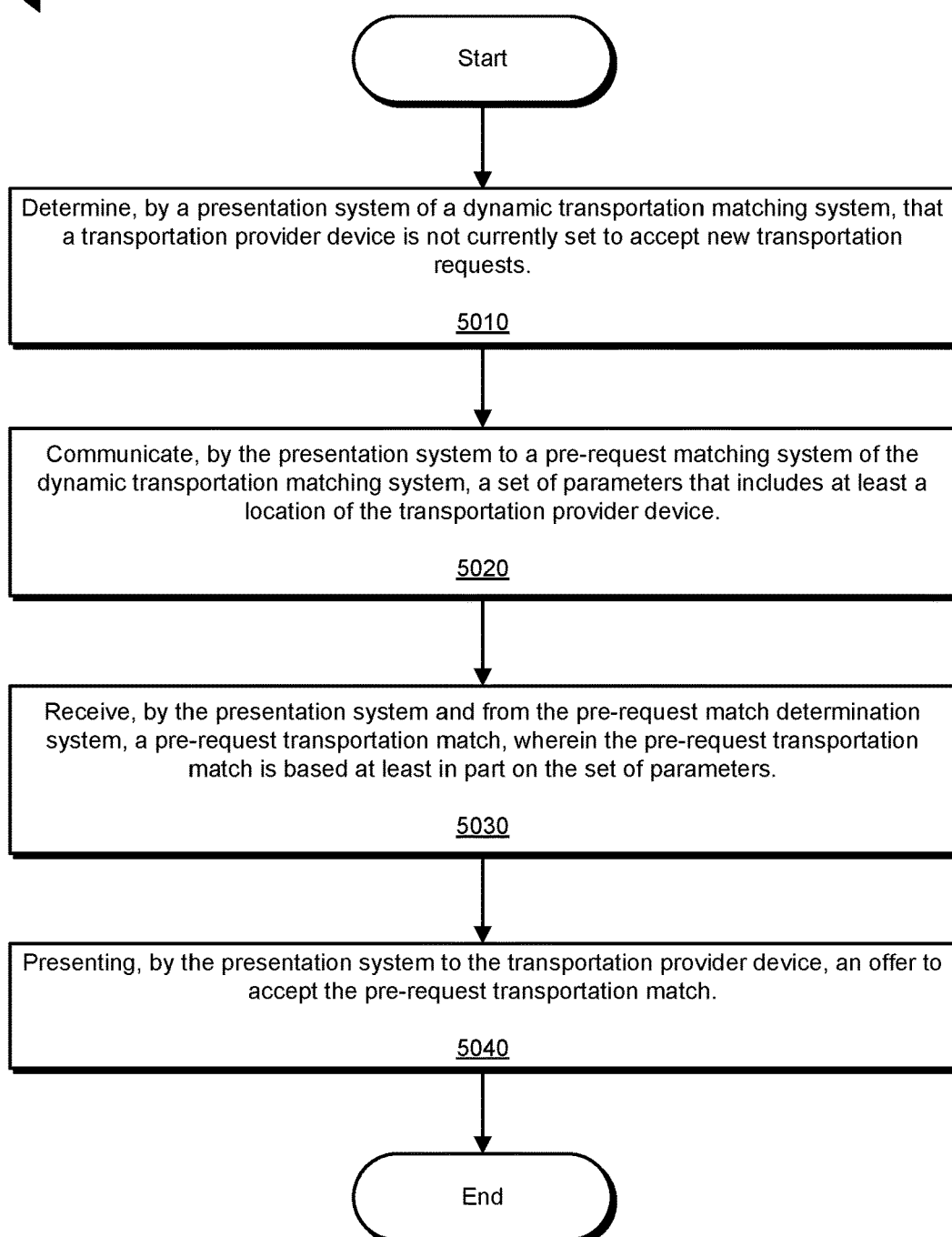
FIG. 50 is a flow diagram of an exemplary method for communicating a pre-request match to an offline transportation provider in accordance with the present disclosure.

FIG. 50 is a flow diagram of an exemplary method for communicating a pre-request match to an offline transportation provider in accordance with the present disclosure. Steps 5010-5040, described immediately below, may be carried out by one or more physical processors of a dynamic transportation matching system as described later with reference to FIGS. 51-53. It is envisioned that the one or more physical processors may be implemented as one or more servers configured to serve client applications operating on user devices as will be further detailed below.

Continuing with reference to FIG. 50, beginning at step 5010, the method 5000 may include determining, by a presentation system of a dynamic transportation matching system, that a transportation provider device is not currently set to accept new transportation requests as detailed herein at least with reference to FIGS. 37-40. Processing may proceed from step 5010 to step 5020.

At step 5020, the method 5000 may include communicating, by the presentation system to a pre-request matching system of the dynamic transportation matching system, a set of parameters that includes at least a location of the transportation provider device. The set of parameters may also be based on transportation provider attributes (e.g., transportation mode type, number of seats, number of car seats, etc.). The pre-request matching system may be configured to generate a pre-request match between a transportation provider device and a transportation requestor device based at least in part on the location and the transportation provider attributes. Processing may proceed from step 5020 to step 5030.

At step 5030, the method 5000 may include receiving, by the presentation system and from the pre-request matching system, a pre-request transportation match. The pre-request transportation match may be based at least in part on the set of parameters as described herein at least with reference to FIGS. 37-40.

At step 5040, the method 5000 may include presenting, by the presentation system to the transportation provider device, an offer to accept the pre-request transportation match. The pre-request match may be presented as a requestor-specific offer including an option for the transportation provider to go online and accept a ride corresponding to the pre-request match. For example, the requestor-specific offer may be configured to cause display of an exact transportation requestor, value, time, distance, and route.

In one example, the method may further include determining that the transportation requestor is queued and has yet to be matched (as illustrated, e.g., in FIG. 38). The communicating of the pre-request match at step 5040 may be contingent on determining that the transportation requestor is queued. The pre-request match may be to a queued transportation requestor for which a transportation provider has yet to be matched.

Figure 51:
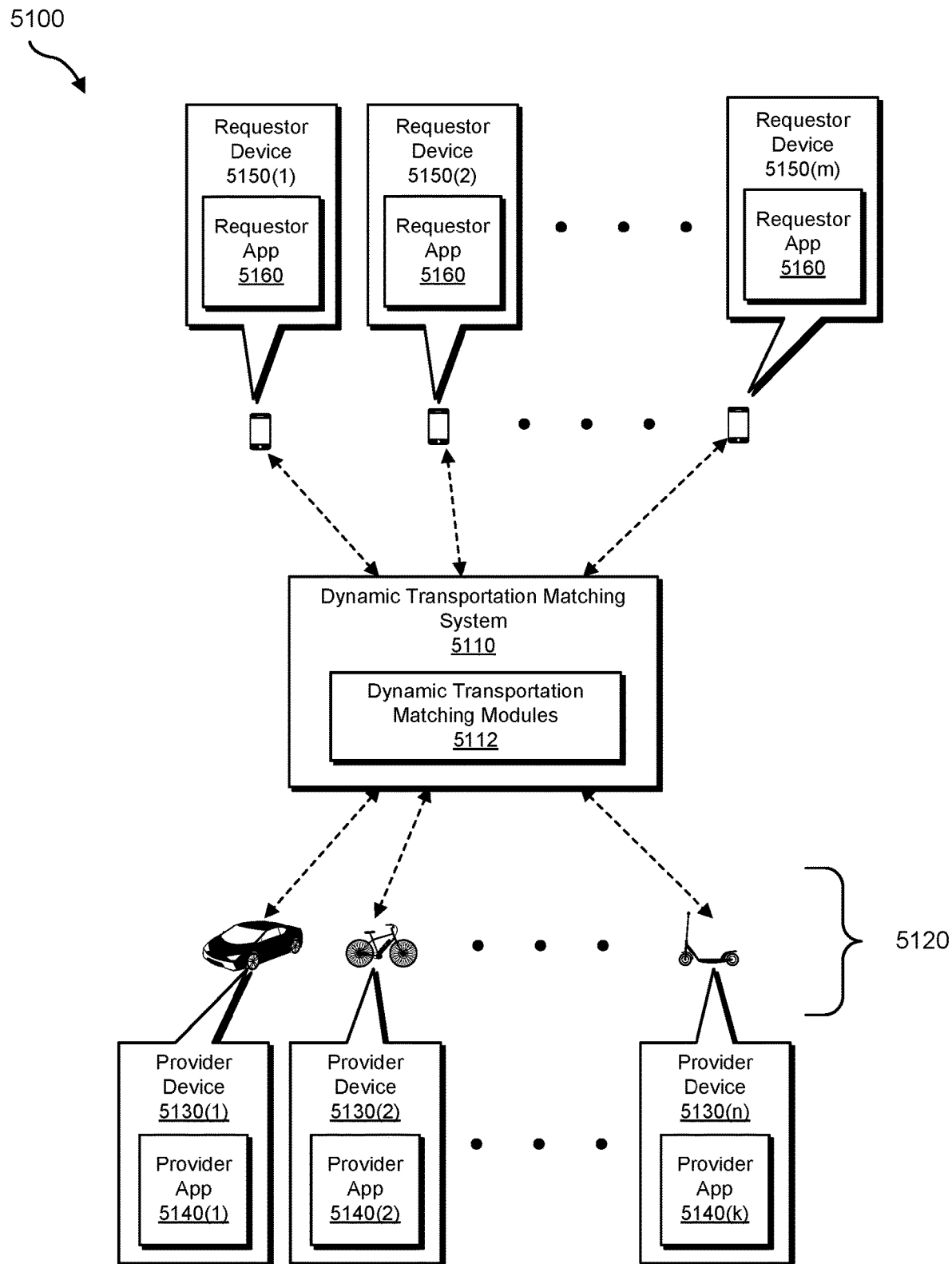
FIG. 51 illustrates an example system for matching transportation requests with a dynamic transportation network that includes personal mobility vehicles.

Alternatively or additionally, the pre-request match may be a predicted swap that modifies at least one post-request match by re-matching a transportation requestor of the post-request match. The swap chain may modify the at least one post-request match by re-matching the transportation requestor of the post-request match. For example, as discussed earlier in connection with FIG. 11, a swap chain can include at least one swap caused by the request made in order to accept the pre-request match. Such a triggered swap may also trigger additional swaps that are also part of the swap chain. It should be understood, however, that the pre-request match may be alternative or additional types of pre-request matches, such as a pre-request shared rides match. A shared ride match (e.g., in which two or more requestor devices are matched to a same provider device) may involve matching a transportation requestor upon receipt of an indication of acceptance of the shared rides match from the transportation provider device. The shared rides match may also have an option for matching one or more additional transportation requestors without receipt of additional indications of acceptance from the transportation provider device FIG. 51 illustrates an example system 5100 for matching transportation requests with a dynamic transportation network that includes personal mobility vehicles. As shown in FIG. 51, a dynamic transportation matching system 5110 may be configured with one or more dynamic transportation matching modules 5112 that may perform one or more of the steps described herein. Dynamic transportation matching system 5110 may represent any computing system and/or set of computing systems capable of matching transportation requests. Dynamic transportation matching system 5110 may be in communication with computing devices in each of a group of vehicles 5120. Vehicles 5120 may represent any vehicles that may fulfill transportation requests. In some examples, vehicles 5120 may include disparate vehicle types and/or models. For example, vehicles 5120 may include road-going vehicles and personal mobility vehicles. In some examples, some of vehicles 5120 may be standard commercially available vehicles. According to some examples, some of vehicles 5120 may be owned by separate individuals (e.g., transportation providers). Furthermore, while, in some examples, many or all of vehicles 5120 may be human-operated, in some examples many of vehicles 5120 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 51 does not specify the number of vehicles 5120, it may be readily appreciated that the systems described herein are applicable to hundreds of vehicles, thousands of vehicles, or more. In one example, dynamic transportation matching system 5110 may coordinate transportation matchings within a single region for 50,000 vehicles or more on a given day. In some examples, vehicles 5120 may collectively form a dynamic transportation network that may provide transportation resources on an on-demand basis to transportation requestors.

As mentioned above, dynamic transportation matching system 5110 may communicate with computing devices in each of vehicles 5120. The computing devices may be any suitable type of computing device. In some examples, one or more of the computing devices may be integrated into the respective vehicles 5120. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 5110.

As shown in FIG. 51, vehicles 5120 may include provider devices 5130(1)-(n) (e.g., whether integrated into the vehicle, permanently affixed to the vehicle, temporarily affixed to the vehicle, worn by a driver of the vehicle, etc.). In some examples, provider devices 5130 may include a provider apps 5140(1)-(k). Provider apps 5140(1)-(k) may represent any application, program, and/or module that may provide one or more services related to operating a vehicle and/or providing transportation matching services. For example, provider apps 5140(1)-(k) may include a transportation matching application for providers and/or one or more applications for matching personal mobility vehicles (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 5140(1)-(k) may match the user of provider apps 5140(1)-(k) (e.g., a transportation provider) with transportation requestors through communication with dynamic transportation matching system 5110. In addition, and as is described in greater detail below, provider apps 5140(1)-(k) may provide dynamic transportation matching system 5110 with information about a provider (including, e.g., the current location of the provider and/or vehicle) to enable dynamic transportation matching system 5110 to provide dynamic transportation matching and/or management services for the provider and one or more requestors. In some examples, provider apps 5140(1)-(k) may coordinate communications and/or a payment between a requestor and a provider. According to some embodiments, provider apps 5140(1)-(k) may provide a map service, a navigation service, a traffic notification service, and/or a geolocation service.

Additionally, as shown in FIG. 51, dynamic transportation matching system 5110 may communicate with requestor devices 5150(1)-(m). In some examples, requestor devices 5150 may include a requestor app 5160. Requestor app 5160 may represent any application, program, and/or module that may provide one or more services related to requesting transportation matching services. For example, requestor app 5160 may include a transportation matching application for requestors. In some examples, requestor app 5160 may match the user of requestor app 5160 (e.g., a transportation requestor) with transportation providers through communication with dynamic transportation matching system 5110. In addition, and as is described in greater detail below, requestor app 5160 may provide dynamic transportation matching system 5110 with information about a requestor (including, e.g., the current location of the requestor) to enable dynamic transportation matching system 5110 to provide dynamic transportation matching services for the requestor and one or more providers. In some examples, requestor app 5160 may coordinate communications and/or a payment between a requestor and a provider. According to some embodiments, requestor app 5160 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic transportation matching system applied to one or more services instead of and/or in addition to transportation services. For example, embodiments described herein may be used to match service providers with service requestors for any service.

Figure 52:
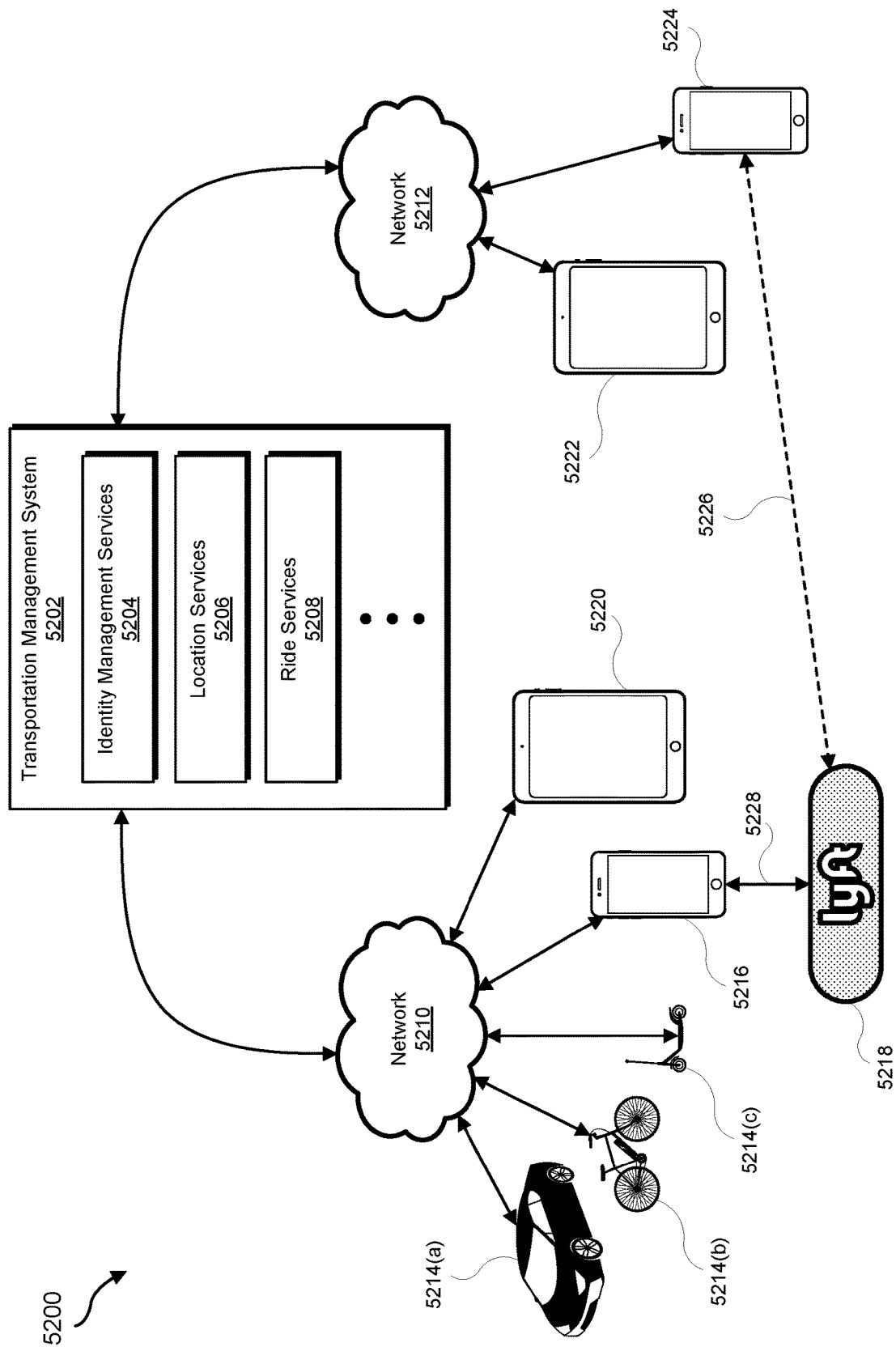
FIG. 52 shows an example transportation management environment in accordance with the present disclosure.

FIG. 52 shows a transportation management environment 5200, in accordance with various embodiments. As shown in FIG. 52, a transportation management system 5202 may run one or more services and/or software applications, including identity management services 5204, location services 5206, ride services 5208, and/or other services. Although FIG. 52 shows a certain number of services provided by transportation management system 5202, more or fewer services may be provided in various implementations. In addition, although FIG. 52 shows these services as being provided by transportation management system 5202, all or a portion of any of the services may be processed in a distributed fashion. For example, computations associated with a service task may be performed by a combination of transportation management system 5202 (including any number of servers, databases, etc.), one or more devices associated with a provider (e.g., devices integrated with managed vehicles 5214(a), 5214(b), and/or 5214(c); provider computing devices 5216 and tablets 5220; and transportation management vehicle devices 5218), and/or more or more devices associated with a ride requestor (e.g., the requestor's computing devices 5224 and tablets 5222). In some embodiments, transportation management system 5202 may include one or more general purpose computers, server computers, clustered computing systems, cloud-based computing systems, and/or any other computing systems or arrangements of computing systems. Transportation management system 5202 may be configured to run any or all of the services and/or software components described herein. In some embodiments, the transportation management system 5202 may include an appropriate operating system and/or various server applications, such as web servers capable of handling hypertext transport protocol (HTTP) requests, file transfer protocol (FTP) servers, database servers, etc.

In some embodiments, identity management services 5204 may be configured to perform authorization services for requestors and providers and/or manage their interactions and/or data with transportation management system 5202. This may include, e.g., authenticating the identity of providers and determining that they are authorized to provide services through transportation management system 5202. Similarly, requestors' identities may be authenticated to determine whether they are authorized to receive the requested services through transportation management system 5202. Identity management services 5204 may also manage and/or control access to provider and/or requestor data maintained by transportation management system 5202, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 5202 may also manage and/or control access to provider and/or requestor data stored with and/or obtained from third-party systems. For example, a requester or provider may grant transportation management system 5202 access to a third-party email, calendar, or task management system (e.g., via the user's credentials). As another example, a requestor or provider may grant, through a mobile device (e.g., 5216, 5220, 5222, or 5224), a transportation application associated with transportation management system 5202 access to data provided by other applications installed on the mobile device. In some examples, such data may be processed on the client and/or uploaded to transportation management system 5202 for processing.

In some embodiments, transportation management system 5202 may provide ride services 5208, which may include ride matching and/or management services to connect a requestor to a provider. For example, after identity management services module 5204 has authenticated the identity a ride requestor, ride services module 5208 may attempt to match the requestor with one or more ride providers. In some embodiments, ride services module 5208 may identify an appropriate provider using location data obtained from location services module 5206. Ride services module 5208 may use the location data to identify providers who are geographically close to the requestor (e.g., within a certain threshold distance or travel time) and/or who are otherwise a good match with the requestor. Ride services module 5208 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 5208 may use rule-based algorithms and/or machine-learning models for matching requestors and providers.

Transportation management system 5202 may communicatively connect to various devices through networks 5210 and/or 5212. Networks 5210 and 5212 may include any combination of interconnected networks configured to send and/or receive data communications using various communication protocols and transmission technologies. In some embodiments, networks 5210 and/or 5212 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 5210 and/or 5212 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, networks 5210 and/or 5212 may include any combination of networks described herein or any other type of network capable of facilitating communication across networks 5210 and/or 5212.

In some embodiments, transportation management vehicle device 5218 may include a provider communication device configured to communicate with users, such as drivers, passengers, pedestrians, and/or other users. In some embodiments, transportation management vehicle device 5218 may communicate directly with transportation management system 5202 or through another provider computing device, such as provider computing device 5216. In some embodiments, a requestor computing device (e.g., device 5224) may communicate via a connection 5226 directly with transportation management vehicle device 5218 via a communication channel and/or connection, such as a peer-to-peer connection, Bluetooth connection, NFC connection, ad hoc wireless network, and/or any other communication channel or connection. Although FIG. 52 shows particular devices communicating with transportation management system 5202 over networks 5210 and 5212, in various embodiments, transportation management system 5202 may expose an interface, such as an application programming interface (API) or service provider interface (SPI) to enable various third parties which may serve as an intermediary between end users and transportation management system 5202.

In some embodiments, devices within a vehicle may be interconnected. For example, any combination of the following may be communicatively connected: vehicle 5214, provider computing device 5216, provider tablet 5220, transportation management vehicle device 5218, requestor computing device 5224, requestor tablet 5222, and any other device (e.g., smart watch, smart tags, etc.). For example, transportation management vehicle device 5218 may be communicatively connected to provider computing device 5216 and/or requestor computing device 5224. Transportation management vehicle device 5218 may establish communicative connections, such as connections 5226 and 5228, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 5202 using applications executing on their respective computing devices (e.g., 5216, 5218, 5220, and/or a computing device integrated within vehicle 5214), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 5214 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 5202. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 53:
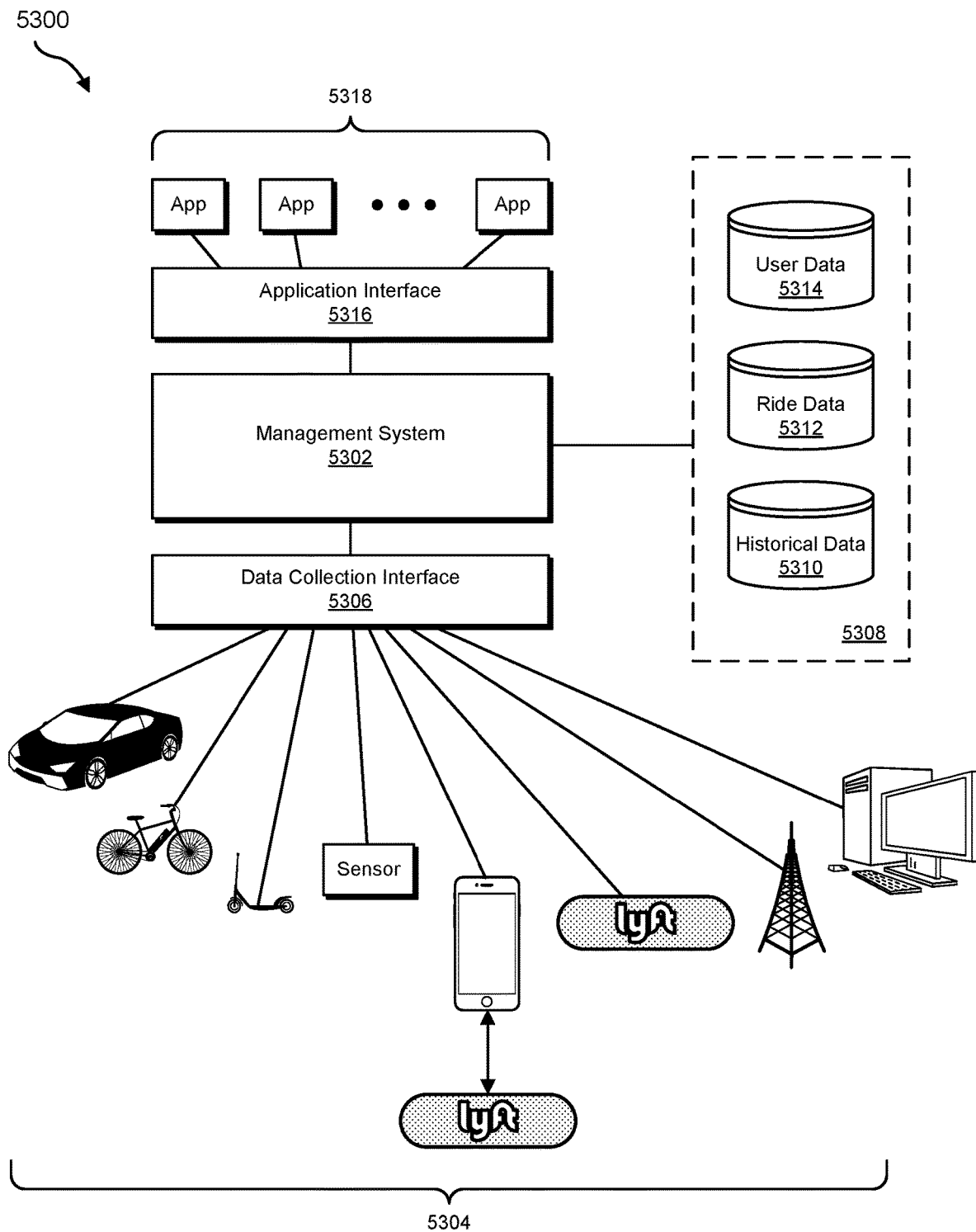
FIG. 53 shows an example data collection and application management environment in accordance with the present disclosure.

FIG. 53 shows a data collection and application management environment 5300, in accordance with various embodiments. As shown in FIG. 53, management system 5302 may be configured to collect data from various data collection devices 5304 through a data collection interface 5306. As discussed above, management system 5302 may include one or more computers and/or servers or any combination thereof. Data collection devices 5304 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 5306 can include, e.g., an extensible device framework configured to support interfaces for each data collection device. In various embodiments, data collection interface 5306 may be extended to support new data collection devices as they are released and/or to update existing interfaces to support changes to existing data collection devices. In various embodiments, data collection devices may communicate with data collection interface 5306 over one or more networks. The networks may include any network or communication protocol as would be recognized by one of ordinary skill in the art, including those networks discussed above.

As shown in FIG. 53, data received from data collection devices 5304 can be stored in data store 5308. Data store 5308 may include one or more data stores, such as databases, object storage systems and services, cloud-based storage services, and other data stores. For example, various data stores may be implemented on a non-transitory storage medium accessible to management system 5302, such as historical data store 5310, ride data store 5312, and user data store 5314. Data stores 5308 can be local to management system 5302, or remote and accessible over a network, such as those networks discussed above or a storage-area network or other networked storage system. In various embodiments, historical data 5310 may include historical traffic data, weather data, request data, road condition data, or any other data for a given region or regions received from various data collection devices. Ride data 5312 may include route data, request data, timing data, and other ride related data, in aggregate and/or by requestor or provider. User data 5314 may include user account data, preferences, location history, and other user-specific data. Although certain data stores are shown by way of example, any data collected and/or stored according to the various embodiments described herein may be stored in data stores 5308.

As shown in FIG. 53, an application interface 5316 can be provided by management system 5302 to enable various apps 5318 to access data and/or services available through management system 5302. Apps 5318 may run on various user devices (including provider and requestor computing devices, such as those discussed above) and/or may include cloud-based or other distributed apps configured to run across various devices (e.g., computers, servers, or combinations thereof). Apps 5318 may include, e.g., aggregation and/or reporting apps which may utilize data 5308 to provide various services (e.g., third-party ride request and management apps). In various embodiments, application interface 5316 can include an API and/or SPI enabling third party development of apps 5318. In some embodiments, application interface 5316 may include a web interface, enabling web-based access to data 5308 and/or services provided by management system 5302. In various embodiments, apps 5318 may run on devices configured to communicate with application interface 5316 over one or more networks. The networks may include any network or communication protocol as would be recognized by one of ordinary skill in the art, including those networks discussed above, in accordance with an embodiment of the present disclosure.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system, comprising:
a non-transitory memory; and
one or more hardware processors configured to execute instructions from the non-transitory memory to perform operations comprising:
accessing, by a predictive matching system, a cache of one or more assignment plans matching transportation requester devices and transportation provider devices;
prior to an application being opened on a transportation requester device of a transportation requester, generating, for the transportation requester, one or more out-of-application matches by:
appending, to the cached assignment plans, a simulated request for a ride based on a pre-request session of the application; and
generating, for the ride by the predictive matching system based on the simulated request and the appended cache of assignment plans, one or more predicted matches to a transportation provider that surpass a threshold ratio of match efficiency to match inconvenience;
surfacing, to the transportation requester device via a push notification, a selectable notification comprising projected transportation information based on the one or more predicted matches;
in response to receiving user input to the push notification:
launching the application; and
enabling the transportation requester to submit, via the application,
a request for the ride;
receiving a requester selection, submitted via user input to the transportation requester device, to join a queue for a transportation provider that meets a constraint that is not met by transportation providers who are currently online and available;
in response to receiving the requester selection, surfacing, to a provider device of an offline transportation provider, a selectable notification prompting the offline transportation provider to come online and service the ride; and
in response to receiving user input via the provider device of the offline transportation provider accepting the prompt to come online, bringing the offline transportation provider online to service the ride.

2. The system of claim 1, wherein the projected transportation information comprises at least one of an estimated time of arrival of a transportation provider, an estimated route, an estimated transportation provider, an estimated pickup location, an estimated drop-off location, and an estimated price for the ride.

3. The system of claim 1, wherein:
the predictive matching system generates the one or more predicted matches before a matching compute engine that generated the assignment plans in a matching cycle generates subsequent assignment plans in a subsequent matching cycle; and
the matching compute engine generates assignment plans using a same matching procedure utilized by the predictive matching system.

4. The system of claim 1, wherein:
the pre-request session specifies a location of the transportation requester device and a destination for the ride but does not specify a mode of transportation for the ride; and
the mode of transportation comprises at least one of a shared ride, an economy ride, a luxury ride, a micromobility ride, and public transportation.

5. The system of claim 1, wherein:
the pre-request session specifies a location of the transportation requester device and a destination for the ride but does not specify a constraint for the ride; and
the constraint comprises at least one of an estimated time of arrival, a number of seats requested for the ride, a type of vehicle, a wait time, a number of detours, a metric associated with provider compensation, a miles per gallon constraint, and a car seat constraint.

6. The system of claim 1, wherein the operations further comprise:
receiving a first user input, submitted by the offline-to-online transportation provider via the provider device, accepting to service the ride;
receiving a second user input, submitted by the transportation requester via the transportation request device, accepting to ride with the offline-to-online transportation provider; and
in response to receiving the first user input and the second user input, matching the offline-to-online transportation provider to the transportation requester for the ride.

7. The system of claim 1, wherein the simulated request is generated using a specific starting point, a specific destination, and at least one specified transportation type to simulate transporting the transportation requester device prior to receiving a request for transportation.

8. The system of claim 1, wherein enabling the transportation requester to submit the request for the ride comprises receiving the request for the ride.

9. The system of claim 1, wherein the operations further comprise surfacing an indication of a match, between the transportation requester and the transportation provider who was brought online, to the transportation requester device.

10. The system of claim 1, wherein the ratio is generated for a particular predicted match based on a plurality of factors corresponding to the particular predicted match, the factors comprising at least one of a transportation provider utilization rate, whether the transportation requester walks as part of a transportation plan, whether the transportation requester shares a ride with other requesters, whether a shared ride includes significant detours, and whether the transportation requester waits in queue for a match to a transportation provider.

11. The system of claim 1, wherein the pre-request session of the application is initiated in response to detecting at least one of:
a predictable habit of the transportation requester detected via the transportation requester device; and
a scheduled event detected from a calendar application installed on the transportation requester device.

12. The system of claim 1, wherein generating the one or more predicted matches further comprises generating the one or more predicted matches based on stored user preference specified by the transportation requester.

13. The system of claim 1, wherein generating the one or more predicted matches further comprises generating the one or more predicted matches based on one or more stored user preferences generated based on past transportation requester activity.

14. A computer-implemented method, comprising:
accessing, by a predictive matching system, a cache of one or more assignment plans matching transportation requester devices and transportation provider devices;

prior to an application being opened on a transportation requester device of a transportation requester, generating, for the transportation requester, one or more out-of-application matches by:
- appending, to the cached assignment plans, a simulated request for a ride based on a pre-request session of the application; and
- generating, for the ride by the predictive matching system based on the simulated request and the appended cache of assignment plans, one or more predicted matches to a transportation provider that surpass a threshold ratio of match efficiency to match inconvenience;

surfacing, to the transportation requester device via a push notification, a selectable notification comprising projected transportation information based on the one or more predicted matches;

in response to receiving user input to the push notification, launching the application and enabling a user to submit, via the application, a request for the ride;

receiving a requester selection, submitted via user input to the transportation requester device, to join a queue for a transportation provider that meets a constraint that is not met by transportation providers who are currently online and available;

in response to receiving the requester selection, surfacing, to a provider device of an offline transportation provider, a selectable notification prompting the offline transportation provider to come online and service the ride; and in response to receiving user input via the provider device of the offline transportation provider accepting the prompt to come online, bringing the offline transportation provider online to service the ride.

15. The method of claim 14, wherein the projected transportation information comprises at least one of an estimated time of arrival of a transportation provider, an estimated route, an estimated transportation provider, an estimated pickup location, an estimated drop-off location, and an estimated price.

16. The method of claim 14, wherein the predictive matching system generates the one or more predicted matches before a matching compute engine that generated the assignment plans in a matching cycle generates assignment plans in a subsequent matching cycle.

17. The method of claim 14, wherein generating the one or more predicted matches pre-request comprises generating the one or more predicted matches for a plurality of variants defined by one or more constraints.

18. A non-transitory computer-readable medium comprising:
computer-readable instructions that, when executed by at least one processor of a computing device, cause the computing device to:
access, by a predictive matching system, a cache of one or more assignment plans matching transportation requester devices and transportation provider devices;
prior to an application being opened on a transportation requester device of a transportation requester, generate, for the transportation requester, one or more out-of-application matches by:
- appending, to the cached assignment plans, a simulated request for a ride based on a pre-request session of the application; and
- generating, for the ride by the predictive matching system based on the simulated request and the appended cache of assignment plans, one or more predicted matches to a transportation provider that surpass a threshold ratio of match efficiency to match inconvenience;

surface, to the transportation requester device via a push notification, a selectable notification comprising projected transportation information based on the one or more predicted matches;

in response to receiving user input to the push notification, launch the application and enable the transportation requester to submit, via the application, a request for the ride;

receive a requester selection, submitted via user input to the transportation requester device, to join a queue for a transportation provider that meets a constraint that is not met by transportation providers who are currently online and available;

in response to receiving the requester selection, surface, to a provider device of an offline transportation provider, a selectable notification prompting the offline transportation provider to come online and service the ride; and in response to receiving user input via the provider device of the offline transportation provider accepting the prompt to come online, bring the offline transportation provider online to service the ride.

19. The non-transitory computer-readable medium of claim 18, wherein:
the predictive matching system uses a matching procedure to generate the one or more predicted matches pre-request; and
a matching compute engine generates the assignment plans using a same matching procedure utilized by the predictive matching system.

20. The non-transitory computer-readable medium of claim 18, wherein:
the pre-request session specifies a location of the transportation requester device and a destination for the ride but does not specify at least one of a mode of transportation for the ride or a constraint for the ride;
the mode of transportation comprises at least one of a shared ride, an economy ride, a luxury ride, a micro-mobility ride, and public transportation; and
the constraint comprises at least one of an estimated time of arrival, a number of seats requested for the ride, a type of vehicle, a wait time, a number of detours, a metric associated with provider compensation, a miles per gallon constraint, or a car seat constraint.

* * * * *